United States Patent
Park et al.

(10) Patent No.: US 7,167,527 B1
(45) Date of Patent: Jan. 23, 2007

(54) SYSTEM AND METHOD FOR MULTI-SYMBOL INTERFACING

(75) Inventors: Yong E. Park, Los Altos, CA (US); Shuen-Chin Chang, San Jose, CA (US); Chiayao S. Tung, Cupertino, CA (US)

(73) Assignee: Integrated Memory Logic, Inc., Campbell, CA (US)

( * ) Notice: Subject to any disclaimer, the term of this patent is extended or adjusted under 35 U.S.C. 154(b) by 936 days.

(21) Appl. No.: 10/139,047

(22) Filed: May 2, 2002

(51) Int. Cl.
*H04L 27/04* (2006.01)
*H04L 27/12* (2006.01)
*H04L 27/20* (2006.01)

(52) U.S. Cl. ...................... 375/295; 375/286
(58) Field of Classification Search ........ 375/256–258, 375/259, 286–288, 292, 295; 326/27–29; 327/126
See application file for complete search history.

(56) References Cited

U.S. PATENT DOCUMENTS

| | | | | |
|---|---|---|---|---|
| 5,243,628 A | * | 9/1993 | Moritoki et al. | 375/286 |
| 5,917,340 A | * | 6/1999 | Manohar et al. | 326/82 |
| 6,049,229 A | * | 4/2000 | Manohar et al. | 326/83 |
| 6,498,512 B1 | * | 12/2002 | Simon et al. | 326/93 |
| 6,567,491 B1 | * | 5/2003 | McCune et al. | 375/247 |
| 6,697,420 B1 | * | 2/2004 | Simon et al. | 375/220 |
| 6,891,899 B1 | * | 5/2005 | Hall et al. | 375/295 |
| 6,937,664 B1 | * | 8/2005 | Park et al. | 375/259 |

* cited by examiner

*Primary Examiner*—Emmanuel Bayard
*Assistant Examiner*—Lawrence Williams
(74) *Attorney, Agent, or Firm*—Sidley Austin LLP

(57) ABSTRACT

In one aspect, apparatus and method are provided for communicating data in the form of transmission symbols conveyed in a carrier signal, wherein each transmission symbol is from a symbol set comprising a plurality of symbols which are collectively capable of representing any combination of values for at least three bits of data, wherein each symbol of the symbol set is defined with at most one transition of signal level in the carrier signal. In another aspect, apparatus and method are provided for communicating any combination of values for at least three data bits in the form of a respective transmission symbol conveyed in a carrier signal, wherein the transmission symbol is uniquely defined by a respective combination of a signal level transition, a lack of signal level transition, a signal region, and a cross-over between signal regions in the carrier signal.

50 Claims, 25 Drawing Sheets

| D2 | D1 | D0 | Transition | Region | t0 CLK=high | t1 CLK=low | Symbol |
|---|---|---|---|---|---|---|---|
| 0 | 0 | 0 | Rising | Lower | $V_L$ | $V_{TT}$ | Symbol-000 |
| 0 | 0 | 1 | Rising | Upper | $V_{TT}$ | $V_H$ | Symbol-001 |
| 0 | 1 | 0 | Falling | Lower | $V_{TT}$ | $V_L$ | Symbol-010 |
| 0 | 1 | 1 | Falling | Upper | $V_H$ | $V_{TT}$ | Symbol-011 |
| 1 | 0 | 0 | None | Lower | $V_L$ | $V_L$ | Symbol-100 |
| 1 | 0 | 1 | Rising | Lower -> Upper | $V_L$ | $V_H$ | Symbol-101 |
| 1 | 1 | 0 | Falling | Upper -> Lower | $V_H$ | $V_L$ | Symbol-110 |
| 1 | 1 | 1 | None | Upper | $V_H$ | $V_H$ | Symbol-111 |

Fig. 2B

Multi-Symbol Encoder Truth Table

| D2 | D1 | D0 | t0 CLK=high | t1 CLK=low | do0 t0 CLK=high | do1 t0 CLK=high | do0 t1 CLK=low | do1 t1 CLK=low |
|---|---|---|---|---|---|---|---|---|
| 0 | 0 | 0 | $V_L$ | $V_{TT}$ | 1 | 1 | 0 | 1 |
| 0 | 0 | 1 | $V_{TT}$ | $V_H$ | 0 | 1 | 0 | 0 |
| 0 | 1 | 0 | $V_{TT}$ | $V_L$ | 0 | 1 | 1 | 1 |
| 0 | 1 | 1 | $V_H$ | $V_{TT}$ | 0 | 0 | 0 | 1 |
| 1 | 0 | 0 | $V_L$ | $V_L$ | 1 | 1 | 1 | 1 |
| 1 | 0 | 1 | $V_L$ | $V_H$ | 1 | 1 | 0 | 0 |
| 1 | 1 | 0 | $V_H$ | $V_L$ | 0 | 0 | 1 | 1 |
| 1 | 1 | 1 | $V_H$ | $V_H$ | 0 | 0 | 0 | 0 |

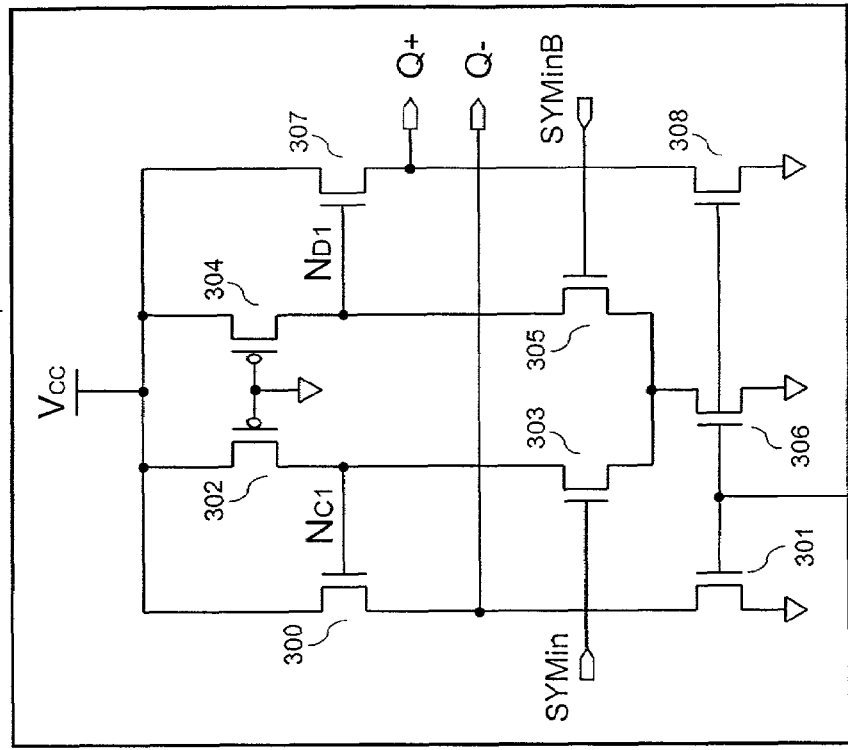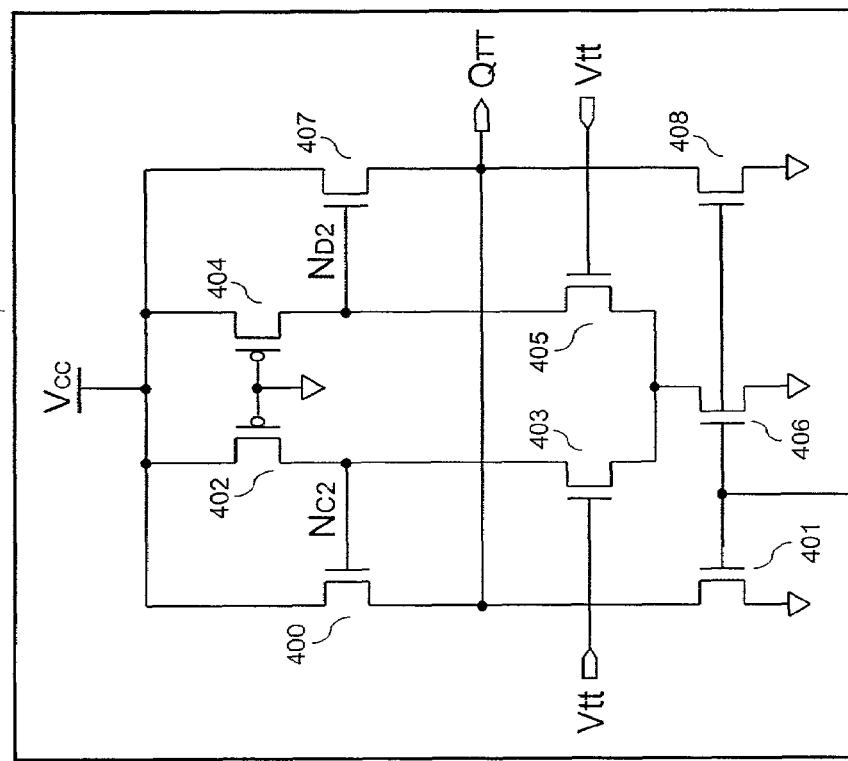
Fig. 10

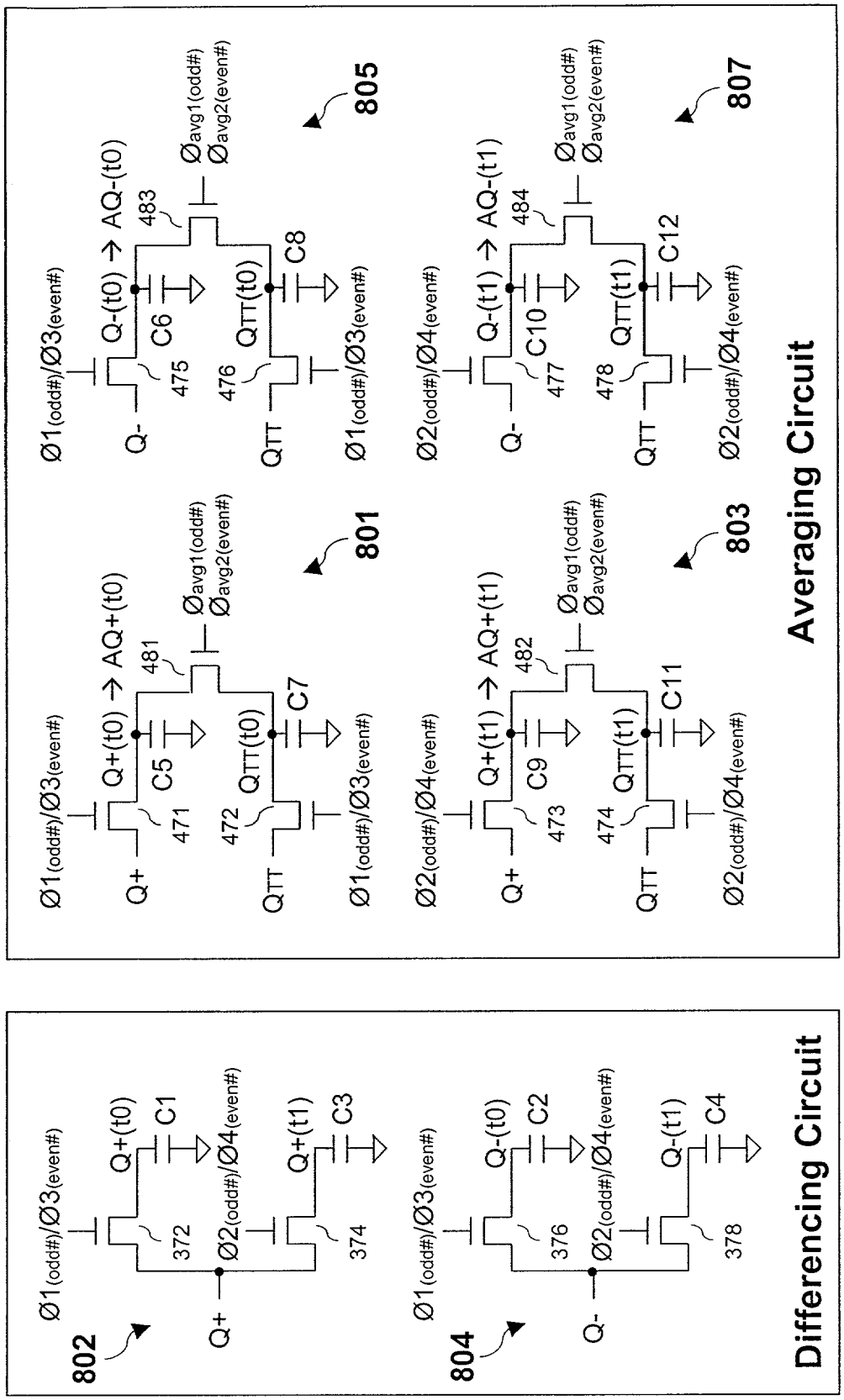
Fig. 13 Averaging Circuit
Fig. 12 Differencing Circuit

Differential Latch Amplifiers

Z1 is determined by the difference voltages of {Δ[Q+(t1) − AQ+(t0)] + Δ[AQ-(t0) − Q-(t1)]}
Z2 is determined by the difference voltages of {Δ[Q+(t0) − AQ+(t1)] + Δ[AQ-(t1) − Q-(t0)]}

Transition and DC/AC Detection Truth Table

| t0 | t1 | Z1 | Z2 | Region | Symbol |
|---|---|---|---|---|---|
| $V_{QH}$ | $V_{QH}$ | 1 | 1 | upper | DC (high) — Symbol-111 |
| $V_{QL}$ | $V_{QL}$ | 0 | 0 | lower | DC (low) — Symbol-100 |
| $V_{QH}$ | $V_{QTT}$ | 0 | 1 | upper | Small (AC) ↗ Symbol-011 |
| $V_{QTT}$ | $V_{QH}$ | 1 | 0 | upper | Small (AC) ↗ Symbol-001 |
| $V_{QTT}$ | $V_{QL}$ | 0 | 1 | lower | Small (AC) ↗ Symbol-010 |
| $V_{QL}$ | $V_{QTT}$ | 1 | 0 | lower | Small (AC) ↗ Symbol-000 |
| $V_{QH}$ | $V_{QL}$ | 0 | 1 | upper → lower | Big (AC) ↗ Symbol-110 |
| $V_{QL}$ | $V_{QH}$ | 1 | 0 | lower → upper | Big (AC) ↗ Symbol-101 |

Y = Z1 XNOR Z2; Y = 1 (DC Symbols); Y = 0 (AC Symbols). D1 = Z2.

Fig. 15

Averaging Circuit

130

904

Ø1(odd#)/Ø3(even#) — 328 C15 — Q-(t0) → Q-AV — 332 Øavg1(odd#)/Øavg2(even#)

Q-(t0) Q-(t1) C16

Q-

330 Ø2(odd#)/Ø4(even#)

$$Q_{-AV} = [Q_{-(t0)} + Q_{-(t1)}] \div 2$$

902

Ø1(odd#)/Ø3(even#) — 322 C13 — Q+(t0) → Q+AV — 326 Øavg1(odd#)/Øavg2(even#)

Q+(t0) Q+(t1) C14

Q+

324 Ø2(odd#)/Ø4(even#)

$$Q_{+AV} = [Q_{+(t0)} + Q_{+(t1)}] \div 2$$

Fig. 17

R1 is determined by the difference voltages of $\{\Delta[Q+(t0) - Q-AV] + \Delta[Q+AV - Q-(t0)] + \Delta[Q+AV - Q-AV]\}$
R2 is determined by the difference voltages of $\{\Delta[Q+(t1) - Q-AV] + \Delta[Q+AV - Q-(t1)] + \Delta[Q+AV - Q-AV]\}$

Cross-Region Detection Truth Table

| t0 | t1 | R1 | R2 | Region | Symbol |
|---|---|---|---|---|---|
| $V_{QH}$ | $V_{QH}$ | 1 | 1 | upper | DC (high) Symbol-111 — |
| $V_{QL}$ | $V_{QL}$ | 0 | 0 | lower | DC (low) Symbol-100 — |
| $V_{QH}$ | $V_{QTT}$ | 1 | 1 | upper | Small (AC) Symbol-011 ↗ |
| $V_{QTT}$ | $V_{QH}$ | 1 | 1 | upper | Small (AC) Symbol-001 ↗ |
| $V_{QTT}$ | $V_{QL}$ | 0 | 0 | lower | Small (AC) Symbol-010 ↗ |
| $V_{QL}$ | $V_{QTT}$ | 0 | 0 | lower | Small (AC) Symbol-000 ↗ |
| $V_{QH}$ | $V_{QL}$ | 1 | 0 | upper → lower | Big (AC) Symbol-110 ↗ |
| $V_{QL}$ | $V_{QH}$ | 0 | 1 | lower → upper | Big (AC) Symbol-101 ↗ |

S = R1 *xor* R2;  S = 1 (Big/Cross-Region Symbols);  S = 0 (Small/DC Symbols).  D0 = R2.

Fig. 19

SYSTEM AND METHOD FOR MULTI-SYMBOL INTERFACING

TECHNICAL FIELD OF THE INVENTION

The present invention relates generally to the field of interfacing, and more particularly, to a system and method for multi-symbol interfacing.

BACKGROUND OF THE INVENTION

In the electronic arts, data and information is routinely communicated or transferred between various devices, such as, for example, two computers, two integrated circuit (IC) devices, two conductive nodes, etc. Typically, such data/information is conveyed via one or more electrical signals carried over a suitable channel. Exemplary channels include copper wire, printed circuit board (PCB) trace, metallization line, and the like. As electronics have improved, there has been a corresponding need to transfer data/information at ever higher rates. High-speed transfer, however, has been hindered by a number of factors including, for example, limitations of the signaling technology used to transfer data/information over carrier channels and also the bandwidth of the channels themselves.

SUMMARY OF THE INVENTION

According to an embodiment of the present invention, an apparatus for providing multi-symbol signaling includes an encoder circuit operable to encode data into transmission symbols to be conveyed in a carrier signal. Each transmission symbol is from a symbol set comprising a plurality of symbols which are collectively capable of representing any combination of values for at least three bits of data. Each symbol of the symbol set is defined with at most one transition of signal level in the carrier signal. A driver circuit, coupled to the encoder circuit, is operable to drive the carrier signal.

According to another embodiment of the present invention, an apparatus for recovering data includes a pre-amplifier operable to receive a carrier signal conveying a plurality of transmission symbols. Each transmission symbol is from a symbol set comprising a plurality of symbols which are collectively capable of representing any combination of values for at least three bits of data. Each symbol of the symbol set is defined with at most one transition of signal level in the carrier signal. A decoder, coupled to the pre-amplifier, is operable to recover, for each transmission symbol, a respective combination of values for at least three bits of data.

According to yet another embodiment of the present invention, a method for providing multi-symbol signaling includes: receiving a group of at least three bits of data for output from an originating device; encoding the group of at least three bits of data into a single transmission symbol, wherein the transmission symbol is from a symbol set comprising a plurality of symbols which are collectively capable of representing any combination of values for the at least three bits of data, wherein each symbol of the symbol set is defined with at most one transition of signal level in the carrier signal; and transmitting the carrier signal out of the originating device to a destination device.

According to still another embodiment of the present invention, a method for providing multi-symbol signaling includes: receiving a plurality of bits of data for output from an originating device; encoding the data into a plurality of transmission symbols for communicating data, wherein each transmission symbol for communicating data is from a symbol set comprising symbols defined by respective combinations of signal level transition, lack of signal level transition, signal region, and cross-over between signal regions in the carrier signal; and transmitting the carrier signal out of the originating device to a destination device.

According to still yet another embodiment of the present invention, an apparatus is provided for communicating data in the form of transmission symbols conveyed in a carrier signal. Each transmission symbol is selected from a symbol set comprising symbols defined by respective combinations of signal level transition, lack of signal level transition, signal region, and cross-over between signal regions in the carrier signal.

BRIEF DESCRIPTION OF THE DRAWINGS

For a more complete understanding of the present invention and for further features and advantages, reference is now made to the following description, taken in conjunction with the accompanying drawings, in which:

FIGS. 2A and 2B illustrate an exemplifying embodiment for a multi-symbol signaling scheme, in accordance with an embodiment of the present invention;

FIGS. 7A and 7B are a logic diagram of a multi-symbol encoder and a corresponding truth table, in accordance with an embodiment of the present invention;

FIG. 10 is a schematic diagram of a voltage generator and a pre-amplifier, in accordance with embodiments of the present invention;

FIG. 12 is a schematic diagram of differencing circuits for use in the transition and DC/AC detector, in accordance with an embodiment of the present invention;

FIG. 13 is a schematic diagram of averaging circuits for use in the transition DC/AC detector, in accordance with an embodiment of the present invention;

FIG. 15 is a truth table for the transition and DC/AC detector, in accordance with an embodiment of the present invention;

FIG. 17 is a schematic diagram of averaging circuits for use in the cross-region detector, in accordance with an embodiment of the present invention;

FIG. 19 is a truth table for the cross-region detector, in accordance with an embodiment of the present invention;

DETAILED DESCRIPTION OF THE PREFERRED EMBODIMENTS

Figure 1:
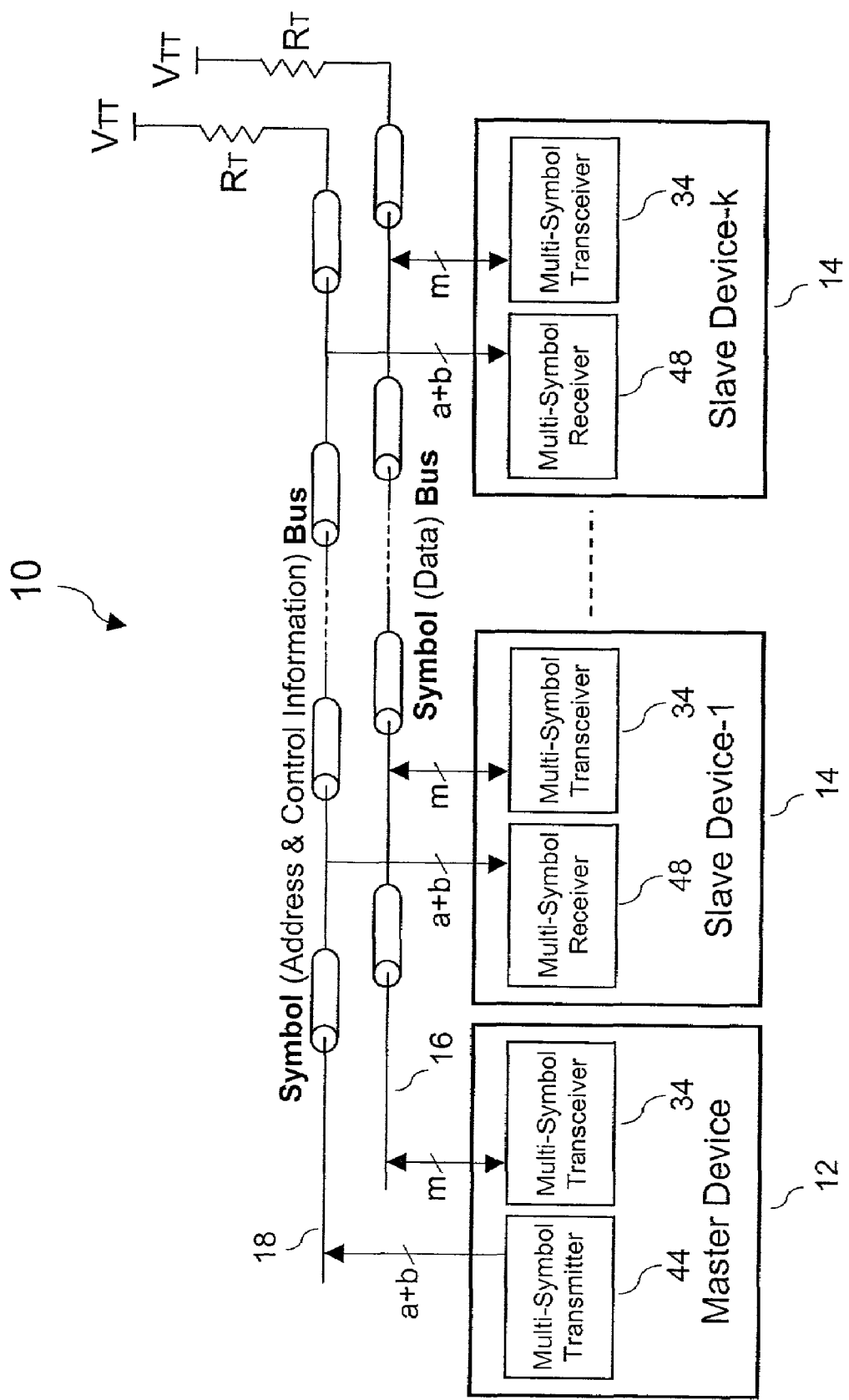
FIG. 1 illustrates an exemplifying architecture in which a multi-symbol signaling technique, in accordance with an embodiment of the present invention, can be used.

The preferred embodiments of the present invention and their advantages are best understood by referring to FIGS. 1 through 22 of the drawings. In these drawings, like numerals are used for like and corresponding parts.

The present invention, in various embodiments, implements a multi-symbol signaling technique for the transfer of data and information from an originating element to a destination element, each of which can be some electrical device (e.g., computer, electrical component, IC device, node, etc.). In this technique, a number of symbols are used to transfer or convey bits of data/information in a signal. In one embodiment, each symbol transfers multiple bits of data/information. The symbols for transferring data/information may be selected from a symbol set. The symbol set includes a number of symbols which, in one embodiment, may be defined by respective, unique combinations of signal region, transition of the carrier signal within a region, lack of transition of the carrier signal, and cross-over between signal regions. A region can be, for example, any signal level above a predetermined voltage (an upper region) or, alternatively, any signal level below a predetermined voltage (a lower region). A transition can be, for example, a rise from a lower signal level to a higher signal level (a rising transition) or, alternatively, a drop from a higher signal level to a lower signal level (a falling transition). A lack of transition can be, for example, no change in signal level. A cross-over between signal regions can be, for example, a transition from a signal level in one region to a signal level in another region.

In one embodiment, the originating element outputs a transmission signal with the symbols. When the transmission signal is received by the destination element, it is sampled multiple times (i.e., "multi-sampled") for each symbol. This obtains at least a first and a second sampled values. The first and second sampled values are compared against each other to determine the defining transition (if any) of the symbol. For example, assuming that the first sample is taken before the second sample, if the first sampled value is greater than the second sampled value, then the transition is falling. On the other hand, if the first sampled value is less than the second sampled value, then the transition is rising. If the first sampled value is approximately the same as the second sampled value, there is no transition. In addition, the two sampled values are averaged and further processed to create a "Q+av" and a "Q−av," which may serve as "predetermined" voltages. Q+av and a Q−av are then considered against each other. If the value of Q+av is greater than the value of Q−av, then the symbol lies within the upper region. If the value of Q+av is less than the value of Q−av, then the symbol lies within the lower region. If the value of Q+av is approximately the same as Q−av, the symbol transitions between regions. Once the transition (or lack of transition) and region(s) for the symbol are determined, the symbol can be identified and then interpreted to recover the corresponding data/information.

Embodiments of the present invention incorporate aspects of systems, methods, and techniques disclosed in U.S. patent application Ser. No. 09/617,592 filed on Jul. 18, 2000, entitled "System and Method For Multi-Symbol Interfacing," which is assigned to the present Assignee and incorporated herein by reference.

Architecture

FIG. 1 illustrates an exemplifying architecture 10 in which a multi-symbol signaling technique, according to an embodiment of the present invention, can be used. As depicted, architecture 10 includes a master device 12 and one or more slave devices 14. Master device 12 and slave devices 14 are electronic devices connected in a master/slave distributed system. Master device 12 controls this distributed system. Master device 12 can communicate with each of slave devices 14, and also with other master devices (not shown). Each of slave devices 14 can only communicate with master device 12. Each of master device 12 and slave devices 14 can be any suitable electronic device, such as, for example, a computer, an electronic component, an integrated circuit (IC) device, a conductive node, etc.

To provide a context for the present invention, the remainder of this description will primarily describe master device 12 and slave devices 14 as IC devices. In particular, master device 12 may be described as a processing device, and slave devices 14 may be described as memory devices. As a processing device, master device 12 generally functions to process data and other information, which may be transferred to and from other devices for control, addressing, and other operations. A processing device may comprise a microcontroller, a microprocessor, a central processing unit (CPU), a co-processor, a peripheral controller, a graphic controller (two-dimensional or three-dimensional), a mass storage controller, or other semiconductor chip for processing data and information. As a memory device, each slave device 14 generally functions to store the data and other information. For this purpose, each slave device 14 can be any suitable IC memory including dynamic random access memory (DRAM), static random access memory (SRAM), non-volatile random access memory (NVRAM), and read only memory (ROM), such as erasable programmable ROM (EPROM), electrically erasable programmable ROM (EEPROM), and flash memory. Master device 12 and slave devices 14 can each be implemented as a separate monolithic, semiconductor device. Master device 12 and slave devices 14 can each be separately packaged in suitable packaging (e.g., plastic, ceramic, micro-ball grid array (MBGA), or chip scale package (CSP)) with suitable leads or other connecting points extending therefrom (not shown). Alternatively, master device 12 and slave devices 14 can be combined within a single package. It should be understood, however, that the invention is not so limited, but rather, has applicability in other contexts in which data and information must be communicated between two or more electronic devices. For example, the originating and destination elements, can be formed on a single monolithic, semiconductor device.

Data and information may be transferred or communicated between master device 12 and slave devices 14. For any given transfer of data/information, the device originating the data/information is considered to be the originating element, and the device for which the data/information is destined is considered to be the destination element.

The transfer of data/information may occur through one or more suitable lines, links, connectors, or channels. In this context, the channels may be implemented in a symbol bus 16 (for data) and a symbol bus 18 (for address and control information). These buses connect master device 12 and slave devices 14. As used herein, the terms "connected," "coupled," or any variant thereof, mean any connection or coupling, either direct or indirect, between two or more elements; the connection or coupling can be logical or physical. Symbol bus 16 (for data) may have a bus width of m bits. Symbol bus 18 (for address and control information) may have a bus width of a+b bits.

In this exemplifying context, symbol buses 16 and 18 may each comprise one or more traces on a printed circuit board (PCB). Each of the buses 16 and 18 may implement a suitable connection between electronic devices. Such connection can be, for example, a specialized connection (e.g., MX-ARC DDR) or an industry standard bus connection (e.g., a PC-100, PC-133, PC-200, or PC-266 DDR). Symbol buses 16 and 18 are each provided with a termination resistor ($R_T$) connected to a termination voltage source ($V_{TT}$). The termination resistors serve as a pull-up resistors to match bus impedance, thus minimizing signal reflection on the respective buses. The termination voltage source ($V_{TT}$) may serve as a predetermined voltage, which can be used as a reference.

Numerous signals (generated within or received by any of master device 12 or slave devices 14) convey, or control or coordinate the conveyance of, data/information to and from the devices via buses 16 and 18. In the present context, these signals include data signals for conveying data, addressing signals for identifying specific memory cells into and from which data is to be written or read, and control signals for coordinating or controlling the access, reading, and/or writing of the data.

According to an embodiment of the present invention, a multi-symbol signaling technique can be used for the signaling. In this technique, a number of symbols are used to transfer or convey bits of data/information in a signal from one electronic device to another. Each symbol may be uniquely defined or characterized by a particular combination of signal region, transition within a signal region or between signal regions in signal value, or lack of transition. A region can be, for example, a region above a predetermined voltage (e.g., a termination voltage ($V_{TT}$) of the carrier channel) or, alternatively, a region below the predetermined voltage. A transition can be, for example, a rise from a lower signal level to a higher signal level (a positive slope), or alternatively, a drop from a higher signal level to a lower signal level (a negative slope). Either transition (rising or dropping) can be considered to be an alternating current (AC) level. A lack of transition can be considered to be a direct current (DC) level. Each symbol may transfer multiple bits of data/information in a single clock (CLK) cycle.

In one embodiment, to determine the defining transition (or lack of transition) of a symbol, at least two samples of signal value may be taken from the carrier signal (i.e., "multi-sampling"). The two sampled signal values are then compared. If the first sampled signal value is lower than the second sampled signal value, there is a rising transition in the symbol. Alternatively, if the first sampled signal value is higher than the second sampled signal value, there is a falling transition in the symbol. If the first sampled signal value is approximately the same as the second sampled signal value, there is no transition. In addition, to determine the defining region of a symbol, the two sampled signal values are averaged and then considered against the value of the predetermined voltage. If the average value of the two samples is greater than the predetermined voltage value, then the symbol lies within the upper region. If the average value of the two samples is less than the predetermined voltage value, then the symbol lies within the lower region. If the average value of the two samples is approximately the same, then there is no transition from one region into another. Once the region, transition within a region or across regions, or lack of transition for the symbol is determined, the symbol can be identified and then interpreted to recover the corresponding data/information.

A technical advantage of the present invention includes encoding data using symbols which can be interpreted without reference to absolute values. This is accomplished by defining symbols with signal transitions, lack of transitions, and signal regions. To recover at least a portion of the data, two samples of signal level are taken for each symbol. For each sample, two differentials are generated. The differentials are compared against each other. The relative positioning (i.e., higher or lower) of the differentials is considered in determining how to decode data. To recover another portion of data, each set of differentials is averaged. The averages are then considered against each other in determining how to decode the data. Because the decoding of symbols is not accomplished using absolute reference levels, this multi-symbol signaling technique is not as susceptible as previously developed techniques to the problems associated with signal drift and individual line characteristics. Accordingly, the present invention provides for accurate data recovery.

To implement the multi-symbol signaling technique in architecture 10, master device 12 and slave devices 14 each comprise a multi-symbol transceiver 34 connected to symbol bus 16 for conveying data signals. Furthermore, master device 12 may include a multi-symbol transmitter 44 and slave devices 14 may each comprise a multi-symbol receiver 48 for transmitting and receiving control and address information signals. In one embodiment, each multi-symbol transceiver 34 may comprise a multi-symbol transmitter 44 and a multi-symbol receiver 48. Multi-symbol transceivers 34, multi-symbol transmitter 44, and multi-symbol receivers 48 are described below in more detail.

Multi-Symbol Signaling Scheme

Figure 2A:
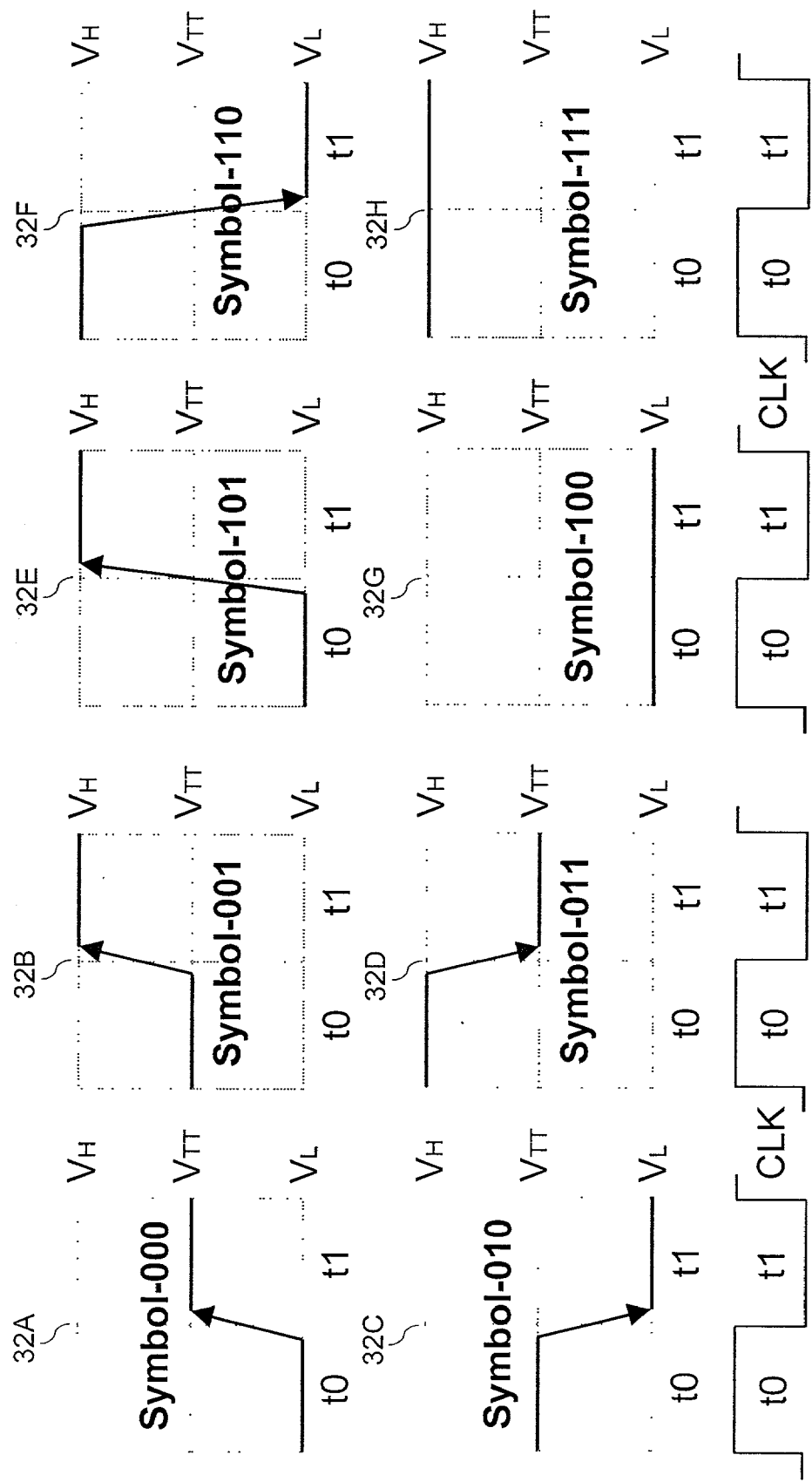

FIG. 2A illustrates an exemplifying embodiment for a multi-symbol signaling scheme, according to an embodiment of the present invention. Multi-symbol signaling scheme can be used to transfer data and information between an originating element and a destination element.

The multi-symbol signaling scheme uses a symbol set comprising a plurality of symbols 32, which are separately referred to by reference numerals 32A, 32B, 32C, 32D, 32E, 32F, 32G, and 32H. These symbols 32 are separately designated "symbol-000," "symbol-001," "symbol-010," "symbol-011," "symbol 101," "symbol 110,". "symbol 100," and "symbol 111." Each symbol 32 can be carried or appear as a waveform in a carrier signal.

Each symbol 32 is uniquely defined by signal region, transition of signal level within or between signal regions, or lack of transition of signal level. As depicted, three signal levels are available in the carrier signal. These levels, in increasing order, are as follows: voltage low ($V_L$), bus termination voltage ($V_{TT}$), and voltage high ($V_H$). In one embodiment, the value of $V_L$ can be $V_{TT}$ minus $\Delta V$, and the value of $V_H$ can be $V_{TT}$ plus $\Delta V$, where $\Delta V$ is selected so that there is sufficient signal-to-noise ratio to properly receive the carrier signal for a given channel (or bus).

A transition of signal level can be either rising from one signal level to another or falling from one signal level to another. Referring to the depicted symbols 32, symbol-000, symbol-001, and symbol-101 are each defined in part by a rising transition. In particular, in symbol-000, there is a rising transition from $V_L$ to $V_{TT}$; in symbol-001, there is a rising transition from $V_{TT}$ to $V_H$; and in synbol-101, there is a rising transition from $V_L$ to $V_H$. In like manner, symbol-110, symbol-010, and symbol-011 are each defined in part by a falling transition. In particular, in symbol-010, there is a falling transition from $V_{TT}$ to $V_L$; in symbol-011, there is a falling transition from $V_H$ to $V_{TT}$; and in symbol-110, there is a falling transition from $V_H$ to $V_L$. In symbol-100 and symbol-111, there is no transition.

A signal region may be generally characterized as a region above or below a particular demarcation signal level, or as a region between two demarcation signal levels. As depicted, an upper region may be defined as a region lying above a demarcation of the $V_{TT}$ signal level, or alternatively, as a region between the demarcations of the $V_{TT}$ and $V_H$ signal levels. A lower region may be defined as a region lying below the demarcation of the $V_{TT}$ signal level, or alternatively, as a region between the demarcations of the $V_{TT}$ and $V_L$ signal levels. Referring to the depicted symbols, symbol-000 and symbol-010, and symbol-100 each lie within the lower region (i.e., below $V_{TT}$, or between $V_L$ and $V_{TT}$). Symbol-001, symbol-011, and symbol-111 lie within the upper region (i.e., above $V_{TT}$, or between $V_{TT}$ and $V_H$). Symbol-101 and symbol-111 transition between the upper and lower regions.

With the signal level transitions, lack of transition, and signal regions described above, each symbol 32 may be uniquely defined by a particular combination of region, transition within or between regions, or lack of transition. That is, symbol-000 is uniquely defined by a rising transition and lying within the lower region. Symbol-001 is uniquely defined by a rising transition and lying within the upper region. Symbol-010 is uniquely defined by a falling transition and lying within the lower region. Symbol-011 is uniquely defined by a falling transition and lying within the upper region. Symbol-101 is uniquely defined by a rising transition which crosses from the lower region into the upper region. Symbol-110 is uniquely defined by a falling transition which crosses from the upper region into the lower region. Symbol-100 is uniquely defined by a lack of transition and lying within the lower region. Symbol-111 is uniquely defined by a lack of transition and lying within the upper region. This is reflected in a table 28 shown in FIG. 2B.

Each symbol 32 may be transferred in a single clock (CLK) cycle. Any defining transition of each symbol may occur approximately halfway through the clock cycle (and thus may coincide with a rising or falling edge of the clock signal). In order to identify a symbol, a first sample may be taken of a carrier signal during a first time period t0 (which can be the first half of a clock cycle) and a second sample may be taken of the carrier signal during a second time period t1 (which can be the second half of the same clock cycle).

Because the upper and lower regions can be characterized by the signal levels of $V_L$, $V_{TT}$, and $V_H$, each symbol 32 may be alternatively defined and identified by the respective signal levels occurring at the first and second halves of a clock signal. That is, symbol-000 is uniquely defined by a signal level $V_L$ at time period t0 and a signal level $V_{TT}$ at time period t1. Symbol-001 is uniquely defined by a signal level $V_{TT}$ at time period t0 and a signal level $V_H$ at time period t1. Symbol-010 is uniquely defined by a signal level $V_{TT}$ at time period to and a signal level $V_L$ at time period t1. Symbol-011 is uniquely defined by a signal level $V_H$ at time period t0 and a signal level $V_{TT}$ at time period t1. Symbol-101 is uniquely defined by a signal level $V_L$ at time period t0 and a signal level $V_H$ at time period t1. Symbol-110 is uniquely defined by a signal level $V_H$ at time period t0 and a signal level $V_L$ at time period t1. Symbol-100 is uniquely defined by a signal level $V_L$ at both time periods t0 and t1. Symbol-111 is uniquely defined by a signal level $V_H$ at both time periods t0 and t1. This is reflected in a table 28 shown in FIG. 2B.

Each symbol 32 may be used to transfer multiple bits of data/information. In the depicted embodiment, each symbol 32 transfers three bits of data/information. These bits may be referred to as "D0," D1," and "D2." Table 26 provides an exemplifying encoding for the bits D0 and D1 as conveyed by symbol-000, symbol-001, symbol-010, symbol-011, symbol-100, symbol-101, symbol-110, and symbol-111. In particular, symbol-000 transfers a "low" or logic-0 value for each of D0, D1, and D2. Symbol-001 transfers a "high" or logic-1 value for D0 and a "low" or logic-0 value for each of D1 and D2. Symbol-010 transfers a "low" or logic-0 value for each of D0 and D2 and a "high" or logic-1 value for D1. Symbol-011 transfers a "high" or logic-1 value for each of D0 and D1 and a "low" or logic-0 value for D2. Symbol-100 transfers a "high" or logic-1 value for D2 and a "low" or logic-0 value for each of D1 and D0. Symbol-01 transfers a "high" or logic-1 value for each of D0 and D2 and a "low" or logic-0 value for D1. Symbol-110 transfers a "high" or logic-1 value for each of D2 and D1 and a "low" or logic-0 value for D0. Symbol-111 transfers a "high" or logic-1 value for each of D0, D1, and D2.

In one embodiment, as depicted, the symbols 32 of the symbol set are collectively capable of representing any combination of values for at least three bits of data, but each symbol 32 of the symbol set is defined with at most one transition of signal level in the carrier signal. That is, referring to FIGS. 2A and 2B, each of Symbol-000, Symbol-001, and Symbol-101 is defined in part by a single rising transition; no other transition is present. Likewise, each of Symbol-010, Symbol-011, and Symbol-110 is defined in part by a single falling transition; no other transition is present. Each of Symbol-100 and Symbol-111 is defined in part by a no transition at all.

An advantage of the some embodiments of present invention includes defining a symbol in part by a transition of signal level, rather than an actual value for a signal level. If the actual values for signal levels drift together (e.g., $V_L$, $V_{TT}$, and $V_H$ either all move up or all move down), then the transition in signal level is independent of the actual values.

For example, even if the value of $V_L$ rises by 0.5 v, it will always be lower than $V_{TT}$ if the value of $V_{TT}$ rises in the same way (i.e., by 0.5 v).

Furthermore, even if the actual values for signal levels do not drift together (e.g., $V_L$ may move up while $V_{TT}$ moves down), the transition in signal level can still be determined in all but the most severe cases. That is, the transition can be determined as long as the voltage difference between $V_H$ and $V_{TT}$, and between $V_{TT}$ and $V_L$, is greater than $\Delta V$. $\Delta V$ is determined by the channel characteristics and the sensitivity of various elements of the multi-symbol transceiver 34 (as described herein). For most applications, as long as $V_H$ is 100 mV higher than $V_{TT}$, and $V_{TT}$ is 100 mV higher than $V_L$, the symbols in the carrier signal can be read or interpreted properly.

Another advantage of the some embodiments of the present invention includes a symbol set which can represent any combination of values for at least three bits of data with a respective symbol defined with, at most, one transition of signal level in the carrier signal. This means that, at most, two signal levels are present for any given symbol of the symbol set. As such, any given symbol only needs to be sampled twice in order to identify the transition and/or signal level(s).

Thus, the multi-symbol signaling technique of the present invention provides highly robust capability to reject common-mode noise, as well as insensitivity to DC level drift in a carrier signal. Accordingly, the signaling technique supports reading of a signal with small margins at very high speed.

Master Device

Figure 3:
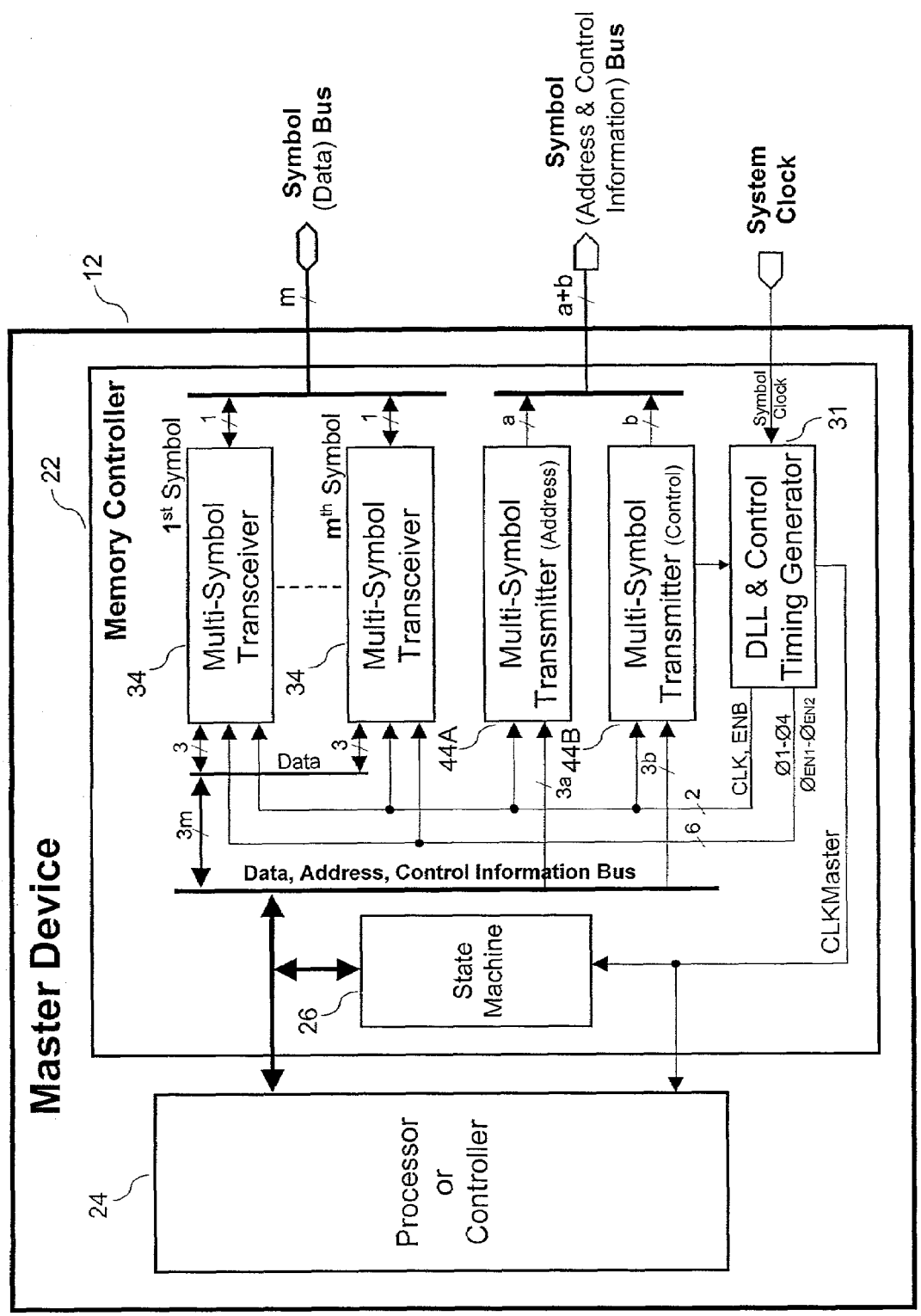
FIG. 3 is a block diagram of a master device having circuitry for implementing the multi-symbol signaling technique, in accordance with an embodiment of the present invention.

FIG. 3 is a block diagram of a master device 12 having circuitry for implementing the multi-symbol signaling technique, in accordance with an embodiment of the present invention. As shown, master device 12 is implemented as a processing device.

Master device 12 transfers data and other information to and from, for example, a slave device 14, for control, addressing, processing, and other operations. As depicted, master device 12 includes a memory controller 22 coupled to a processor 24. Processor 24 functions to process data and other information, which may be transferred to and from the memory device for control, addressing, and other operations. Memory controller 22 directs the transfer of data/information between processor 24 and one or more slave devices 14.

Memory controller 22 includes a state machine 26, a delay locked loop (DLL) and control timing generator 31, m-number of multi-symbol transceivers 34, and a plurality of multi-symbol transmitters 44 (separately labeled 44A and 44B). State machine 26 may generate necessary interface control timings and addresses to perform one or more predetermined logical operations on data. These operations place state machine 26 in various states which control the input/output of data to and from master device 12.

DLL and control timing generator 31 receives an input system clock signal, which serves as symbol clock within master device 12. DLL and control timing generator 31 generates a number of clock, phase, and other signals. These signals include a clock (CLK) signal, an enable (ENB) signal, a phase Ø1 signal, a phase Ø2 signal, a phase Ø3 signal, a phase Ø4 signal, a phase $Ø_{EN1}$ signal, a phase $Ø_{EN2}$ signal, and a master clock CLKMaster signal. These signals are used in master device 12 for timing, synchronization, and other things.

For example, the clock (CLK) signal can be used for encoding data/information according to the multi-symbol signaling technique described herein. In one embodiment, the symbol clock runs at one-half the frequency of the clock (CLK) signal, thereby facilitating the design and implementation of DLL and control timing generator 31.

Each multi-symbol transceiver 34 and multi-symbol transmitter 44 is coupled to DLL and control timing generator 31 and receives one or more of the signals therefrom. Each multi-symbol transceiver 34 functions, among other things, to encode data being sent out of master device 12 into one or more symbols, drive outgoing signals, sample incoming signals, and reformat or recover data from the sampled incoming signals. Multi-symbol transceivers 34 transmit and receive signals on an m-bit Symbol bus. Each multi-symbol transmitter 44 functions to encode information being sent out of master device 12 into one or more symbols and drive outgoing signals. Multi-symbol transmitter 44A may be provided for address information and multi-symbol transmitter 44B may be provided for control information. Multi-symbol transmitters 44A, 44B transmit signals on a Symbol bus which may be a+b bits wide.

DLL and control timing generator 31, multi-symbol transceivers 34, and multi-symbol transmitters 44A, 44B of master device 12 cooperate to provide an interface for the input and output of data/information to and from master device 12. According to an embodiment of the present invention, DLL and control timing generator 31, multi-symbol transceivers 34, and multi-symbol transmitters 44A, 44B implement the multi-symbol signaling technique described herein.

Slave Device

Figure 4:
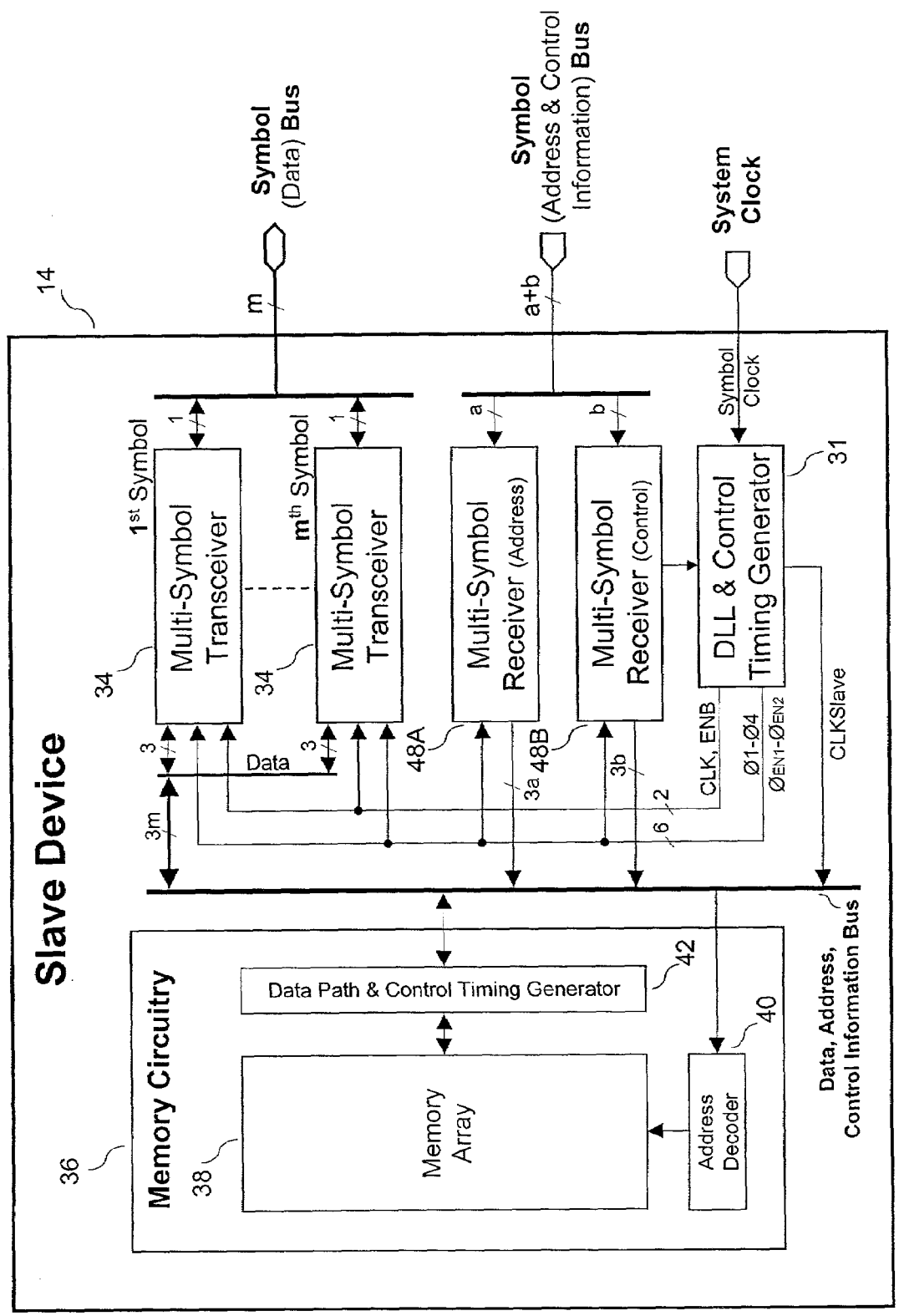
FIG. 4 is a block diagram of a slave device having circuitry for implementing the multi-symbol signaling technique, in accordance with an embodiment of the present invention.

FIG. 4 is a block diagram of a slave device 14 having circuitry for implementing the multi-symbol signaling technique, in accordance with an embodiment of the present invention. Slave device 14 can be implemented as a memory device. As depicted, slave device 14 includes DLL and control timing generator 31, m-number of multi-symbol transceivers 34, a plurality of multi-symbol receivers 48 (separately labeled 48A and 48B), and memory circuitry 36.

Memory circuitry 36 comprises a memory array 38. Memory array 38 includes a plurality of memory cells (not shown), each of which functions to maintain data. In particular, separate bits of data may be written into, stored, and read out of each of these memory cells. The memory cells may be fabricated in any suitable technology, such as metal-oxide semiconductor (MOS) technology, according to techniques well-known and understood by those skilled in the art of IC memory.

Further, these memory cells of memory array 38 can be organized in any suitable structure, such as, for example, a matrix of rows and columns. A typical architecture connects all cells in a row to a common row line, often referred to as a "word line," and all cells in a column to a common column line, often referred to as a "bit line." Any suitable addressing scheme, such as row-column (i.e., X-Y coordinate) addressing or content-addressing, can be used to access the memory cells within memory array 38.

Memory circuitry 36 also comprises address decoder circuitry 40 and other circuitry 42 which support the storage, maintenance, and/or access of information in the memory cells of memory array 38. For example, address decoder circuitry 40 may include a number of row address buffers, column address buffers, row decoders, column decoders, and the like for accessing the various memory cells. Furthermore, circuitry 42 may include various timing generators, such as an output enable (OE) clock generator and a write enable (WE) clock generator, for enabling the reading and writing of data out of and into the memory cells. Circuitry 42 may also include circuitry for controlling and providing a data path for the transfer of data.

DLL and control timing generator 31 receives an input system clock signal, which serves a symbol clock within slave device 14. DLL and control timing generator 31 generates a number of clock, phase, and other signals. These signals include a clock (CLK) signal, an enable (ENB) signal, a phase Ø1 signal, a phase Ø2 signal, a phase Ø3 signal, a phase Ø4 signal, a phase $Ø_{EN1}$ signal, a phase $Ø_{EN2}$ signal, and a slave clock CLKSlave signal. These signals can be used in slave device 14 for timing, synchronization, and other tasks.

As with master device 12, for example, the clock (CLK) signal can be used in slave device 14 for encoding data/information according to the multi-symbol signaling technique described herein. In one embodiment, the symbol clock runs at one-half the frequency of the clock (CLK) signal, thereby facilitating the design and implementation of DLL and control timing generator 31.

Each multi-symbol transceiver 34 and multi-symbol receiver 48 is coupled to DLL multi-symbol transceiver 34 functions, among other things, to encode data being sent out of slave device 14 into one or more symbols, drive outgoing signals, sample incoming signals, and reformat or recover data from the sampled incoming signals. Multi-symbol transceivers 34 transmit and receive signals on an m-bit Symbol bus. Each multi-symbol receiver 48 functions to receive incoming signals and recover information from one or more symbols contained therein. Multi-symbol receiver 48A may be provided for address information and multi-symbol receiver 48B may be provided for control information. Multi-symbol receivers 48A, 48B receive signals from a Symbol bus which may be a+b bits wide.

DLL and control timing generator 31, multi-symbol transceivers 34, and multi-symbol 115 receivers 48A, 48B of slave device 14 cooperate to provide an interface for the input and output of data/information to and from slave device 14. According to an embodiment of the present invention, DLL and control timing generator 31, multi-symbol transceivers 34, and multi-symbol receivers 48A, 48B implement the multi-symbol signaling technique described herein.

Multi-Symbol Transceiver

Figure 5:
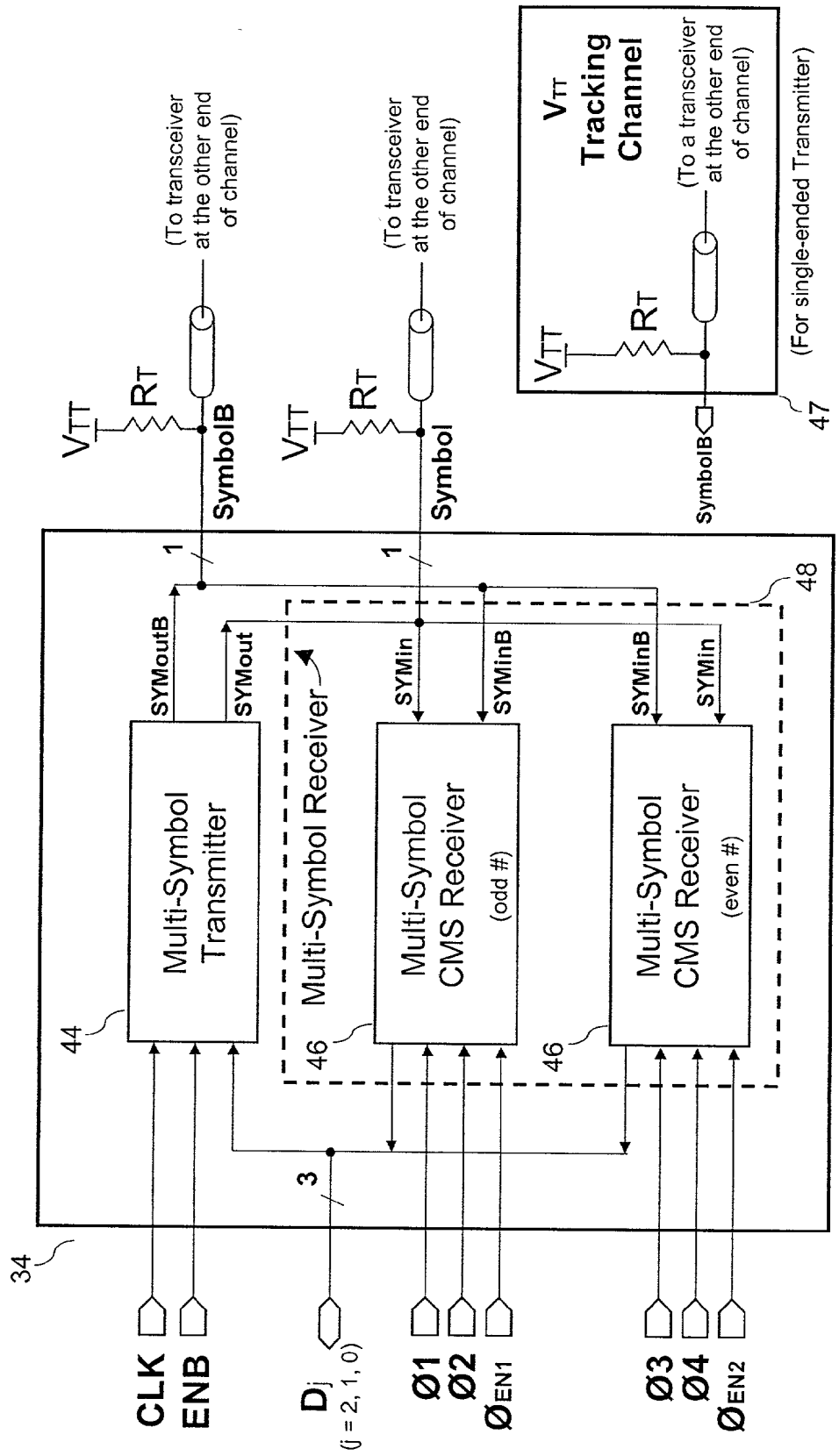
FIG. 5 is a block diagram of a multi-symbol transceiver, in accordance with an embodiment of the present invention.

FIG. 5 is a block diagram of a multi-symbol transceiver 34, according to an embodiment of the present invention. Multi-symbol transceiver 34 may be incorporated into any suitable electronic device which may act as an originating device or a destination device. This includes the master device 12 and slave devices 14 described above. As depicted, multi-symbol transceiver 34 includes a multi-symbol transmitter 44 and a multi-symbol receiver 48. Multi-symbol receiver 48 comprises two multi-symbol correlated multi-sampling (CMS) receivers 46.

Multi-symbol transceiver 34 converts between one or more streams of data $D_j$ and a Symbol transmission signal. Data $D_j$ may comprise a number of data bits (in series or parallel data format), each of which can have value of logic-1 or logic-0. Data $D_j$ can be carried over a three-bit wide bus (j=2,1,0) into and out of multi-symbol transceiver 34. The Symbol signal is a transmission signal in which the data bits are represented by a number of transmission symbols from a symbol set described herein (e.g., symbol-000, symbol-001, symbol-010, symbol-011, symbol-100, symbol-101, symbol-110, and symbol-111 shown in FIG. 2A), each symbol of the symbol set being uniquely defined by a particular combination of region, signal level transition within a region or between regions, or lack of transition. The Symbol signal can be either transmitted from or received by the electronic device into which multi-symbol transceiver 34 is incorporated. The Symbol signal is carried over a Symbol line into and out of multi-symbol transceiver 34.

In one embodiment, as depicted, multi-symbol transceiver 34 outputs and receives a SymbolB signal, which is the differential for the Symbol signal. The differential SymbolB signal is carried on a separate SymbolB line, which may be combined with the Symbol line in a twisted pair configuration. In a printed circuit board context, the Symbol signal and the differential SymbolB signal are carried on respective traces. The differential SymbolB signal carried over the SymbolB line serves to reduce the effects of electromagnetic interference (EMI) on the Symbol line. In an alternate embodiment, multi-symbol transceiver 34 may utilize a single-ended Symbol signal (i.e., without a differential SymbolB signal and separate SymbolB line).

For a Symbol signal transmitted out of the electronic device, multi-symbol transmitter 44 formats or encodes data $D_j$ as symbols in an outgoing signal, controls the slew rate of the signal, and drives the signal. With the encoded symbol format, data $D_j$ can be transmitted across a Symbol bus (connecting a plurality of electronic devices) at very high data rate and more reliably than with previously developed technologies and techniques. Multi-symbol transmitter 44 receives a clock (CLK) signal (which is derived from and synchronized with a system clock) and an enable (ENB) signal. As depicted, multi-symbol transmitter 44 outputs SYMout for the outgoing Symbol signal, and may generate and output a differential SYMoutB for a respective outgoing differential SymbolB signal.

An exemplifying embodiment for a multi-symbol transmitter 44 supporting or using a single-ended Symbol signal is shown and described with reference to FIG. 6A. An exemplifying embodiment for a multi-symbol transmitter 44 supporting or using both a Symbol signal and respective differential SymbolB signal is shown and described with reference to FIG. 6B.

For a Symbol signal received by the electronic device, multi-symbol receiver 48 may receive the incoming Symbol signal as SYMin and the differential SymbolB signal as SYMinB. Multi-symbol receiver 48 samples the incoming Symbol signal and recovers the real data $D_j$ using the sampled values. In one embodiment, each multi-symbol CMS receiver 46 samples the incoming Symbol signal multiple times to detect a signal transition (if any) and a signal region (or cross between regions) for each symbol in the signal. The format of data $D_j$ can be either double data rate (DDR) format (if the clock (CLK) signal is twice the frequency of the system clock signal) or single data rate (SDR) format (if the clock (CLK) signal is the same frequency as the system clock signal).

One of the multi-symbol CMS receivers 46 may operate on one part of an incoming Symbol transmission signal, while the other may operate on another part of the incoming Symbol signal. For example, the data $D_j$ (represented by corresponding symbols within the Symbol signal) may be divided equally based upon positioning in a stream or sequence. Data $D_j$ at odd-numbered positions in the sequence (i.e., first, third, fifth, etc. positions) are recovered by the first multi-symbol CMS receiver 46. Data $D_j$ at even-numbered positions in the sequence (i.e., second, fourth, sixth, etc. positions) are recovered by the second multi-symbol CMS receiver 46.

Each multi-symbol CMS receiver 46 can be timed with one or more phase (Ø) signals. As shown, one multi-symbol CMS receiver 46 receives a Ø1 signal, a Ø2 signal, $Ø_{EN1}$ signal, while the other multi-symbol CMS receiver 46 receives a Ø3 signal, a Ø4 signal, $Ø_{EN2}$ signal. Each multi-symbol CMS receiver 46 may receive a voltage signal of a predetermined voltage, such as, for example, a bus termination voltage ($V_{TT}$) signal.

A $V_{TT}$ tracking channel circuit 47 outputs the bus termination voltage ($V_{TT}$) signal through a termination resistor $R_T$. The bus termination voltage ($V_{TT}$) signal with a termination resistor $R_T$ can be used to emulate or track the physical characteristics of the channel over which the incoming Symbol signal is received.

For an embodiment of multi-symbol transmitter 44 supporting or using a single-ended Symbol signal, the $V_{TT}$ tracking channel circuit 47 is used to provide the SymbolB signal to the SYMinB input of multi-symbol CMS receiver circuits 46 of a destination element. In this case, the voltage value for the SymbolB is approximately $V_{TT}$. For an embodiment for a multi-symbol transmitter 44 supporting or using both a Symbol signal and respective differential SymbolB signal, the SYMoutB signal from multi-symbol transmitter 44 is fed to the SYMinB input of the multi-symbol CMS receiver circuits 46 of a destination element.

Multi-Symbol Transmitter

Figure 6A:
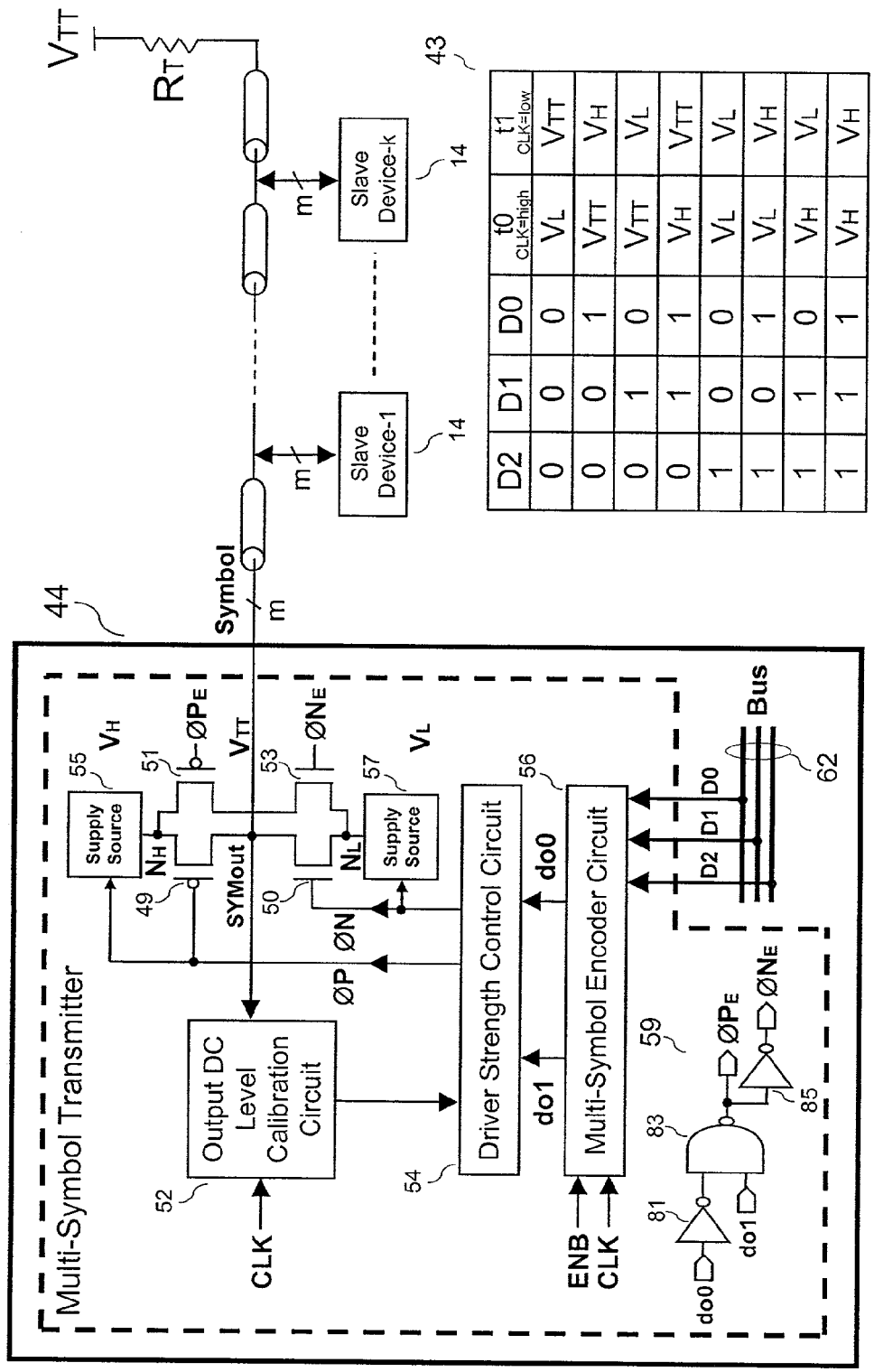
FIG. 6A is a block diagram of one embodiment for a multi-symbol transmitter and a corresponding truth table, in accordance with an embodiment of the present invention.

FIG. 6A is a schematic diagram, in partial block form, of a multi-symbol transmitter 44, according to an embodiment of the present invention. Multi-symbol transmitter 44 can be incorporated into an electronic device, such as, for example, a processing device or memory device. Multi-symbol transmitter 44 may be a part of a multi-symbol transceiver 34. This embodiment of multi-symbol transmitter 44 supports or utilizes a single-ended Symbol signal which is output over a respective Symbol line to an appropriate receiver.

Multi-symbol transmitter 44 receives a clock (CLK) signal and an enable (ENB) signal. The clock (CLK) signal may run at twice the frequency of symbol (system) clock. Multi-symbol transmitter 44 operates on one or more streams of data to be output from the electronic device. The data stream (which is synchronized with the clock (CLK) signal) may include a number of data bits, each of which can be a logical value of either "0" (logic-0) or "1" (logic-1). This data may be received by multi-symbol transmitter 44 in input data signals D0, D1, and D2 carried on a three-bit wide bus 62 for this embodiment.

As shown, multi-symbol transmitter 44 includes an output DC level calibration circuit 52, a driver strength control circuit 54, a multi-symbol encoder circuit 56, a first supply source 55, a second supply source 57, and a stabilization control circuit 59. These circuits and supply sources cooperate to generate a Symbol transmission signal for transferring data D0, D1, and D2 out of the electronic device (which then would be acting as an originating device). If a serial-to-parallel conversion stage is added in between the bus 62 and multi-symbol encoder circuit 56, then the data bits on bus 62 can be in serial format instead of parallel format.

Multi-symbol encoder circuit 56 encodes incoming data D2, D1, and D0 (appearing on bus 62) according to an embodiment of the multi-symbol signaling technique described herein. More specifically, for each set of bits D0, D1, and D2 on bus 62, multi-symbol encoder circuit 56 generates a respective transmission symbol from the symbol set (comprising, for example, symbol-000, symbol-001, symbol-010, symbol-011, symbol-100, symbol-101, symbol-110, and symbol-111). Each symbol of the symbol set is uniquely defined by a particular combination of signal level transition, lack of transition, signal region, or crossover between signal regions in the carrier Symbol signal. Furthermore, as previously described, each symbol may be alternatively defined by signal levels (e.g., $V_L$, $V_{TT}$, and $V_H$) occurring at respective halves (e.g., time periods t0 and t1) of a clock signal. This is depicted in truth table 43 of FIG. 6A. In one embodiment, multi-symbol encoder circuit 56 encodes the incoming data D2, D1, and D0 according to the table 61 shown in FIG. 7B. Multi-symbol encoder circuit 56 receives as input signals D0, D1, D2, CLK, and ENB. Multi-symbol encoder circuit 56 outputs output data signals do0 and do1. When the ENB signal is low, multi-symbol transmitter 44 is enabled so that a symbol transfer cycle may begin.

Driver strength control circuit 54, coupled to multi-symbol encoder circuit 56, receives the do0 and do1 signals therefrom. Driver strength control circuit 54 also receives a signal from output DC level calibration circuit 52. Driver strength control circuit 54 generates a pair of control signals (ØP and ØN). Control signal ØP has the same logic polarity as output data signal do1. Control signal ØN has the same logic polarity as output data signal do0. In general, driver strength control circuit 54 functions to regulate or control the signal levels (e.g., $V_L$ and $V_H$) of the Symbol signal for transmitting the symbols via a suitable channel. To accomplish this, driver strength control circuit 54 may control a suitable driver circuit (described below).

Stabilization control circuit 59 is also coupled to multi-symbol encoder circuit 56, and receives the do0 and do1 signals therefrom. Stabilization control circuit 59 comprises an inverter 81, a NAND gate 83, and an inverter 85. Inverter 81 receives the do0 signal. NAND gate 83 receives the output signal of inverter 81 at one input and the do1 signal at another input. NAND gate 83 outputs a control signal $ØP_E$. Inverter 85 receives the output signal of NAND gate 83 and outputs a control signal $ØN_E$. Control signals $ØP_E$ and $ØN_E$ generally serve to control circuitry which is used to stabilize particular nodes in the driver circuit of multi-symbol transmitter 44.

An exemplifying driver circuit may comprise a first transistor 49, a second transistor 50, first supply source 55, and second supply source 57. As depicted, transistor 49 comprises a PMOS transistor and transistor 50 comprises an NMOS transistor. Transistors 49 and 50 are coupled together at their drains. The source of transistor 49 is coupled to the first supply source 55 at a node $N_H$, and the source of the transistor 50 is coupled to the second supply source 57 at a node $N_L$. The gates of transistor 49 and transistor 50 receive the ØP and ØN signals, respectively. As such, the ØP and ØN signals serve as control signals for transistor 49 and transistor 50.

A pair of transistors 51 and 53 are also coupled between supply sources 55 and 57. As depicted, transistor 51 comprises a PMOS transistor and transistor 53 comprises an NMOS transistor. Transistors 49 and 50 are coupled together at their drains. The source of transistor 51 is coupled to supply source 55, and the source of the transistor 53 is coupled to supply source 57. The gate of transistor 51 receives control signal $ØP_E$ and the gate of transistor 53 receives control signal $ØN_E$. In general, these transistors 51 and 53 serve to stabilize the voltages at nodes $N_H$ and $N_L$.

In one embodiment, each of supply sources 55 and 57 can be constant current sources. In this case, transistors 49 and 50 act as "switching transistors." Transistors 49 and 51 may have the same size; transistors 50 and 53 may have the same size. Transistors 49 and 50 form the push-pull switching transistors for the multi-symbol transmitter 44.

When control signal ØP is low (GND), transistor 49 is turned on to connect the Symbol bus to supply source 55, thereby driving the Symbol bus to $V_H$ level; when control signal ØP is high (Vcc), transistor 49 is turned off. When control signal ØN is high, transistor 50 is turned on to connect the Symbol bus to supply source 57, thereby driving the Symbol bus to $V_L$ level; when control signal ØN is low, transistor 50 is turned off.

When control signal ØN is low and control signal ØP is high, the push-pull switching transistors 49 and 50 are turned off and both supply source 55 and supply source 57 are disconnected from the Symbol bus. At this moment, the predetermined voltage (e.g., termination voltage $V_{TT}$) will pull the Symbol bus to $V_{TT}$ level through termination resistor $R_T$. Supply source stabilizing transistors 51 and 53 are turned on to maintain roughly the same voltage levels at nodes $N_H$ (e.g., $Vsat_H$) and $N_L$ (e.g., $Vsat_L$), respectively, as with a previous operation for transmitting a symbol (i.e., either supply source 55 driving the bus to $V_H$ through transistor 49, or supply source 57 driving the bus to $V_L$ through transistor 50). This ensures signal integrity for the next symbol because both nodes $N_H$ and $N_L$ start at roughly the same voltage levels for each transfer operation.

Transistors 51 and 53 are controlled by signals ØPE and ØNE, respectively. These control signals ØPE and ØNE are generated by stabilization control circuit 59, which receives do0 and do1 as input signals. When the do0 signal is logic-0 and the do1 signal is logic-1 (in which case both transistors 49 and 50 are turned off), control signal ØPE is logic-0 and control signal ØNE is logic-1. This turns on transistors 51 and 53, thus forming a current path between nodes $N_H$ and $N_L$ to maintain both nodes roughly at $Vsat_H$ and $Vsat_L$, respectively.

At power up, output DC level calibration circuit 52 automatically generates test data patterns to determine proper magnitudes of current at supply source 55 and supply source 57, and proper sizes of transistors 49, 51, 50, and 53 to ensure proper DC levels of $V_H$ and $V_L$ for a given channel (i.e., Symbol bus). Transistors 49, 51, 50, and 53 may actually comprise multiple programmable transistors with the same drive strengths to give incremental DC level adjustments on the $V_H$ and $V_L$. Output DC level calibration circuit 52 registers information on the selected sizes of supply source 55 and supply source 57, and the transistor size information of transistors 49, 51, 50, and 53 in a register (not shown) contained in driver strength control circuit 54.

In operation, when the enable (ENB) signal is low, multi-symbol transmitter 44 is enabled to begin a symbol transfer cycle. During the symbol transfer cycle, multi-symbol transmitter 44 drives the Symbol bus through the push-pull driver circuit. Driver strength control circuit 54 utilizes the information contained in its size register, in combination with the do0 and do1 signals from multi-symbol encoder circuit 56, to determine the suitable strengths for the constant current sources implementing supply sources 55 and 57, and the number of transistors 49 and 50 to be used to drive the Symbol bus. The strength control is achieved by using multiples of each of control signals ØP and ØN (only shown as single signals in FIG. 6A). Control signal ØP controls transistor 49 and supply source 55, and control signal ØN controls transistor 50 supply and source 57.

In the symbol transfer cycle, multi-symbol transmitter 44 drives the Symbol bus. At the other end of the Symbol bus, termination resistor $R_T$ and termination voltage $V_{TT}$ minimize the reflection caused by the transmission line effect of the channel, thus ensuring proper signal integrity for the receivers of any device (e.g., slave device-1 to slave device-k) to read the transmitted symbols properly.

Figure 7A:
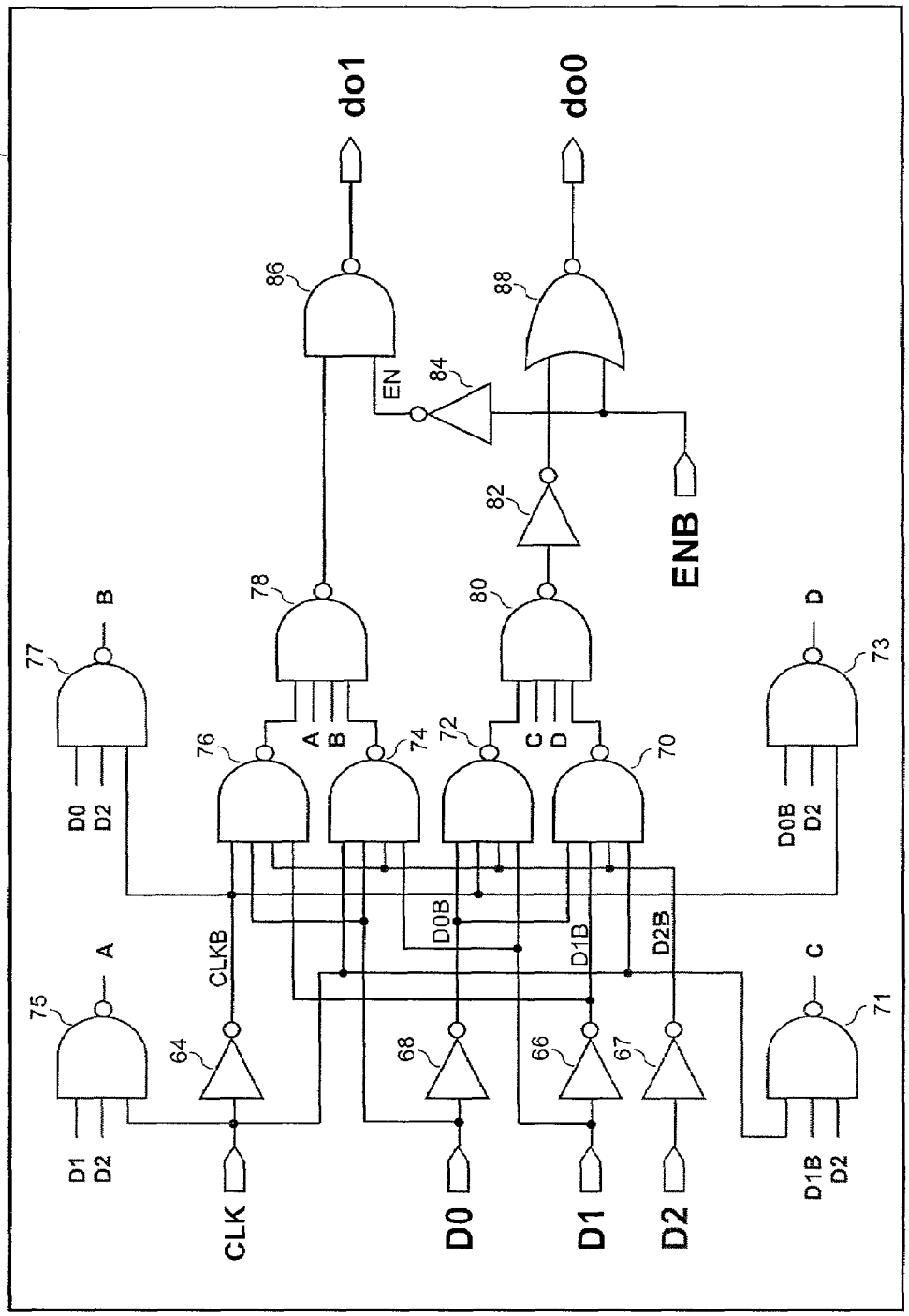
Figure 8:
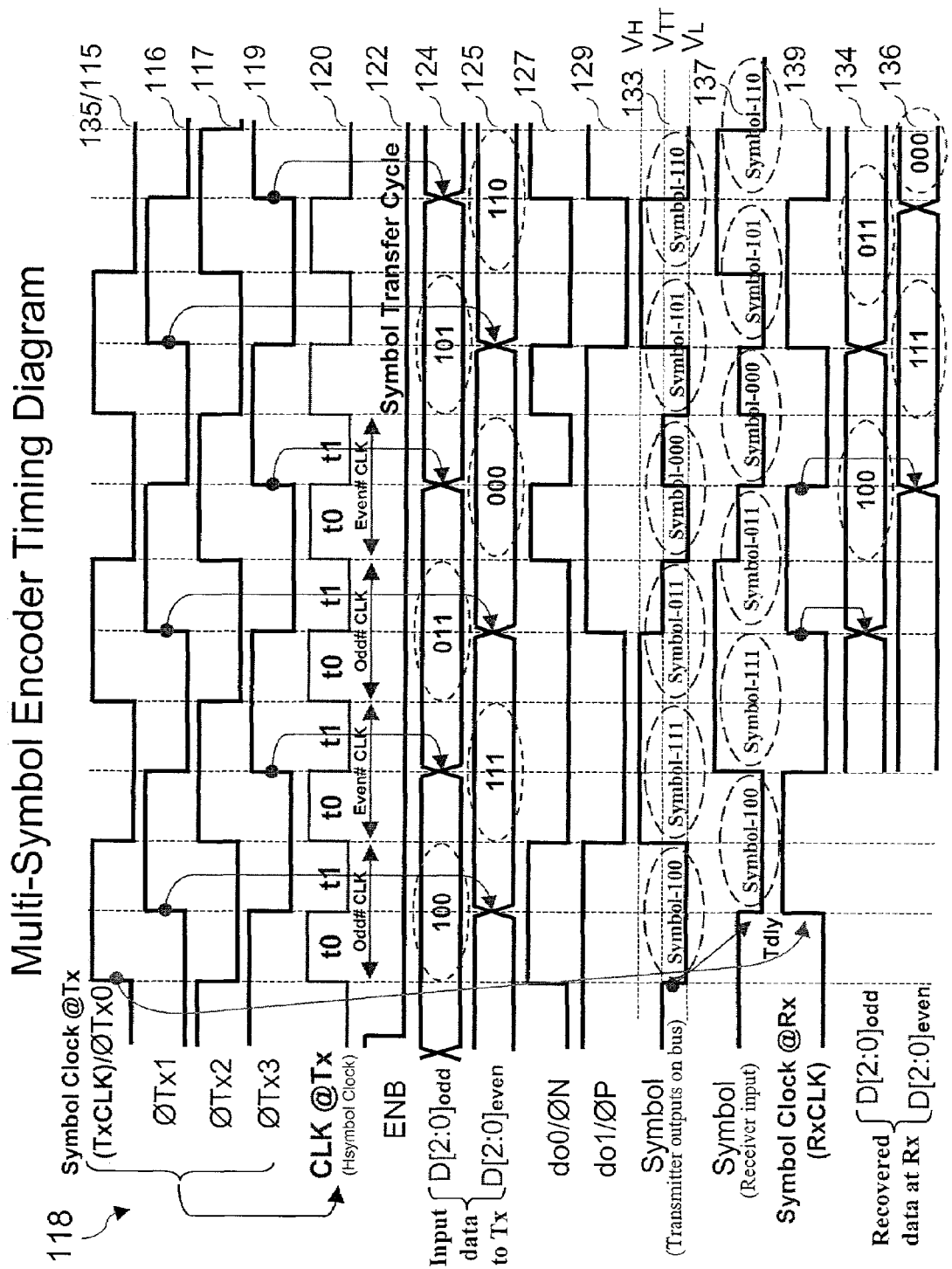
FIG. 8 is an exemplifying timing diagram for the multi-symbol encoder of FIG. 7A.

In the case of D2=0, D1=0, and D0=0, at a time period t0 (during CLK high time), do0=ØN has a value of logic-1 and do1=ØP has a value of logic-1 (see FIGS. 7B and 8). Transistor 50 will be turned on and transistor 49 will be turned off, thus setting the signal level on the Symbol bus voltage to $V_L$ level during CLK high time. At a time period t1 (during CLK low time), do0=ØN has a value of logic-0 and do1=ØP has a value of logic-1 (see FIGS. 7B and 8). Transistors 50 and 49 will be turned off, thus setting the signal level on the Symbol bus to $V_{TT}$ level during CLK low time. Transistors 51 and 53 both turn on to form a current path between nodes $N_H$ and $N_L$ to maintain both nodes roughly at $Vsat_H$ and $Vsat_L$, respectively.

In the case of D2=0, D1=0, and D0=1, at a time period t0 (during CLK high time), do0=ØN has a value of logic-0 and do1=ØP has a value of logic-1 (see FIGS. 7B and 8). Transistors 50 and 49 will both be turned off, thus setting the signal level on the Symbol bus to $V_{TT}$ during CLK high time. Transistors 51 and 53 are both turned on, thus forming a current path between nodes $N_H$ and $N_L$ to maintain both nodes roughly at $Vsat_H$ and $Vsat_L$, respectively. At a time period t1 (during CLK low time), do0=ØN has a value of logic-0 and do1=ØP has a value of logic-0 (see FIGS. 7B and 8). Transistor 50 will be turned off and transistor 49 will be turned on, thus setting the signal level on the Symbol bus to $V_H$ during CLK low time.

In the case of D2=0, D1=1, and D0=0, at a time period t0 (during CLK high time), do0=ØN has a value of logic-0 and do1=ØP has a value of logic-1 (see FIGS. 7B and 8). Transistors 50 and 49 will both be turned off, thus setting the signal level on the Symbol bus to $V_{TT}$. Transistors 51 and 53 are both turned on to form a current path between nodes $N_H$ and $N_L$ to maintain both nodes roughly at $Vsat_H$ and $Vsat_L$, respectively. At a time period t1 (during CLK low time), do0=ØN has a value of logic-1 and do1=ØP has a value of logic-1 (see FIGS. 7B and 8). Transistor 50 will be turned on and transistor 49 will be turned off, thus setting the signal level on the Symbol bus to $V_L$.

In the case of D2=0, D1=1, and D0=1, at a time period t0 (during CLK high time), do0=ØN has a value of logic-0 and do1=ØP has a value of logic-0 (see FIGS. 7B and 8). Transistor 50 will be turned off and transistor 49 will be turned on, thus setting the signal level on the Symbol bus to $V_H$. At a time period t1 (during CLK low time), do0=ØN has a value of logic-0 and do1=ØP has a value of logic-1 (see FIGS. 7B and 8). Transistors 50 and 49 will both be turned off, thus setting the signal level on the Symbol bus to $V_{TT}$. Transistors 51 and 53 are both turned on, thus forming a current path between nodes $N_H$ and $N_L$ to maintain both nodes roughly at $Vsat_H$ and $Vsat_L$, respectively.

In the case of D2=1, D1=0, and D0=0, at a time period to (during CLK high time), do0=ØN has a value of logic-1 and do1=ØP has a value of logic-1 (see FIGS. 7B and 8). Transistor 50 will be turned on and transistor 49 will be turned off, thus setting the signal level on the Symbol bus voltage to $V_L$ level during CLK high time. At a time period t1 (during CLK low time), do0=ØN has a value of logic-1 and do1=ØP has a value of logic-1 (see FIGS. 7B and 8). Transistor 50 will be turned on and 49 will be turned off, thus setting the signal level on the Symbol bus to $V_L$ level during CLK low time.

In the case of D2=1, D1=0, and D0=1, at a time period t0 (during CLK high time), do0=ØN has a value of logic-1 and do1=ØP has a value of logic-1 (see FIGS. 7B and 8). Transistor 50 will be turned on and transistor 49 will be turned off, thus setting the signal level on the Symbol bus voltage to $V_L$ level during CLK high time. At a time period t1 (during CLK low time), do0=ØN has a value of logic-0 and do1=ØP has a value of logic-0 (see FIGS. 7B and 8). Transistor 50 will be turned off and transistor 49 will be turned on, thus setting the signal level on the Symbol bus to $V_H$ during CLK low time.

In the case of D2=1, D1=1, and D0=0, at a time period t0 (during CLK high time), do0=ØN has a value of logic-0 and do1=ØP has a value of logic-0 (see FIGS. 7B and 8). Transistor 50 will be turned off and transistor 49 will be turned on, thus setting the signal level on the Symbol bus to $V_H$. At a time period t1 (during CLK low time), do0=ØN has a value of logic-1 and do1=ØP has a value of logic-1 (see FIGS. 7B and 8). Transistor 50 will be turned on and transistor 49 will be turned off, thus setting the signal level on the Symbol bus to $V_L$.

In the case of D2=1, D1=1, and D0=1, at a time period to (during CLK high time), do0=ØN has a value of logic-0 and do1=ØP has a value of logic-0 (see FIGS. 7B and 8). Transistor 50 will be turned off and transistor 49 will be turned on, thus setting the signal level on the Symbol bus to $V_H$. At a time period t1 (during CLK high time), do0=ØN has a value of logic-0 and do1=ØP has a value of logic-0 (see FIGS. 7B and 8). Transistor 50 will be turned off and transistor 49 will be turned on, thus setting the signal level on the Symbol bus to $V_H$.

In an alternate embodiment which supports or utilizes a single-ended Symbol signal, supply source 55 can be voltage source Vcc and supply source 57 can be ground (GND). In such case, at power up, output DC level calibration circuit 52 automatically generates test data patterns to determine the proper sizes of transistors 49 and 50 to ensure proper DC levels of $V_H$ and $V_L$ for a given channel (i.e., the Symbol bus). Transistors 49 and 50 can be driver transistors. Transistors 49 and 50 may actually comprise multiple programmable transistors with the different drive strengths to give incremental DC level adjustments on the $V_H$ and $V_L$. Output DC level calibration circuit 52 registers information on sizes of transistors 49 and 50 in a register (not shown) contained in driver strength control circuit 54. In this case, because node $N_H$ is connected to Vcc and node $N_L$ is connected to ground, transistors 51 and 53 are not needed to stabilize the voltages at these two nodes between different operations (i.e., either for actively driving symbol bus to $V_H$ or $V_L$, or allowing the predetermined voltage (e.g., termination voltage $V_{TT}$) to determine the bus voltage).

During the symbol transfer cycle, driver strength control circuit 54 utilizes the information contained in its size register, in combination with the do0 and do1 signals from the multi-symbol encoder circuit 56, to determine the number of transistors 49 and 50 for the push-pull driver to be used to drive the Symbol bus.

In yet an alternate embodiment which supports or utilizes a single-ended Symbol signal, supply source 55 can be a constant voltage source VC1 and supply source 57 can be a constant voltage source VS1. At power up, output DC level calibration circuit 52 automatically generates test data patterns to determine the proper sizes for transistors 49 and 50 to ensure proper DC levels of $V_H$ and $V_L$ for a given channel (i.e., the Symbol bus). Transistors 49 and 50 can be driver transistors. Transistors 49 and 50 may actually comprise multiple programmable transistors with the different drive strengths to give incremental DC level adjustments on the $V_H$ and $V_L$. Output DC level calibration circuit 52 registers the information regarding the sizes of transistors 49 and 50 in the size register contained in driver strength control circuit 54. In this case, because node $N_H$ is connected to constant voltage source VC1 and node $N_L$ is connected to constant voltage source VS1, transistors 51 and 53 are not needed to stabilize the voltages at these two nodes between different operations (i.e., either for actively driving symbol bus to $V_H$ or $V_L$, or allowing the predetermined voltage (e.g., termination voltage $V_{TT}$) to determine the bus voltage).

During the symbol transfer cycle, driver strength control circuit 54 utilizes the information contained in its size register, in combination with the do0 and do1 signals from the multi-symbol encoder circuit 56, to determine the number of transistors 49 and 50 for the push-pull driver to be used to drive the Symbol bus.

Figure 6B:
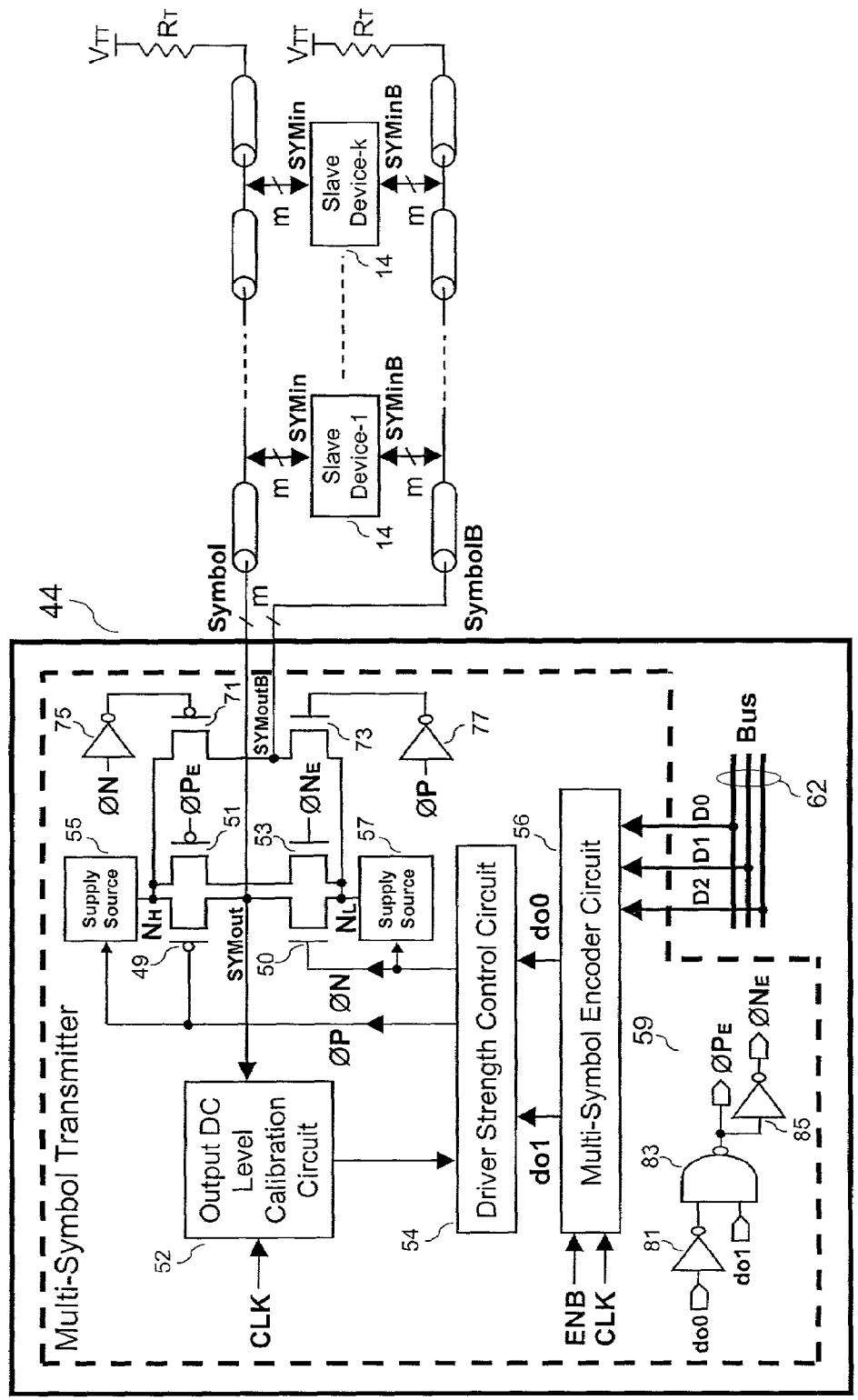
FIG. 6B is a block diagram of another embodiment for a multi-symbol transmitter, in accordance with an embodiment of the present invention.
Figure 6C:
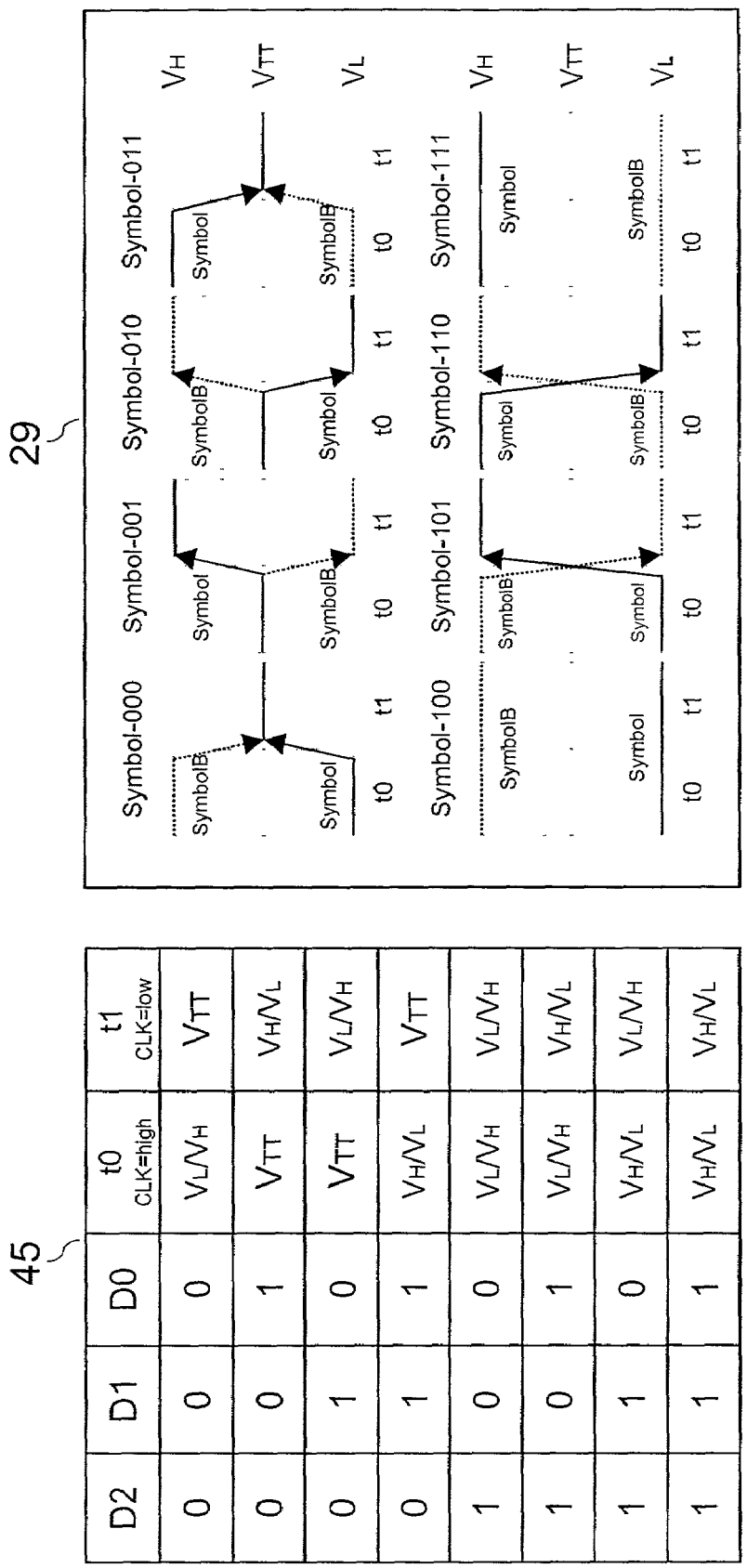
FIG. 6C illustrates output waveforms and a corresponding truth table for the embodiment of multi-symbol transmitter of FIG. 6B.

FIG. 6B is a schematic diagram, in partial block form, of an alternate embodiment for multi-symbol transmitter 44. This embodiment of multi-symbol transmitter 44 supports or utilizes a Symbol signal and differential SymbolB signal, which are carried over a Symbol line and SymbolB line, respectively.

Similar to the embodiment shown in FIG. 6A, this embodiment of multi-symbol transmitter 44 shown in FIG. 6B includes an output DC level calibration circuit 52, a driver strength control circuit 54, a multi-symbol encoder circuit 56, a first supply source 55, a second supply source 57, and a stabilization control circuit 59. These circuits 52, 54, 56, and 59 and power sources 55 and 57 may operate in substantially the same way as previously described with reference to FIG. 6A. This embodiment of multi-symbol transmitter 44 also includes an exemplifying driver circuit (comprising transistors 49 and 50 coupled between supply sources 55 and 57), and stabilizing transistors 51 and 53.

In this embodiment, multi-symbol transmitter 44 also includes a pair of transistors 71 and 73 (coupled between supply sources 55 and 57) and inverters 75 and 77. Inverter 75 receives the control signal ØN at its input, and inverter 77 receives the control signal ØP at its input. Transistor 71 may comprise a PMOS transistor, and transistor 73 may comprise an NMOS transistor. Transistors 71 and 73 are coupled together at their drains. The source of transistor 71 is coupled to supply source 55, and the source of the transistor 73 is coupled to supply source 57. The gate of transistor 71 receives the output signal from inverter 75, and the gate of transistor 73 receives the output signal from inverter 77. In general, transistors 71 and 73 and inverters 75 and 77 cooperate to support the generation and driving of the differential signal SymbolB, which is output as signal SYMoutB at the junction of transistors 71 and 73. Transistors 71 and 73, in combination with supply sources 55 and 57, may constitute a differential output driver circuit.

In one embodiment of multi-symbol transmitter 44 which supports or utilizes a Symbol signal and differential SymbolB signal, each of supply sources 55 and 57 can be constant current sources. Transistors 49, 73 and 71, 50 form the differential push-pull switching transistors for multi-symbol transmitter 44. Transistors 49, 51, and 71 may have the same size; transistors 50, 53, and 73 may have the same size.

When control signal ØP is low (GND), transistor 49 is turned on to connect the Symbol bus to supply source 55, thereby driving the Symbol bus to $V_H$ level; transistor 73 is also turned on to connect supply source 57 to drive the SymbolB bus to $V_L$ level. When control signal ØP is high (Vcc), transistors 49 and 73 are turned off. When control signal ØN is high, transistors 50 and 71 are turned on to connect the Symbol and SymbolB buses to supply sources 57 and 55, respectively. Thus, the Symbol bus is driven to $V_L$ level, and the SymbolB bus is driven to $V_H$ level. When control signal ØN is low, the transistors 50 and 71 are turned off.

When control signal ØN is low and control signal ØP is high, push-pull switching transistors 49, 50, 71, 73 are turned off and both supply source 55 and supply source 57 are disconnected from the Symbol bus and SymbolB bus. At this moment, the predetermined voltage (e.g., termination voltage $V_{TT}$) will pull both the Symbol bus and SymbolB bus to $V_{TT}$ level through termination resistors RT. Supply source stabilizing transistors 51 and 53 are turned on to maintain roughly the same voltage levels at nodes $N_H$ (e.g., $Vsat_H$) and $N_L$ (e.g., $Vsat_L$), respectively, as with a previous operation for transmitting a symbol. This ensures signal integrity for the next symbol because both nodes $N_H$ and $N_L$ start at roughly the same voltage levels for each transfer operation.

Transistors 51 and 53 are controlled by signals $ØP_E$ and $ØN_E$, respectively. These control signals $ØP_E$ and $ØN_E$ are generated by stabilization control circuit 59, which receives do0 and do1 as input signals. When the do0 signal is logic-0 (in which case transistors 50 and 71 are turned off) and the do1 signal is logic-1 (in which case transistors 49 and 73 are turned off), control signal $ØP_E$ is logic-0 and control signal $ØN_E$ is logic-1. This turns on transistors 51 and 53, thus forming a current path between nodes $N_H$ and $N_L$ to maintain both nodes roughly at $Vsat_H$ and $Vsat_L$, respectively.

At power up, output DC level calibration circuit 52 automatically generates test data patterns to determine proper magnitudes of current at supply source 55 and supply source 57, and proper sizes of transistors 49, 50, 51, 53, 71, and 73 to ensure proper DC levels of $V_H$ and $V_L$ for given channel (i.e., Symbol bus and SymbolB bus). Transistors 49, 50, 51, 53, 71, and 73 may actually comprise multiple programmable transistors with the same drive strengths to provide incremental DC level adjustments on the $V_H$ and $V_L$. Output DC level calibration circuit 52 registers information on the selected sizes of supply source 55 and supply source 57, and the transistor size information of transistors 49, 50, 51, 53, 71, and 73 in a register (not shown) contained in driver strength control circuit 54.

In operation, when the enable (ENB) signal is low, multi-symbol transmitter 44 is enabled to begin a symbol transfer cycle. During the symbol transfer cycle, multi-symbol transmitter 44 drives the Symbol and SymbolB buses through the push-pull driver circuits (comprising supply sources 55 and 57 in combination with transistors 49 and 50 for the Symbol bus and transistors 71 and 73 for the SymbolB bus). Driver strength control circuit 54 utilizes the information contained in its size register, in combination with the do0 and do1 signals from multi-symbol encoder circuit 56, to determine the suitable strengths for the constant current sources implementing supply sources 55 and 57, and the number of transistors 49, 50, 51, 53, 71, and 73 to be used to drive the Symbol and SymbolB buses. The strength control is achieved by using multiples of each of control signals ØP and ØN (only shown as single signals in FIG. 6B). Control signal ØP controls transistors 49 and 73 and supply source 55, and control signal ØN controls transistors 50 and 71 and supply source 57.

Multi-symbol encoder circuit 56 encodes incoming data D2, D1, and D0 (appearing on bus 62) according to an embodiment of the multi-symbol signaling technique described herein. Multi-symbol encoder circuit 56 receives as input signals D0, D1, D2, CLK, and ENB. When the ENB signal is low, the differential multi-symbol transmitter 44 is enabled, and the symbol transfer cycle may begin. Multi-symbol transmitter 44 will drive the Symbol bus and SymbolB bus to transmit "differential" symbols according to the truth table 45 and the waveforms 29 illustrated in FIG. 6C for eight different symbols. The other end of the Symbol bus or SymbolB bus is terminated with a termination resistor $R_T$ and a predetermined voltage (e.g., termination voltage $V_{TT}$) to minimize the reflection caused by the transmission line effect of the channel. This ensures signal integrity for the receivers of any slave devices to read the transmitted "differential" symbols properly.

In the case of D2=0, D1=0, and D0=0, at a time period t0 (during CLK high time) do0=ØN has a value of logic-1 and do1=ØP has a value of logic-1 (see FIGS. 7B and 8). Transistors 50 and 71 will be turned on and transistors 49 and 73 will be turned off, thus setting the signal level on Symbol bus voltage to $V_L$ and the signal level on SymbolB bus to $V_H$ during CLK high time. At a time period t1 (during CLK low time), do0=ØN has a value of logic-0 and do1=ØP has a value of logic-1 (see FIGS. 7B and 8). Each of transistors 49, 50, 71, 73 will be turned off, thus setting the signal levels of the Symbol bus and SymbolB bus to $V_{TT}$ during CLK low time. Transistors 51 and 53 are both turned on, thus forming a current path between nodes $N_H$ and $N_L$ to maintain both nodes roughly at $Vsat_H$ and $Vsat_L$, respectively.

In the case of D2=0, D1=0, and D0=1, at a time period t0 (during CLK high time), do0=ØN has a value of logic-0 and do1=ØP has a value of logic-1 (see FIGS. 7B and 8). Transistors 49, 50, 71, 73 will all be turned off, thus setting the signal level on both the Symbol bus and SymbolB bus to $V_{TT}$ during CLK high time. Transistors 51 and 53 are both turned on, thus forming a current path between nodes $N_H$ and $N_L$ to maintain both nodes roughly at $Vsat_H$ and $Vsat_L$, respectively. At a time period t1 (during CLK low time), do0=ØN has a value of logic-0 and do1=ØP has a value of logic-0 (see FIGS. 7B and 8). Transistors 50 and 71 will be turned off and transistors 49 and 73 will be turned on, thus setting the signal level on the Symbol bus voltage to $V_H$ and the signal level on the SymbolB bus to $V_L$ during CLK low time.

In the case of D2=0, D1=1, and D0=0, at a time period to (during CLK high time), do0=ØN has a value of logic-0 and do1 ØP has a value of logic-1 (see FIGS. 7B and 8). Transistors 49, 50, 71, and 73 will all be turned off, thus setting the signal level on both the Symbol bus and SymbolB bus to $V_{TT}$ during CLK high time. Transistors 51 and 53 are both turned on, thus forming a current path between nodes $N_H$ and $N_L$ to maintain both nodes roughly at $Vsat_H$ and $Vsat_L$, respectively. At a time period t1 (during CLK low time), do0=ØN has a value of logic-1 and do1=ØP has a value of logic-1 (see FIGS. 7B and 8). Transistors 50 and 71 will be turned on and transistors 49 and 73 will be turned off, thus setting the signal level on the Symbol bus to $V_L$ and the signal level on the SymbolB bus to $V_H$ during CLK low time.

In the case of D2=0, D1=1, and D0=1, at a time period to (during CLK high time), do0=ØN has a value of logic-0 and do1=ØP has a value of logic-0 (see FIGS. 7B and 8). Transistors 50 and 71 will be turned off and transistors 49 and 73 will be turned on, thus setting the signal level on the Symbol bus voltage to $V_H$ and the signal level on the SymbolB bus to $V_L$ during CLK high time. At a time period t1 (during CLK low time), do0=ØN has a value of logic-0 and do1=ØP has a value of logic-1 (see FIGS. 7B and 8).

Transistors 49, 50, 71, 73 will all be turned off, thus setting the signal level on both the Symbol bus and the SymbolB bus to $V_{TT}$ during CLK low time. Transistors 51 and 53 are both turned on, thus forming a current path between nodes $N_H$ and $N_L$ to maintain both nodes roughly at $Vsat_H$ and $Vsat_L$, respectively.

In the case of D2=1, D1=0, and D0=0, at a time period t0 (during CLK high time) do0=ØN has a value of logic-1 and do1=ØP has a value of logic-1 (see FIGS. 7B and 8). Transistors 50 and 71 will be turned on and transistors 49 and 73 will be turned off, thus setting the signal level on Symbol bus voltage to $V_L$ and the signal level on SymbolB bus to $V_H$ during CLK high time. At a time period t1 (during CLK low time), do0=ØN has a value of logic-1 and do1=ØP has a value of logic-1 (see FIGS. 7B and 8). Transistors 50 and 71 will be turned on and transistors 49 and 73 will be turned off, thus setting the signal level on Symbol bus voltage to $V_L$ and the signal level on SymbolB bus to $V_H$ during CLK high time.

In the case of D2=1, D1=0, and D0=1, at a time period t0 (during CLK high time) do0=ØN has a value of logic-1 and do1=ØP has a value of logic-1 (see FIGS. 7B and 8). Transistors 50 and 71 will be turned on and transistors 49 and 73 will be turned off, thus setting the signal level on Symbol bus voltage to $V_L$ and the signal level on SymbolB bus to $V_H$ during CLK high time. At a time period t1 (during CLK low time), do0=ØN has a value of logic-0 and do1=ØP has a value of logic-0 (see FIGS. 7B and 8). Transistors 50 and 71 will be turned off and transistors 49 and 73 will be turned on, thus setting the signal level on the Symbol bus voltage to $V_H$ and the signal level on the SymbolB bus to $V_L$ during CLK high time.

In the case of D2=1, D1=1, and D0=0, at a time period t0 (during CLK high time), do0=ØN has a value of logic-0 and do1=ØP has a value of logic-0 (see FIGS. 7B and 8). Transistors 50 and 71 will be turned off and transistors 49 and 73 will be turned on, thus setting the signal level on the Symbol bus voltage to $V_H$ and the signal level on the SymbolB bus to $V_L$ during CLK high time. At a time period t1 (during CLK low time), do0=ØN has a value of logic-1 and do1=ØP has a value of logic-1 (see FIGS. 7B and 8). Transistors 50 and 71 will be turned on and transistors 49 and 73 will be turned off, thus setting the signal level on Symbol bus voltage to $V_L$ and the signal level on SymbolB bus to $V_H$ during CLK high time.

In the case of D2=1, D1=1, and D0=1, at a time period t0 (during CLK high time), do0=ØN has a value of logic-0 and do1=ØP has a value of logic-0 (see FIGS. 7B and 8). Transistors 50 and 71 will be turned off and transistors 49 and 73 will be turned on, thus setting the signal level on the Symbol bus voltage to $V_H$ and the signal level on the SymbolB bus to $V_L$ during CLK high time. At a time period t1 (during CLK low time), do0=ØN has a value of logic-0 and do1=ØP has a value of logic-0 (see FIGS. 7B and 8). Transistors 50 and 71 will be turned off and transistors 49 and 73 will be turned on, thus setting the signal level on the Symbol bus voltage to $V_H$ and the signal level on the SymbolB bus to $V_L$ during CLK high time.

In an alternate embodiment of multi-symbol transmitter 44 which supports or utilizes a differential signal, supply source 55 can be voltage source Vcc and supply source 57 can be ground (GND). In yet another alternate embodiment of the differential multi-symbol transmitter 44, supply source 55 can be a constant voltage source VC1 and supply source 57 can be a constant voltage source VS1. These alternate embodiments operate in like manner to the similarly configured embodiments for the single-ended multi-symbol transmitter described above with reference to FIG. 6A.

Multi-Symbol Encoder

FIGS. 7A and 7B are a logic diagram of a multi-symbol encoder circuit 56 and a corresponding truth table 61, in accordance with an embodiment of the present invention. Multi-symbol encoder circuit 56 receives a clock (CLK) input signal and an enable (ENB) input signal along with the input signals for data bits D0, D1, and D2 and generates encoded output data signals do0 and do1. The corresponding truth table 61 illustrates the output values for the various input and clock values.

Referring to FIG. 7A, multi-symbol encoder circuit 56 may comprise a plurality of inverters 64, 66, 67, 68, 82, and 84, a plurality of NAND gates 70, 71, 72, 73, 74, 75, 76, 77, 78, 80, and 86, and a NOR gate 88. NAND gates 70, 71, 72, 73, and 80, and inverter 82, along with NOR gate 88 provide the encoding logic for output data signal do0. NAND gates 74, 75, 76, 77, 78, and 86 provide the encoding logic for output data signal do1. In operation, NAND gates 70, 71, 74, and 75 receive the CLK signal, while NAND gates 72, 73, 76, and 77 receive the inverted CLK signal (CLKB) provided by inverter 64. NAND gates 74, 76, and 77 receive the signal for data bit D0, while NAND gates 70, 72, and 73 receive the signal for inverted data bit D0 (D0B) provided by inverter 68. NAND gates 72, 74, and 75 receive the signal for data bit D1, while NAND gates 70, 71, and 76 receive the signal for inverted data bit D1 (D1B) provided by inverter 66. NAND gates 71, 73, 75, and 77 receive the signal for data bit D2, while NAND gates 70, 72, 74, and 76 receive the signal for inverted data bit D2 (D2B) from inverter 67. NAND gate 78 receives the output signals from NAND gates 74, 75, 76, and 77 and provides an output signal to NAND gate 86. NAND gate 80 receives the output signals from NAND gates 70, 71, 72, and 73 and provides an output signal to inverter 82, whose output signal goes to NOR gate 88. NAND gate 86 receives the output signal from NAND gate 78 and an inverted ENB signal (EN), provided by inverter 84, and outputs data signal do1. NOR gate 88 receives the output signal from inverter 82 and the ENB signal and outputs data signal do0. When the ENB input signal goes to a low voltage level or a logic-0 value, multi-symbol encoder circuit 56 is enabled to encode the incoming data bits D0, D1, and D2 to generate representative logic values for do0 and do1. This is illustrated in the truth table of FIG. 7B during the time periods t0 and t1 when the CLK signal is at a high logic level and low logic level, respectively.

As an example of the circuit operation for data bits D2=0, D1=1, and D0=0, when the CLK signal is high, NAND gate 76 receives the signal for data bit D0, the inverted CLK signal, and the inverted signal for data bit D1, and the inverted signal for data bit D2, and outputs a high voltage level or a logic-1 value. NAND gate 74 receives the signal for data bit D0, the CLK signal, the signal for data bit D1, and the inverted signal for data bit D2, and outputs a logic-1 value. NAND gate 75 receives the signals for data bits D1 and D2 and the CLK signal and outputs a logic-1 value. NAND gate 77 receives the signals for data bits D0 and D2 and the inverted CLK signals and outputs a logic-1 value. NAND gate 78 receives a logic-1 value from NAND gates 74, 75, 76, and 77 and outputs a low voltage level or a logic-0 value. NAND gate 86 receives the logic-0 value from NAND gate 78 and, if the ENB signal is low, outputs a logic-1 value, which is shown in the truth table of FIG. 7B for do1 at time period t0 with CLK signal high.

NAND gate 72 receives the signal for data bit D1, the inverted CLK signal, and the inverted signals for data bits D0 and D2 and outputs a logic-1 value. NAND gate 70 receives the CLK signal and inverted signals for data bits D0, D1, and D2, and outputs a logic-1 value. NAND gate 71 receives the CLK signal, the signal for data bit D2, and the inverted signal for data bit D1 and outputs a logic-1 value. NAND gate 73 receives the inverted CLK signal, the signal for data bit D2, and the inverted signal for data bit D0 and outputs a logic-1 value. NAND gate 80 receives the logic-1 value outputs from NAND gates 70, 71, 72, and 73 and outputs a logic-0 value, which is inverted by inverter 82 to output a logic-1 value. NOR gate 88 receives the logic-1 value from inverter 82 and, if ENB signal is low, outputs a logic-0 value, which is shown in the truth table of FIG. 7B for do0 at time period t0 with CLK signal high. A similar analysis would be understood for the remaining values in the truth table.

Timing Diagram For Multi-Symbol Encoder

FIG. 8 is an exemplifying timing diagram 118 for the multi-symbol encoder of FIG. 7A. In accordance with an embodiment of the present invention, timing diagram 118 illustrates the timing for a multi-symbol encoder circuit 56 that receives input signals for data bits D0, D1, and D2, along with a clock (CLK) signal and an enable (ENB) signal, and generates encoded output data signals do0 and do1.

Timing diagram 118 includes exemplifying waveforms for various signals including symbol clock at transmission TxCLK signal 135, clock (CLK) at transmission (or Hsymbol Clock) signal 120, ENB signal 122, data bit signals D[2:0] odd 124 and D[2:0] even 125, output data signals do0 127 and do1 129, transmitted Symbol signal 133, received Symbol signal 137, symbol clock at reception RxCLK signal 139, and the original data bit D[2:0] odd 134 and D[2:0] even 136 signals as recovered at a receiver (e.g., multi-symbol receiver 48). These waveforms illustrated in timing diagram 118 of FIG. 8 are provided to facilitate an understanding of the timing associated with multi-symbol encoder circuit 56 and provide an exemplifying timing for the designated data, as described further herein.

Symbol clock at transmission signal 135, which is input into DLL and control timing generator 31, is synchronized with the external system clock signal. Symbol clock signal 135 may be used to generate a plurality of clock ØTx0, ØTx1, ØTx2, ØTx3 signals 115, 116, 117, and 119, which have the same frequency but different phases. Multi-phase clock ØTx0, ØTx1, ØTx2, and ØTx3 signals 115, 116, 117, and 119 may be generated by the DLL and control timing generator 31. Multi-phase clocks ØTx0, ØTx1, ØTx2, and ØTx3 are represented by exemplifying waveforms 115, 116, 117, and 119, respectively.

The frequency of CLK signal 120 may be twice that of Symbol clock signal 135. CLK signal 120 is derived from the symbol clock signal 135 by DLL and control timing generator 31 and serves as the master clock signal to synchronize, among other things, the transfer and processing of the symbols. CLK signal 120 may be viewed as a combination of an odd-number clock (odd# CLK) signal and an even-number clock (even# CLK) signal. The high time or t0 time periods of odd# CLK signal may coincide with at least a portion of the high time of phase clock ØTx0 and ØTx3 signals 115 and 119. The low time or t1 time periods of odd# CLK signal may coincide with at least a portion of the high time of phase clock ØTx0 and ØTx1 signals 115 and 116. The high time or t0 time periods of even# CLK signal may coincide with at least a portion of the high time of phase clock ØTx1 and ØTx2 signals 116 and 117. The low time or t1 time periods of even# CLK signal may coincide with at least a portion of the high time of phase clock ØTx2 and ØTx3 signals 117 and 119. CLK signal 120 can be the same as the CLK signal for encoding in the multi-symbol encoder 56 (see FIG. 7A).

In one embodiment, the multi-phase clock ØTx0, ØTx1, ØTx2, and ØTx3 signals 115, 116, 117, and 119 can be used instead of the CLK signal for the multi-symbol encoder 56. That is, the same encoding logic can be timed using the multi-phase clock ØTx0, ØTx1, ØTx2, and ØTx3 signals 115, 116, 117, and 119. An advantage of using multi-phase clock ØTx0, ØTx1, ØTx2, and ØTx3 signals for encoding (at transmission) and decoding (at reception) is that the circuitry of the multi-symbol receiver and transceiver may be run at lower internal clock frequency for easier design implementation when the frequency of the Symbol clock signal 135 must be increased for higher system performance.

Enable signal (ENB) 122, as described above, may initiate the symbol transfer cycle when it drops to a low voltage level or a logic-0 value. The data D[2:0] odd signal 124 and data D[2:0] even signal 125 may convey data values for data bits D2, D1, and D0 at the input to the multi-symbol transmitter 44 (as discussed in detail with reference to FIGS. 6A and 6B). Data values for data bits D2, D1, and D0 are input to the multi-symbol transmitter 44 (as discussed in detail with reference to FIGS. 6A and 6B). As an example, the values for data bits D2, D1, and D0 for data D[2:0] odd signal 124 are shown as 100, 011, 101, respectively, over a number of clock cycles. As a further example, the values for data bits D2, D1, and D0 for data D[2:0] even signal 125 are shown at 111, 000, and 110, respectively, over a number of clock cycles. These values are encoded by multi-symbol encoder circuit 56, which outputs data signals do0 127 and do1 129 (as discussed above, for example, with reference to FIGS. 7A and 7B).

Data signals do0 127 and do1 129, which correspond to control signals ØN and ØP as described above with reference to FIGS. 6A and 6B, are used to generate the transmission symbols in Symbol signal 133 from data D[2:0] odd signal 124 and data D[2:0] even signal 125. Symbol signal 133 is transmitted on the Symbol bus or communication channel. Each transmission symbol may appear as a respective waveform in Symbol signal 133 and can be one of the symbols from the exemplifying symbol set described herein. As depicted, these transmission symbols include, in sequence, symbol-100, symbol-111, symbol-011, symbol-000, symbol-101, and symbol-110. In this sequence, transmission symbols corresponding to data D[2:0] odd signal 124 alternate with transmission symbols corresponding to data D[2:0] even signal 125. Symbol signal 133 may be output from a multi-symbol transmitter 44.

The symbol clock at reception RxCLK signal 139 is a delayed version of the symbol clock at transmission (TxCLK) signal 135. As such, RxCLK signal 139 may provide source synchronization for receiving Symbol signal 133 as Symbol signal 137 at multi-symbol receiver 48. Symbol signal 137 can be a delayed version of Symbol signal 133. That is, there may be a delay of Tdly between symbol signal 133 output from the multi-symbol transmitter 44 and the symbol signal 133 received by multi-symbol receiver 48. The delay Tdly may be attributable to, for example, cable or PCB trace delay.

For source synchronization, when transmitter 44 sends the Symbol signal 133 across the data bus, the TxCLK signal 135 is also provided. Assuming both signals 133 and 135 have the same Tdly, then Symbol signal 137 will reach to the multi-symbol receiver 48 at the same time and same phase as RxCLK signal 139. This means that Symbol signal 133 at transmission becomes Symbol signal 137 at reception, and TxCLK signal 135 becomes RxCLK signal 139. The RxCLK signal 139 becomes the Symbol Clock input of the DLL and control timing generator 31 (as shown, for example, in FIG. 3). In response to the RxCLK 139, DLL and control timing generator 31 may generate the multiphase control signals Ø1, Ø2, Ø3, Ø4, Øavg1, Øavg2, ØEN1, and ØEN2 signals to control the operation of the multi-symbol receiver 48, for example, for symbol (data) sampling, processing (averaging, etc.), amplification, and data recovery and re-synchronization (data-alignment) at receiver 48.

In other embodiments, one or more electronic devices in the architecture are globally synchronized, for example, with a universal synchronization clock signal. That is, rather than transmitting a clock signal to the receiving device, a universal synchronization clock signal can be used. Such clock signal is synchronous at both the transmitting and receiving devices. Such universal synchronization is described in U.S. patent application Ser. No. 09/452,274 filed on Nov. 30, 1999, entitled "Universal Synchronization Clock And Skew Correction In A Bus System," the entirety of which is incorporated herein by reference.

The exemplifying transmission symbols illustrated for Symbol signal 137 are recognized by the receiver 48 based upon region(s) relative to a pre-determined voltage level (such as $V_{TT}$), a voltage transition within or between regions, or a lack of transition, as discussed in detail herein. The receiver generates data signals D[2:0] odd 134 and D[2:0] even 136, to recover data bits D2, D1, and D0, as discussed in detail below. As shown, data signals D[2:0] odd 134 and D[2:0] even 136 correspond to the original data signals D[2:0] odd 124 and D[2:0] even 125, but delayed one or more clock cycles depending upon the length and delays associated with the communication channel.

Multi-Symbol CMS Receiver

Figure 9:
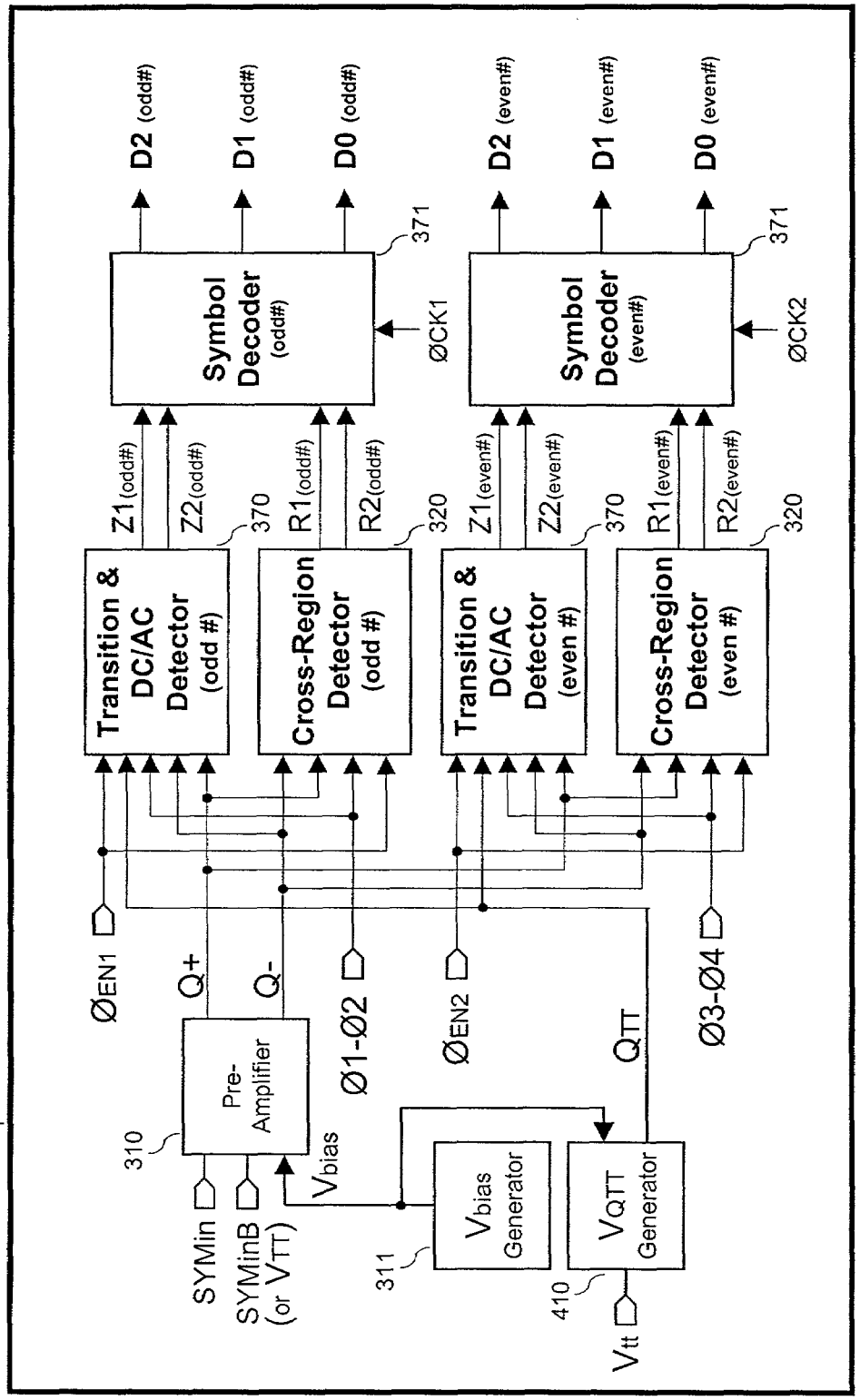
FIG. 9 is a block diagram of a multi-symbol correlated multi-sampling (CMS) receiver, in accordance with an embodiment of the present invention.

FIG. 9 is a block diagram of a multi-symbol correlated multi-sampling (CMS) receiver 46, in accordance with an embodiment of the present invention. In one embodiment, two multi-symbol CMS receivers 46 may be provided in each multi-symbol receiver 48 (see, for example, FIG. 5). As shown in FIG. 9, in one embodiment, multi-symbol CMS receiver 46 comprises a pre-amplifier 310, a voltage generator 311, cross-region detectors 320, transition and AC/DC detectors 370, and symbol decoders 371.

In general, pre-amplifier 310 receives the incoming symbol stream and converts the signal for the transmission symbols into differential signals (e.g., Q+ and Q–). Cross-region detectors 320, transition and AC/DC detectors 370, and symbol decoders 371 translate and decode the incoming differential signals into the respective N-bit data (e.g., N equals 3) for each transmission symbol, according to one or more defined truth tables. In one embodiment, as described in more detail below, one cross-region detector 320, one transition and AC/DC detector 370, and one symbol decoder 371 process the data signals during odd-numbered clock signals, and the other cross-region detector 320, the other transition and AC/DC detector 370, and the other symbol decoder 371 process the data signals during even-numbered clock signals. This provides interleaved symbol sampling that allows for a high clock and data rate operation.

For an embodiment in which differential signals (Symbol and SymbolB) are used for transmitting data, pre-amplifier 310 receives input signals SYMin, SYMinB, and voltage Vbias, and provides output signals Q+ and Q–. The input signal SYMin provides the transmission symbols necessary to ultimately derive or recover the values of data bits D0, D1, and D2. The input signal SYMinB is the differential for the signal SYMin, while the voltage Vbias is a bias voltage provided by a Vbias generator 311. In an alternate embodiment, in which a single-ended Symbol signal is used for transmitting data, voltage $Q_{TT}$ may be provided at one input of pre-amplifier 310 instead of the SYMinB signal. The voltage $Q_{TT}$ is a bias voltage provided by a voltage generator 410. The voltage $Q_{TT}$ may provide a reference voltage for an averaging circuit (as shown in FIG. 13) of the transition and DC/AC detectors 370. Exemplifying embodiments of pre-amplifier 310 and voltage generator 410 are illustrated and described in detail with reference to FIG. 10. Vbias generator 311, which may provide process, voltage, and temperature (PVT) compensation, generates voltage Vbias. The output signals Q+ and Q– represent the differential symbol information derived from input signal SYMin, with these output signals provided to cross-region detectors 320 and transition and AC/DC detectors 370.

Cross-region detectors 320, with one provided to process the transmission symbols during odd-numbered clock signals and one provided to process the transmission symbols during even-numbered clock signals, receive the signals Q+ and Q– along with the corresponding control or phase signals for odd or even-numbered processing. The phase signals Ø1, Ø2, and $Ø_{EN1}$ correspond to the odd-numbered clock cycles while the phase signals Ø3, Ø4, and $Ø_{EN2}$ correspond to the even-numbered clock cycles. The phase signals Ø1, Ø2, Ø3, Ø4 correspond to one-cycle clock times and are phase-shifted to provide the timing for sampling the incoming symbols. Each cross-region detector 320 generally functions to determine if there is a defining span or cross from one region into another in each transmission symbol received by multi-symbol CMS receiver 46. To accomplish this, in one embodiment, each cross-region detector 320 may sample and average the voltage levels of the Q+ and Q– symbols over t0 and t1 periods for each clock cycle. Cross-region detector 320 may output R1 and R2 signals to indicate whether any given transmission symbol includes a big-swing or transition between regions (such as symbol-101 and symbol-110 of FIG. 2). In one embodiment, if the value of R1 differs from the value of (i.e., R1 XOR R2=1), then the respective symbol includes a transition from one region into another. Otherwise, if the value of R1 is the same as the value of R2 (i.e., R1 XOR R2=0), then there is no big swing transition in the symbol. Further, the value of data bit D0, which may be the least significant bit of D[2:0], may be same as the value of R2. An exemplifying embodiment of cross-region detector 320 is illustrated and described in detail with reference to FIGS. 16 through 19.

Transition and DC/AC detectors 370, with one provided to process the transmission symbols during odd-numbered clock signals and one provided to process the transmission symbols during even-numbered clock signals, receive the signals $Q_{TT}$, Q+ and Q– along with the corresponding phase signals for odd or even-numbered processing. The phase signals $Ø_{EN1}$ and $Ø_{EN2}$ may provide a logic high level signal to activate the corresponding odd or even-numbered transition and DC/AC detector 370 to process the incoming transmission symbols. Transition and DC/AC detector 370 generally functions to determine the defining transition or lack of transition for each symbol for transmitting data. To accomplish this, in one embodiment, transition and DC/AC detector 370 may determine the direction of the transition (positive or negative), if any, of the incoming transmission symbols. Transition and DC/AC detector 370 may output Z1 and Z2 signals to indicate whether any given transmission symbol has a transition, and if there is a transition, what the direction of the transition is. In one embodiment, if the value of Z1 is the same as the value of Z2 (i.e., Z1 XNOR Z2=1), then the respective transmission symbol lacks any transition (i.e., it is a DC symbol, such as, for example, symbol-100 or symbol-111 of FIG. 2A). Otherwise, if the value of Z1 differs from the value of Z2 (i.e., Z1 XNOR Z2=0), the transmission symbol includes transition (i.e., it is an AC symbol). Further, the value of data bit D1 may be same as the value of Z2. An exemplifying embodiment of transition and DC/AC detector 370 is illustrated and described in detail with reference to FIGS. 11 through 15.

Symbol decoders 371 receive the R1, R2 signals from cross-region detectors 320 and the Z1, Z2 signals from the transition and DC/AC detectors 370. Symbol decoders 371 cooperate with cross-region detectors 320 and transition and DC/AC detectors 370 to recover the three data bits (i.e., D2, D1, and D0) encoded at the transmitter, discussed above, and output the appropriate data values for each transmission symbol. In one embodiment, D0 has the same value as R2, D1 has the same value as Z2, and D2 has the value of S+Y, where S=R1 XOR R2 and Y=Z1 XNOR Z2.

Voltage Generator and Pre-Amplifier

FIG. 10 is a schematic diagram of a voltage generator 410 and a pre-amplifier 310, in accordance with embodiments of the present invention. As discussed above, pre-amplifier 310 receives input signal SYMin, differential signal SYMinB (or voltage $V_{TT}$), and voltage Vbias, and provides output signals Q+ and Q−.

Pre-amplifier 310 comprises a plurality of transistors 300 through 308. As shown in FIG. 10, transistors 301, 306, and 308 have their sources tied together and coupled to ground. The drain of transistor 301 is connected to the source of transistor 300, which provides the output signal Q−. The drain of transistor 308 is connected to the source of transistor 307, which provides the output signal Q+. The drains of transistors 300 and 307, along with the sources of transistors 302 and 304, are tied together and coupled to voltage source Vcc. The gates of transistors 302 and 304 are tied together and coupled to ground. The drain of transistor 302 is connected to the drain of transistor 303 and to the gate of transistor 300. The drain of transistor 304 is connected to the drain of transistor 305 and to the gate of transistor 307. The sources of transistors 303 and 305 are tied together and coupled to the drain of transistor 306. The pre-amplifier 310 receives input signal SYMin at the gate of the transistor 303, receives input signal SYMinB at the gate of the transistor 305, and receives voltage Vbias at the gates of transistors 301, 306, and 308.

In single-ended operation, the voltage $V_{TT}$ is used as a reference voltage for pre-amplifier 310 to convert the incoming transmission symbols (which can be SYMin waveforms (see FIG. 2A)) into differential outputs (i.e., Q+/Q− waveforms (see FIG. 11)), which are provided to one or more input terminals of transition and DC/AC detector 370 and region detector 320. This provides common-mode noise rejection capability for multi-symbol CMS receivers 46. Transistors 302 through 306 provide pre-amplification, for example, with an approximate gain of one, but with a very wide dynamic linear range. The output of this pre-amplification stage is provided to the gates of transistors 300 and 307, which are used to isolate the capacitive load from the transition and DC/AC detectors 370 and cross-region detectors 320 to increase the bandwidth of the pre-amplification stage.

Transistors 302 and 304 are used as an active load for pre-amplifier 310, with the gates of transistors 302 and 304 grounded to generate a pre-determined gain. Transistors 301, 306, and 308 are used to supply a constant current for pre-amplifier 310. The voltage Vbias biases transistors 300, 301, 303, 305, 306, 307, and 308 in the saturation region to ensure a wide linear range operation (e.g., greater than 1 volt) for pre-amplifier 310. A wide linear range is useful in preventing pre-amplifier 310 from entering into saturation and ensuring that it can receive incoming transmission symbols and output signals Q+ and Q− with the desired differential gain (e.g., a gain in the range of one to two). The common mode range of pre-amplifier 310 may also match with the common mode range of differential latch amplifiers 806, 808, 906, and 908 of transition and AC/DC detectors 370 and cross-region detectors 320 (described below). Transistors 300 and 307 are configured as source-follower transistors used to buffer the intermediate pre-amplification outputs (i.e., nodes $N_{C1}$ and $N_{D1}$) of pre-amplifier 310 to avoid overloading due to transition and AC/DC detectors 370 and cross-region detectors 320 and to produce a very high bandwidth pre-amplifier design for high speed input/output interface applications.

Figure 11:
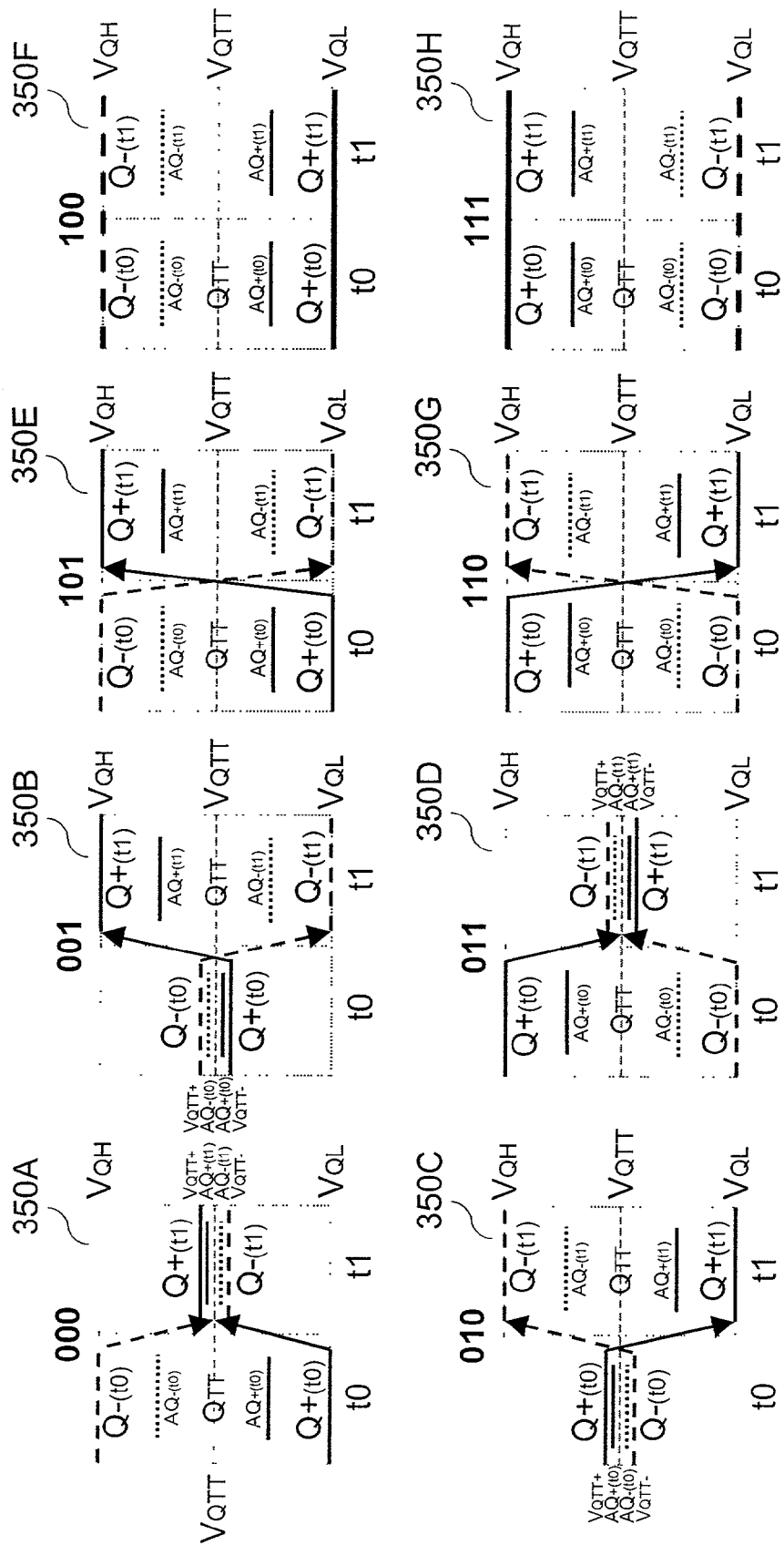
FIG. 11 illustrates exemplifying waveforms showing symbol averaging for each of a plurality of symbols for transition detection.

Illustrations of waveforms 350 output by pre-amplifier 310 in response to symbols-000, -001, -010, -011, -101, -100, -110, and -111 are provided in FIG. 11. The output waveforms, separately labeled as 350A, 350B, 350C, 350D, 350E, 350F, 350G, and 350H, respectively, illustrate exemplifying voltage data values that are provided by pre-amplifier 310 at respective output nodes Q+ and Q− during clock time periods t0 and t1. Note that the Q+ values are shown as a solid line and the Q− values are shown as a dashed line. For example, input waveform symbol-010 received by pre-amplifier 310 at input SYMin results in output values at Q+ and Q− as shown in the Q+/Q− waveforms for symbol-010 (350C). Specifically, input signal SYMin during time period t0 is at voltage level $V_{TT}$ and then drops to voltage level $V_L$ for time period t1. These values at input SYMin result in output values for signals Q+ and Q− of voltage levels $V_{QTT+}$ and $V_{QTT-}$, during time period t0, and voltage level $V_{QH}$ for signal Q− and voltage level $V_{QL}$ for signal Q+ during time period t1. Note that, in theory, voltages levels $V_{QTT+}$ and $V_{QTT-}$ would be the same if transistors 301, 306, and 308 are matched; transistors 303 and 305 are matched, transistors 300 and 307 are matched; and transistors 302 and 304 are matched. In reality, however, voltage levels $V_{QTT+}$ and $V_{QTT-}$ may be slightly increased and decreased levels, respectively, of a voltage level $V_{QTT}$, due to mismatches of transistors 300 through 308 in pre-amplifier 310.

The circuit operation of pre-amplifier 310 can be illustrated for exemplifying symbol-010 of the SYMin waveforms (see FIG. 2A). During time period t0, input signal SYMin is at voltage level $V_{TT}$. Transistors 303 and 305 have the same gate voltage, resulting in symmetrical operation such that the voltage level at nodes $N_{C1}$ and $N_{D1}$ are approximately equal. Due to the source-follower configuration of transistors 300 and 307, the voltage level at the source of transistors 300 and 307 (i.e., the voltage output for nodes Q− and Q+) will be approximately equivalent to the voltage level at nodes $N_{C1}$ and $N_{D1}$ with small deviations from $V_{QTT}$. Consequently, output signals Q+ and Q− are at respective voltage levels $V_{QTT+}$ and $V_{QTT-}$, which corresponds to the voltage drop across transistors 303 and 306 or transistors 305 and 306, respectively. During time period t1, input signal SYMin is at voltage level $V_L$, which results in the voltage level at node $N_{C1}$ being at a higher level than the voltage level at node $N_{D1}$. Consequently, output signal Q– is at voltage level $V_{QH}$ while output signal Q+ is at voltage level $V_{QL}$, which corresponds to the difference between the voltage drops across transistors 303 and 306 and transistors 305 and 306, respectively, if the gain of the source followers is equal to one.

For an embodiment in which a single-ended Symbol signal is used for transmitting data, voltage $V_{TT}$ is received at the gate of transistor 305. In this case, the linear range of pre-amplifier 310 may be from 0.8V to 1.8V. Thus, if the voltage levels of incoming symbols to input gates 303 and 305 of pre-amplifier 310 fall into this range, then the receivers will operate properly. In one embodiment, a suitable voltage range for $V_{TT}$ is 1.25V to 1.35V, which can be in the middle of the linear range (i.e., 0.5V to 1.8V) of pre-amplifier 310. This implies a range for $V_H$ between 1.3V and 1.8V, and a range for $V_L$ between 0.8V and 1.3V. Note that if $V_{TT}$ is 1.25V, $V_L$ may be no greater than approximately 1.2V, and if $V_{TT}$ is 1.35V, $V_H$ may be no less than approximately 1.4V. The above mentioned voltage values are for Vcc equal to between 2.3V and 2.7V, and Vbias equal to approximately 0.2V above VTN, i.e., Vbias is in the range of 0.8V to 0.85V for 0.25 μm CMOS process technology. The minimum voltage swing between $V_H$ and $V_L$ should be greater than approximately 100 mV, but this value could be smaller and is dependent on channel characteristics and application. The voltage range of pre-amplifier 310 outputs Q+/Q– is in the range of 0.25V to 1.55V for this embodiment, i.e., $V_{QL}$ is approximately 0.25V and $V_{QH}$ is approximately 1.55V.

For an embodiment in which differential signals (Symbol and SymbolB) are used for transmitting data, the linear range can be essentially the same as that for the embodiment in which a single-ended Symbol signal is used—i.e., from 0.8V to 1.8V for 2.5V power supply and 0.25 um CMOS process technology. Furthermore, the operation of pre-amplifier 310 may be essentially the same as long as the voltage levels of the incoming transmission symbols fall within this linear range. However, with pre-amplifier 310 operating on the incoming Symbol signal with a respective differential SymbolB signal, the voltage values on the transmission lines can be scaled down 50% relatively to the voltage values that would be required for a single-ended Symbol single (with no differential SymbolB signal present). Accordingly, the voltage swings of SYMoutB and SYMout can be reduced by half, thereby further reducing EMI effects by requiring lower voltage values. Thus, for applications which are especially sensitive to EMI, the differential transmission signal approach is preferred over the single-ended transmission signal approach due to the reduced signal swing and cancellation of EM radiation when the differential channels are running in parallel in PCB or in a twisted pair cable environment.

Voltage generator 410 generally functions to generate an internal reference voltage $Q_{TT}$. As shown, voltage generator 410 can substantially similar to the pre-amplifier 310. Voltage generator 410 may comprise a number of transistors 400 through 408 which are connected in a manner similar to transistors 300 through 308 of pre-amplifier 310. The input terminals of voltage generator 410, which correspond to the gates of transistors 403 and 405, are connected to receive $V_{TT}$. Voltage generator 410 provides voltage $Q_{TT}$ (at the sources of transistors 400 and 407 and at the drains of transistors 401 and 408) for the one or more signal processing operations (such as an averaging operation performed by the transition and DC/AC detector circuit 370, as described below). The operation of the voltage generator 410 is substantially similar to that of pre-amplifier 310. One difference, however, is that both input terminals of voltage generator 410 are in DC condition (steady state) to provide a middle reference point for the outputs of Q+ and Q– of pre-amplifier 310, which runs in AC mode with SYMin and SYMinB as input signals.

Transition and DC/AC Detector

Transition and DC/AC detector 370 generally functions to determine the defining transition or lack of transition for each symbol received at a multi-symbol receiver 48. Transition and DC/AC detector 370 receives the differential output signals Q+ and Q– from pre-amplifier 310, reference voltage $Q_{TT}$ from voltage generator 410, and various timing signals (e.g., phase signals Ø1, Ø2, and $Ø_{EN1}$ or phase signals Ø3, Ø4, and $Ø_{EN2}$). Transition and DC/AC detector 370 may output Z1 and Z2 signals, which can be decoded (along with output signals from cross-region detector 320) to recover D2, D1, and D0 data bits for each symbol.

In one embodiment, transition and DC/AC detector 370 may generate a number of other signals which are used to derive the Z1 and Z2 signals. These signals may include Q–(t0), Q–(t1), Q+(t0), Q+(t1), AQ–(t0), AQ–(t1), AQ+(t0), and AQ+(t1). Q–(t0) is the sampled data of Q– output of the pre-amplifier 310 at time t0. Q–(t1) is the sampled data of Q– output of the pre-amplifier 310 at time t1. Q+(t0) is the sampled data of Q+ output of the pre-amplifier 310 at time t0. Q+(t1) is the sampled data of Q+ output of the pre-amplifier 310 at time t1. AQ–(t0) is the voltage-averaging (or charge-averaging) signal of the sampled data Q–(t0) and $Q_{TT}$(t0) at time t0, where $Q_{TT}$(t0) is the $Q_{TT}$ signal (output by the voltage generator 410) sampled at t0 time. AQ–(t1) is the voltage-averaging (or charge-averaging) signal of the sampled data Q–(t1) and $Q_{TT}$(t1) at time t1. AQ+(t0) is the voltage-averaging (or charge-averaging) signal of the sampled data Q+(t0) and $Q_{TT}$(t0) at time t0. AQ+(t1) is the voltage-averaging (or charge-averaging) signal of the sampled data Q+(t1) and $Q_{TT}$(t1) at time t1.

FIG. 11 illustrates exemplifying waveforms 350 for a transition and DC/AC detector 370, showing symbol averaging for symbol-000, symbol-001, symbol-010, symbol-011, symbol-101, symbol-100, symbol-110, and symbol-111, at time periods t0 and t1. The waveforms 350 are separately referred to by reference numerals 350A, 350B, 350C, 350D, 350E, 350F, 350G, and 350H. Time period t0 is the first half cycle of the clock, and time period t1 is the second half cycle of the clock. Time period t0 can begin at the rising edge of the clock, with time period t1 beginning at the falling edge, or vice versa. FIG. 11 also shows differential signals Q– and Q+ from pre-amplifier 310.

In waveform 350A, for symbol-000, at time period t0, signal Q– is at high voltage $V_{QH}$, and signal Q+ is at low voltage $V_{QL}$. At time period t1, signals Q– and Q+ go to voltage levels $V_{QTT-}$ and $V_{QTT+}$, respectively. The solid trace in each of waveforms 350, indicating signal Q+, represents the desired pattern for the data bits in each symbol. Thus, as seen in waveform 350A, the solid trace has the same shape as the trace shown in FIG. 2A for symbol-000. The dashed trace represents the Q– output signal from pre-amplifier 310. Waveform 350B shows the transition and region levels for symbol-001. At time period t0, signals Q+ and Q– are at voltage levels $V_{QTT-}$ and $V_{QTT+}$, respectively. Then, at time period t1, signal Q+ goes to high voltage $V_{QH}$, while signal Q– goes to low voltage $V_{QL}$. Waveform 350E shows the transition and region levels for symbol-101. At time period t0, signals Q+ and Q− are at voltage levels $V_{QL}$ and $V_{QH}$, respectively. Then, at time period t1, signal Q+ goes to high voltage $V_{QH}$, while signal Q− goes to low voltage $V_{QL}$. Note that the slope of Q+ in waveforms 350A, 350B, and 350E is positive (or rising transition).

Waveform 350C shows the transition and region levels for symbol-010, with signal Q+ going from voltage $V_{QTT+}$ at time period t0 down to low voltage $V_{QL}$ at time period t1, while signal Q− goes from voltage $V_{QTT-}$ at time period t0 up to high voltage $V_{QH}$ at time period t1. Waveform 350D shows the slope and voltage levels for symbol-011. At time period t0, signal Q+ is at high voltage $V_{QH}$, while signal Q− is at low voltage $V_{QL}$. At time period t1, signal Q+ drops to voltage $V_{QTT-}$, while signal Q− rises to voltage $V_{QTT+}$. Waveform 350G shows the transition and region levels for symbol-110. At time period t0, signals Q+ and Q− are at voltage levels $V_{QH}$ and $V_{QL}$, respectively. Then, at time period t1, signal Q+ goes to low voltage $V_{QL}$, while signal Q− goes to high voltage $V_{QH}$. In waveforms 350C, 350D, and 350G, the slope of Q+ is negative (or falling transition).

Waveform 350F shows the region level and a lack of transition for symbol-100. At time periods t0 and t1, signal Q+ is at low voltage $V_{QL}$, while signal Q− is at high voltage $V_{QH}$. Waveform 350G shows the region level and a lack of transition for symbol-111. At time periods t0 and t1, Q+ is at high voltage $V_{QH}$, while signal Q− is at low voltage $V_{QL}$.

For each transmission symbol in a received signal, transition and DC/AC detector 370 determines the defining transition (e.g., rising or falling), or lack of transition, and generates data accordingly. The defining transition may be characterized by a direction of the transition (positive slope or negative slope). In one embodiment, transition and DC/AC detector 370 outputs a Z1 and Z2 signals which collectively indicate whether, for any given incoming symbol, there is a rising transition, a falling transition, or no transition at all between time period t0 and time period t1. An exemplifying truth table 810 for this aspect of operation for transition and DC/AC detector 370 is shown in FIG. 15.

For example, transition and DC/AC detector 370 may output the same logic value (either logic-0 or logic-1) for both Z1 and Z2 signals when signal Q+ exhibits no transition (zero slope) and signal Q− exhibits no transition (zero slope) from time period t0 to time period t1, such as for symbol-100 and symbol-111. Otherwise, transition and DC/AC detector 370 may output a logic-0 value (low signal) for Z1 signal and a logic-1 value (high signal) for Z2 signal when the signal Q+ experiences a falling transition (negative slope) and signal Q− experiences a rising transition (positive slope) from time period t0 to time period t1, such as for symbol-011, symbol-010, and symbol-110. And transition and DC/AC detector 370 may output a logic-1 value (high signal) for Z1 signal and a logic-0 value (low signal) for Z2 signal when the signal Q+ experiences a rising transition (positive slope) and signal Q− experiences a falling transition (negative slope) from time period t0 to time period t1, such as for symbol-001, symbol-000, and symbol-101. In one embodiment, Z1 and Z2 may be used to derive a value for a variable Y. This value of Y may be equal to the result of an exclusive NOR operation performed on the values of Z1 and Z2.

In one embodiment, transition and DC/AC detector 370 may comprise one or more differencing circuits, one or more averaging circuits, and one or more differential latch amplifiers. One set of circuits can be utilized for the odd-numbered clock cycles and the other set can be utilized for the even-numbered clock cycles. Using odd and even clock cycles allows data to be sampled in one operation and processed and decoded in a second operation. This "interleaving" allows for high clock/data rate operations. For illustration, differencing circuits 802 and 804, averaging circuits 801, 803, 805, and 807, and differential latch amplifiers 806 and 808 will be described below for use with the odd-numbered clock cycles and phase signals Ø1, Ø2, $Ø_{avg1}$, and $Ø_{EN1}$. Although not shown, a similar set of circuits can be used with the even-numbered clock cycles and phase signals Ø3, Ø4, $Ø_{avg2}$, and $\equiv_{EN2}$.

Referring to FIG. 12, a schematic diagram is provided of differencing circuits 802 and 804 for use in the transition and DC/AC detector 370, in accordance with an embodiment of the present invention. The differencing circuits 802 and 804 sample and store the output signal Q+ and Q− of the pre-amplifier 310 to create differencing signals Q+(t0), Q+(t1), Q−(t0), and Q−(t1). In particular, differencing circuit 802 stores the value of signal Q+ in a capacitor C1 at time period t0 and in a capacitor C3 at time period t1. Differencing circuit 804 stores the value of signal Q− in a capacitor C2 at time period t0 and in a capacitor C4 at time period t1.

Differencing circuit 802 includes transistors 372 and 374, such as NMOS transistors, each having a terminal coupled to receive signal Q+. The gates of transistors 372 and 374 receive phase Ø1 and Ø2 signals, respectively, to turn transistors 372 and 374 off and on. Phase Ø1 and Ø2 signals can be overlapping and are generated from the symbol clock signal, which may be one-half the frequency of the clock (CLK) signal. Exemplifying relationships between phase Ø1, Ø2, Ø3, and Ø4 signals and the symbol clock and clock (CLK) signals are provided in FIG. 22. At the falling edge of phase Ø1 signal (corresponding to sampling during time period t0), transistor 372 is turned off. As a result, the value of signal Q+ at time period t0, denoted as Q+(t0), is stored in capacitor C1, which has one plate coupled to the other terminal of transistor 372. The opposite plate of capacitor C1 is coupled to ground. Capacitor C1 then holds the stored value when transistor 372 is off. At the falling edge of phase Ø2 signal (corresponding to sampling during time period t1), transistor 374 is turned off. Thus, the value of signal Q+ at time period t1, denoted as Q+(t1), is stored in capacitor C3, which has one plate coupled to the other terminal of transistor 374 and the other plate coupled to ground. Again, when transistor 374 is off, capacitor C3 holds the stored value.

Differencing circuit 804 is substantially the same as differencing circuit 802, except that signal Q−, instead of signal Q+, is applied at transistors 376 and 378. At the falling edge of phase Ø1 signal, capacitor C2 stores the value of signal Q− at time period t0, denoted as Q−(t0). At the falling edge of phase Ø2 signal, capacitor C4 stores the value of signal Q− at time period t1, denoted as Q−(t1).

Accordingly, for each symbol, capacitors C1 through C4 store a unique combination of voltages. For example, for symbol-010 (waveform 350C), at time period t0, signals Q+ and Q− are voltage levels $V_{QTT+}$ and $V_{QTT-}$, respectively. For some predetermined amount of time (e.g., at least half a cycle of the CLK signal) before going low during time period t0, phase Ø1 signal is high, thereby turning on transistor 372 of differencing circuit 802 and transistor 376 of differencing circuit 804. Thus, voltage values of $V_{QTT+}$ and $V_{QTT-}$ are stored in capacitor C1 and C2, respectively, at the falling edge of phase Ø1 signal. At time period t1, Q+ is at low voltage $V_{QL}$, and Q− is at high voltage $V_{QH}$. For some predetermined amount of time (e.g., at least half a cycle of the CLK signal) before going low during time period t1, phase Ø2 signal is high, which turns on transistors 374 and 378 of respective differencing circuits 802 and 804. This in turn allows Q+(t1), which has a value of $V_{QL}$, to be stored in capacitor C3 and Q−(t1), which has a value of $V_{QH}$, to be stored in capacitor C4 at the falling edge of phase Ø2 signal. The values stored in capacitors C1 through C4 represent unique signal transition information of the transmission symbol; these values may be received at the inputs of differential latch amplifiers of the transition and DC/AC detection circuit 370.

FIG. 13 is a schematic diagram of averaging circuits 801, 803, 805, and 807 for use in transition and DC/AC detector 370, in accordance with an embodiment of the present invention. These averaging circuits 801, 803, 805, and 807 sample the output signals Q+ and Q− of the pre-amplifier 310 and $Q_{TT}$ output signal of the voltage generator 410 and then averages the sampled data to generate signals AQ−(t0), AQ−(t1), AQ+(t0), and AQ+(t1).

For odd-numbered symbols, averaging circuits 801 and 803 generate values for signals AQ+(t0) and AQ+(t1) from Q+ and $Q_{TT}$ signals output from the pre-amplifier 310 and voltage generator 410. On a low transition of phase Ø1 signal, averaging circuit 801 latches Q+ and $Q_{TT}$ as sampled values Q+(t0) and $Q_{TT}$(t0) in capacitors C5 and C7, respectively, for time t0. Averaging circuit 803, at a low transition of phase Ø2 signal, latches Q+ and $Q_{TT}$ as sampled values Q+(t1) and $Q_{TT}$(t1) in capacitors C9 and C11, respectively, for time t1. After a time delay, phase ØOavg1 signal (odd#) goes high, which causes the voltage/charge stored in the capacitor pairs C5 and C7 to be equalized or averaged, thus generating a value for signal AQ+(t0). Similarly, the voltage/charge stored in the capacitor pairs C9 and C11 are equalized or averaged to generate a value for signal AQ+(t1).

For odd-numbered symbols, averaging circuits 805 and 807 generate values for signals AQ−(t0) and AQ−(t1) from Q− and $Q_{TT}$ signals output from the pre-amplifier 310 and voltage generator 410. On a low transition of phase Ø1 signal, averaging circuit 805 latches Q− and $Q_{TT}$ as sampled values Q−(t0) and $Q_{TT}$(t0) in capacitors C6 and C8, respectively, for time t0. Averaging Circuit 807, at a low transition of phase Ø2 signal, latches Q− and $Q_{TT}$ as sampled values Q−(t1) and $Q_{TT}$(t1) in capacitors C10 and C12, respectively, for time t1. After a time delay, phase Øavg1 signal (odd#) goes high, which causes the voltage/charge stored in the capacitor pairs C6 and C8 to be equalized or averaged, thus generating a value for signal AQ−(t0). Similarly, the voltage/charge stored in the capacitor pairs C10 and C12 are equalized or averaged to generate a value for signal AQ−(t1).

From another perspective, during time period t0, phase Ø1 signal is high, which turns on transistors 471, 472, 475, and 476 in averaging circuits 801 and 805. A first terminal of transistor 471 receives as input signal Q+, and a first terminal of transistor 475 receives as input signal Q−. The second terminal of each of transistors 471 and 475 is coupled to a first plate of capacitors C5 and C6, respectively, with the other plate being coupled to ground. A first terminal of each of transistors 472 and 476 receives as input signal $Q_{TT}$. The second terminal of each of transistors 472 and 476 is coupled to a first plate of capacitors C7 and C8, respectively, with the other plate being coupled to ground. Thus, at the falling edge of phase Ø1 signal, the value of Q+ at time period t0 is stored in capacitor C5, the value of Q− at time period t0 is stored in capacitor C6, and the value of $Q_{TT}$ at time period t0 is stored in capacitors C7 and C8.

Next, phase Ø2 signal goes high during time period t1, which turns on transistor 473 of averaging circuit 803 and transistor 477 of averaging circuit 807. A first terminal of transistor 473 receives as input signal Q+, and a first terminal of transistor 477 receives as input signal Q−. The second terminals of transistors 473 and 477 are coupled to a first plate of respective capacitors C9 and C10, with the other plate coupled to ground. A first terminal of each of transistors 474 and 478 receives as input signal $Q_{TT}$. The second terminal of each of transistors 474 and 478 is coupled to a first plate of capacitors C11 and C12, respectively, with the other plate being coupled to ground. Accordingly, at the falling edge of phase Ø2 signal, the value of Q+ at time period t1 is stored in capacitor C9, the value of Q− at time period t1 is stored in capacitor C10, and the value of $Q_{TT}$ at time period t1 is stored in capacitors C11 and C 12.

Thus, after one odd-numbered clock cycle, the voltage levels of Q+ at time period t0 (Q+(t0)), Q− at time period t0 (Q−(t0)), Q+ at time period t1 (Q+(t1)), and Q− at time t1 (Q−(t1)) are stored in capacitors C5, C6, C9, and C10, respectively. For example, for the case of waveform 350A, capacitor C5 stores $V_{QL}$, capacitor C6 stores $V_{QH}$, and capacitors C9 and C10 store $V_{QTT+}$ and $V_{QTT-}$, respectively.

After capacitors C5, C6, C9, and C10 have stored the values of Q+ and Q− at time periods t0 and t1, and after capacitors C7, C8, C11, and C12 have stored the values of $Q_{TT}$ at time periods t0 and t1, phase $Ø_{avg1}$ signal goes high (at the falling edge of phase Ø2 signal), which turns on transistors 481, 482, 483, and 484 of averaging circuits 801, 803, 805, and 807, respectively. Referring to averaging circuit 801, one terminal of transistor 481 is coupled to the first plate of capacitor C5 and the other terminal of transistor 481 is coupled to the first plate of capacitor C7. When phase signal $Ø_{avg1}$ is high, transistor 481 turns on and creates a voltage divider circuit. Thus, the resulting voltage at the first plate of either capacitor C5 or C7 is the average of the values stored in capacitors C5 and C7, i.e., [Q+(t0)+$Q_{TT}$(t0)]/2, designated AQ+(t0).

Similarly, for averaging circuit 803, when phase signal $Ø_{avg1}$ goes high, transistor 482 turns on, which results in an averaging of the voltages stored in capacitors C9 and C11. The value at capacitors C9 and C11 is the average of signal Q+ and $Q_{TT}$ at time period t1 or approximately [Q+(t1)+$Q_{TT}$(t1)]/2, designated AQ+(t1). Likewise, for averaging circuit 805, when phase signal $Ø_{avg1}$ goes high, transistor 483 turns on, which results in an averaging of the voltages stored in capacitors C6 and C8. The value at capacitors C6 and C8 is the average of signal Q− and $Q_{TT}$ at time period t0 or approximately [Q−(t0)+$Q_{TT}$(t0)]/2, designated AQ−(t0). For averaging circuit 807, when phase signal $Ø_{avg1}$ goes high, transistor 484 turns on, which results in an averaging of the voltages stored in capacitors C10 and C12. The value at capacitors C10 and C12 is the average of signal Q− and $Q_{TT}$ at time period t1 or approximately [Q−(t1)+$Q_{TT}$(t1)]/2, designated AQ−(t1).

Using the earlier example for symbol-000, AQ−(t0) and AQ−(t1) are shown as dashed lines in waveform 350A (FIG. 11), and AQ+(t0) and AQ+(t1) are shown as solid lines in waveform 350A.

Figure 14:
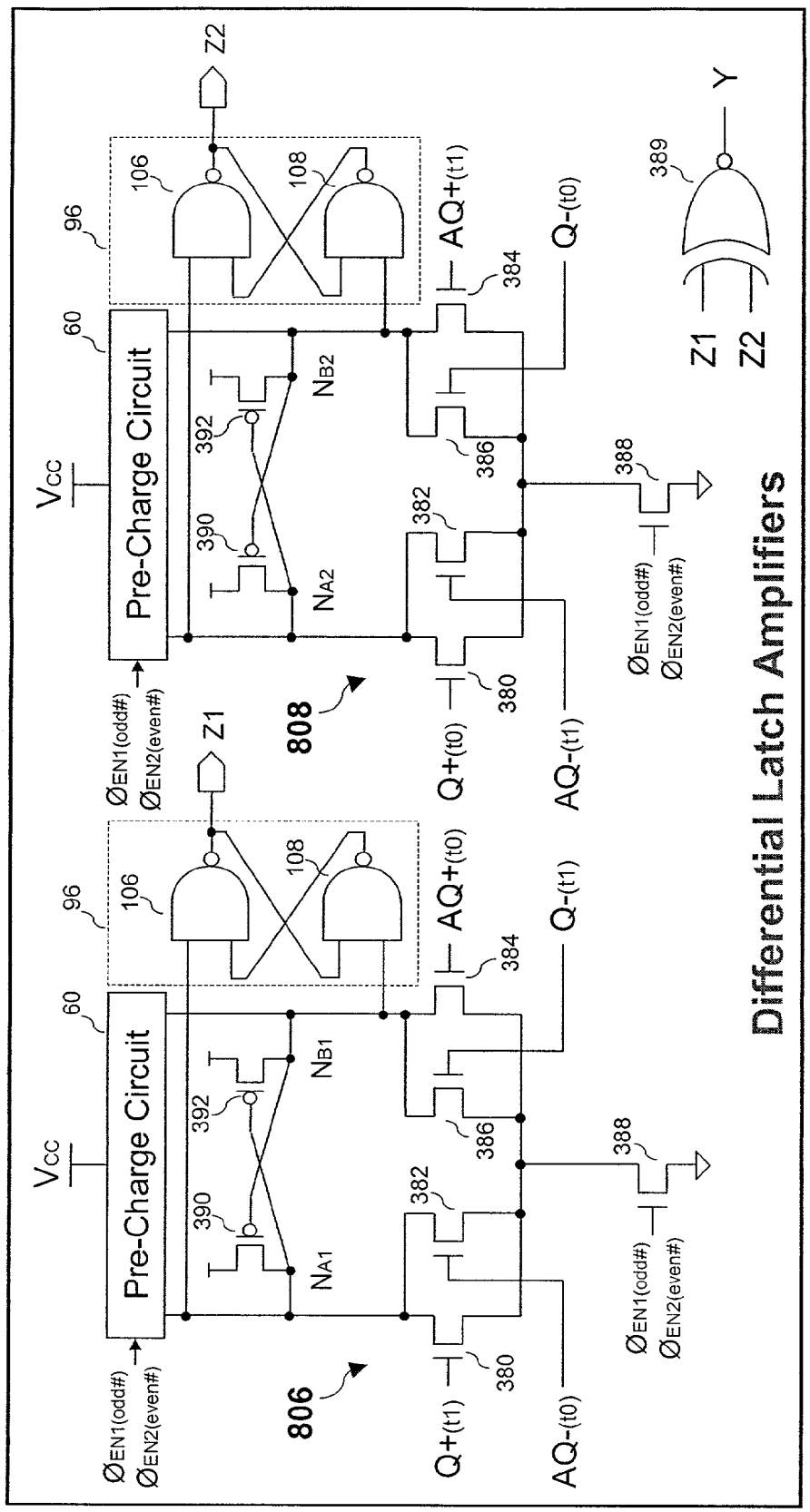
FIG. 14 is a schematic diagram of differential latch amplifiers with a pre-charge circuits for use in the transition and DC/AC detector, in accordance with an embodiment of the present invention.

FIG. 14 is a schematic diagram of differential latch amplifiers 806 and 808 with a pre-charge circuits 60 for use in the transition and DC/AC detector 370, in accordance with an embodiment of the present invention. Each differential latch amplifier 806 and 808 includes transistors 380, 382, 384, 386, 388, 390 and 392, with output nodes $N_A$ and $N_B$ (labeled $N_{A1}$ and $N_{B1}$ for amplifier 806, and $N_{A2}$ and $N_{B2}$ for amplifier 808) coupled to the input pins of a hold circuit 96 that is implemented with cross-coupled NAND gates 106 and 108. Differential latch amplifiers 806 and 808 amplify voltages at respective nodes $N_A$ and $N_B$, which are based on the different current flow through respective transistors 380, 382, 384, and 386 resulting from the voltage differences at the gates of transistors 380, 382, 384, and 386. Voltages at nodes $N_A$ and $N_B$ are then applied to hold circuit 96 to supply value for either Z1 or Z2 signal. The nodes $N_A$ and $N_B$ of differential latch amplifiers 806 and 808 are also coupled to a pre-charge circuit 60.

In each differential latch amplifier 806 and 808, a first terminal, such as a source terminal, of each of transistors 380, 382, 384, and 386 is commonly coupled to one terminal (such as the drain terminal) of a transistor 388 (e.g., N-type), with the other terminal (such as the source terminal) of transistor 388 coupled to ground. The transistor 388 may function as a current source transistor with its gate connected to receive phase enable ØEN1 signal (for odd-numbered clock cycles) or phase enable ØEN2 signal (for even-numbered clock cycles). That is, phase enable $Ø_{EN1}$ signal (or phase enable ØEN2 signal) is received at the gate of current source transistor 388 to allow current flow through transistors 380, 382, 384, and 386. Voltage differences between the gates of transistors 380, 382, 384, and 386 generate different current flow through the transistors.

Each differential latch amplifier 806 and 808 has four differential inputs that are the gates of transistors 380, 382, 384, and 386. For the differential latch amplifier 806, the gate of transistor 380 is connected to receive Q+(t1), the gate of transistor 382 is connected to receive AQ−(t0), the gate of transistor 384 is connected to receive AQ+(t0), and the gate of transistor 386 is connected to receive Q−(t1). For the differential latch amplifier 808, the gate of transistor 380 is connected to receive Q+(t0), the gate of transistor 382 is connected to receive AQ−(t1), the gate of transistor 384 is connected to receive AQ+(t1), and the gate of transistor 386 is connected to receive Q−(t0).

For both differential latch amplifiers 806 and 808, pre-charge circuit 60 charges nodes $N_A$ and $N_B$ to a logic-1 value before phase signal $Ø_{EN1}$ turns on current source transistor 388. Thus, when phase signal $Ø_{EN1}$ is low, pre-charge circuit 60 is on and pre-charges nodes $N_A$ and $N_B$, and when phase signal $Ø_{EN1}$ is high, pre-charge circuit 60 is off. Pre-charge circuit 60 brings nodes $N_A$ and $N_B$ to a "high" or logic-1 value, such as approximately the supply voltage Vcc minus the threshold voltage VTP of P-type transistors 390 and 392, with each having a first terminal, such as the drain terminal, coupled to nodes $N_A$ and $N_B$, respectively. Node $N_A$ is also coupled to the second terminal (such as the drain terminal) of each of transistors 380 and 382, to the first terminal (such as the drain terminal) of transistor 390, and to the gate of transistor 392. Node $N_B$ is also coupled to the second terminal (such as the drain terminal) of each of transistors 386 and 384, to the first terminal (such as the drain terminal) of transistor 392, and to the gate of transistor 390. The second terminal (such as the source terminal) of each of transistors 390 and 392 is coupled to source voltage Vcc.

Based on the difference of the sampled voltages Q+(t1), AQ−(t0), AQ+(t0), and Q−(t1) in differential latch amplifier 806, different magnitudes of current flow through transistors 380, 382, 384, and 386 and nodes $N_{A1}$ and $N_{B1}$ when transistor 388 is turned on. P-type transistors 390 and 392 increase the voltage difference between nodes $N_{A1}$ and $N_{B1}$. When applying the difference input signals Q+(t1), Q−(t1), AQ+(t0), and AQ−(t0) to the gates of transistors 380, 386, 384 and 382, respectively, in differential latch amplifier 806, a difference voltage is established between nodes $N_{A1}$ and $N_{B1}$. Transistors 390 and 392 may function as positive feedback transistors which further amplify the difference voltage between nodes $N_{A1}$ and $N_{B1}$ to almost rail-to-rail voltage.

Differential latch amplifier 806 outputs the Z1 signal. If the total current flow through the transistor pair 380 and 382 is higher than that of transistor pair 384 and 386, then node $N_{A1}$ will be latched to low voltage level (logic-0) and node $N_{B1}$ will be latched to high voltage level (logic-1) by the differential latch amplifier 806. The latched information at nodes $N_{A1}$ and $N_{B1}$ will be stored in the hold circuit 96 implemented by cross-coupled NAND gates 106 and 108 and output as Z1 equal to logic-1. Alternatively, if the total current flow through the transistor pair 380 and 382 is lower than that of transistor pair 384 and 386, then node $N_{A1}$ will be latched to high voltage level (logic-1) and node $N_{B1}$ will be latched to low voltage level (logic-0). The latched information at nodes $N_{A1}$ and $N_{B1}$ will be stored in the cross-coupled NAND gates 106 and 108 and output as Z1 equal to logic-0. The logic operation of this embodiment of differential latch amplifier 806 is provided in the following table.

| Differential Input Signals | Z1 |
| --- | --- |
| [Q + (t1) + AQ − (t0)] > [Q − (t1) + AQ + (t0)] | Logic-1 |
| [Q + (t1) + AQ − (t0)] < [Q − (t1) + AQ + (t0)] | Logic-0 |

Based on the difference of the sampled voltages Q+(t0), AQ−(t1), AQ+(t1), and Q−(t0) in differential latch amplifier 808, different magnitudes of current flow through transistors 380, 382, 384, and 386 and nodes $N_{A2}$ and $N_{B2}$ when transistor 388 is turned on. P-type transistors 390 and 392 increase the voltage difference between nodes $N_{A2}$ and $N_{B2}$. When applying the difference input signals Q+(t0), Q−(t0), AQ+(t1), and AQ−(t1) to the gates of transistors 380, 386, 384 and 382, respectively, in differential latch amplifier 808, a difference voltage is established between nodes $N_{A2}$ and $N_{B2}$. Transistors 390 and 392 may function as positive feedback transistors which further amplify the difference voltage between nodes $N_{A2}$ and $N_{B2}$ to almost rail-to-rail voltage.

Differential latch amplifier 808 outputs the Z2 signal. If the total current flow through the transistor pair 380 and 382 is higher than that of transistor pair 384 and 386, then node $N_{A2}$ will be latched to voltage low level (logic-0) and node $N_{B2}$ will be latched to voltage high level (logic-1) by the differential latch amplifier 808. The latched information at nodes $N_{A2}$ and $N_{B2}$ will be stored in the cross-coupled NAND gates 106 and 108 and output as Z2 equal to logic-1. Alternatively, if the total current flow through the transistor pair 380 and 382 is lower than that of transistor pair 384 and 386, then node $N_{A2}$ will be latched to high voltage level (logic-1) and node $N_{B2}$ will be latched to low voltage level (logic-0). The latched information at nodes $N_{A2}$ and $N_{B2}$ will be stored in the cross-coupled NAND gates 106 and 108 and output as Z2 equal to logic-0. The logic operation of this embodiment of differential latch amplifier 808 is provided in the following table.

| Differential Input Signals | Z2 |
| --- | --- |
| [Q + (t0) + AQ − (t1)] > [Q − (t0) + AQ + (t1)] | Logic-1 |
| [Q + (t0) + AQ − (t1)] < [Q − (t0) + AQ + (t1)] | Logic-0 |

FIG. 15 is a truth table 810 for the transition and DC/AC detector 370, in accordance with an embodiment of the present invention. Truth table 810 summarizes the logical states of Z1 and Z2 for symbols-11, -100, -011, -001, -010, -000, -110, and -101. The two columns on the left side of the table 810 summarize the voltage condition of these symbols at times t0 and t1, respectively. The two columns on the right side of the table 810 summarize the region (i.e., upper, lower, or cross-region) and symbol type (DC or AC) for each of the eight symbols. This truth table 810 indicates that data bit D1 may have the same polarity as Z2 (i.e., D1=Z2).

An exclusive-NOR operation may be performed on signals Z1 and Z2 to output signal Y. Y can be a used to derive for the most significant data bit (msb) D2. In one embodiment, Y=logic-1 corresponds to DC symbols, and Y=logic-0 corresponds to AC symbols. When Y=logic-0, Z2=logic-1 corresponds to a symbol which transitions from high to low between time t0 and t1, and Z2=logic-0 corresponds to a symbol which transitions from low to high transition between time t0 and t1.

Cross-Region Detector

Cross-region detector 320 generally functions to determine, for each transmission symbol received at a multi-symbol receiver 48, whether there is any cross-over between regions. Cross-region detector 320 receives the differential output signals Q+ and Q− from pre-amplifier 310 and various timing signals (e.g., phase signals $\varnothing 1$, $\varnothing 2$, $\varnothing_{avg1}$, and $\varnothing_{EN1}$ or phase signals $\varnothing 3$, $\varnothing 4$, $\varnothing_{avg2}$, and $\varnothing_{EN2}$). Cross-region detector 320 may output R1 and R2 signals, which can be decoded (along with output signals from transition and DC/AC detector 370) to recover D2, D1, and D0 data bits for each symbol.

In one embodiment, cross-region detector 320 may generate a number of other signals which are used to derive the R1 and R2 signals. These signals may include $Q-_{AV}$ and $Q+_{AV}$. $Q-_{AV}$ is the voltage-averaging (or charge-averaging) signal of the sampled data Q−(t0) and Q−(t1). $Q+_{AV}$ is the voltage-averaging (or charge-averaging) signal of the sampled data Q+(t0) and Q+(t1). Q−(t0) is the sampled data of Q− output of the pre-amplifier 310 at time t0. Q−(t1) is the sampled data of Q− output of the pre-amplifier 310 at time t1. Q+(t0) is the sampled data of Q+ output of the pre-amplifier 310 at time t0. Q+(t1) is the sampled data of Q+ output of the pre-amplifier 310 at time t1. Q−(t0), Q−(t1), Q+(t0) and Q+(t1) signals can be generated by the differencing circuits 802 and 804 of transition and DC/AC detector 370.

Figure 16:
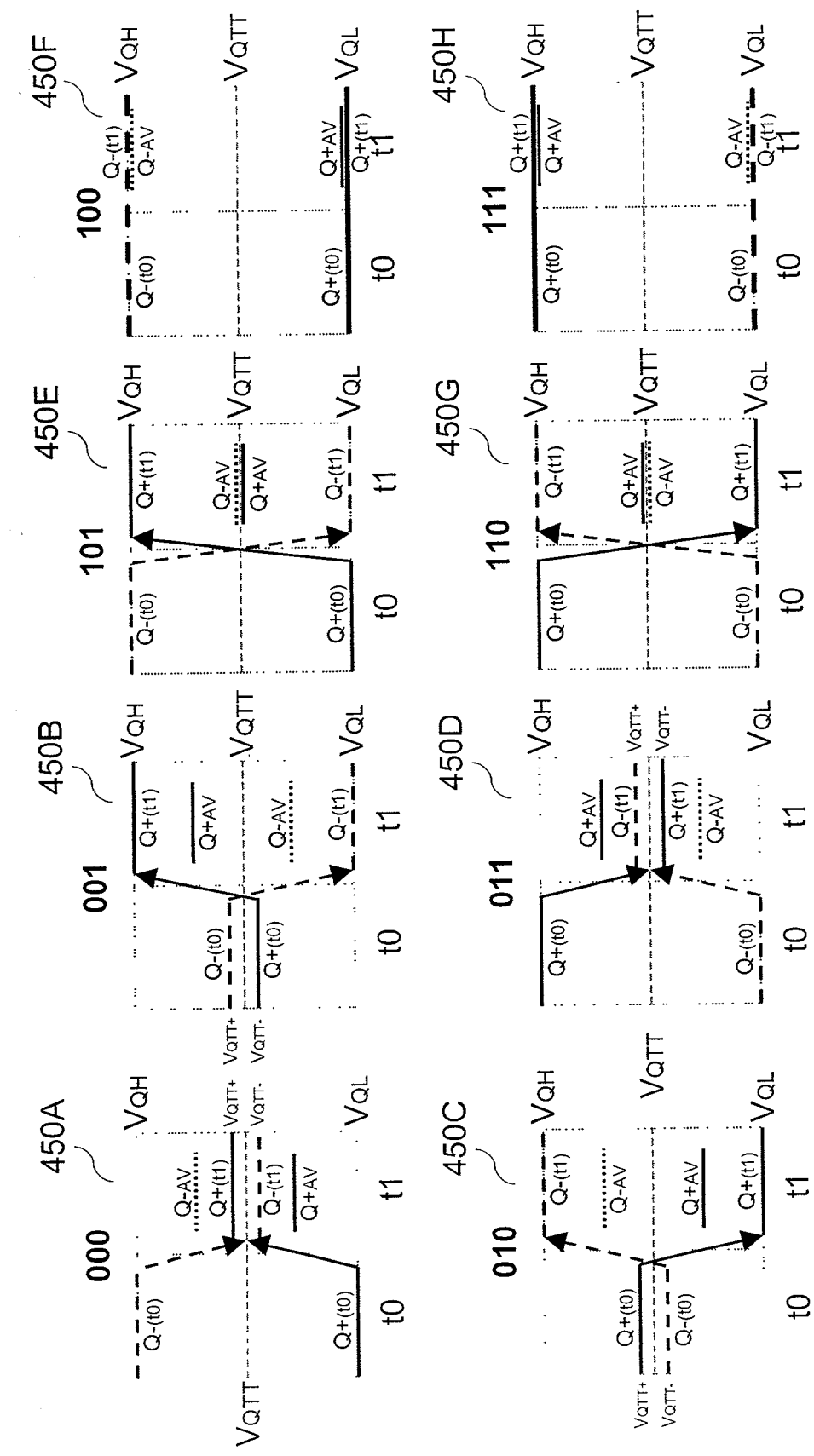
FIG. 16 illustrates exemplifying waveforms showing symbol averaging for each of a plurality of symbols for region detection.

FIG. 16 illustrates exemplifying waveforms 450 for cross-region detector 320. The waveforms 450 are separately referred to by reference numerals 450A, 450B, 450C, 450D, 450E, 450F, 450G, and 450H. Time period t0 is the first half cycle of the clock, and time period t1 is the second half cycle of the clock. Time period t0 can begin at the rising edge of the clock, with time period t1 beginning at the falling edge, or vice versa. Waveforms 450A through 450H of FIG. 16 are similar to waveforms 350A through 350H of FIG. 11, except that, in addition to waveforms input to cross-region detector 320, waveforms 450A through 450H also show average values of signals Q+ and Q− for each of symbol-000, symbol-001, symbol-010, symbol-011, symbol-01, symbol-100, symbol-110, symbol-111, respectively, generated from the input signals Q+ and Q− at time periods t0 and t1. For each of waveforms 450A through 450H, the solid line shows the average value for Q+, designated $Q+_{AV}$, and the dashed line shows the average value for Q−, designated $Q-_{AV}$.

In one embodiment, cross-region detector 320 outputs R1 and R2 signals which collectively indicate whether, for any given incoming transmission symbol, there is a cross-over or swing from one region into another between time period t0 and time period t1. An exemplifying truth table 812 for this aspect of operation for cross-region detector 320 is shown in FIG. 19.

For example, cross-region detector 320 may output different logic values for R1 and R2 signals when there is a transition from one region into another from time period t0 to time period t1, such as for symbol-110 and symbol-101. Otherwise, cross-region detector 320 may output the same logic value for R1 and R2 signals there is no transition between regions from time period t0 to time period t1, such as for symbol-111, symbol-100, symbol-011, symbol-001, symbol-010, and symbol-000. In one embodiment, R1 and R2 may be used to derive a value for a variable S. This value of S may be equal to the result of an exclusive OR operation performed on the values of R1 and R2.

In one embodiment, cross-region detector 320 may comprise one or more averaging circuits and one or more differential latch amplifiers. One set of circuits can be utilized for the odd-numbered clock cycles and the other set can be utilized for the even-numbered clock cycles. Using odd and even clock cycles allows data to be sampled in one operation and processed and decoded in a second operation. This "interleaving" allows for high clock/data rate operations. For illustration, averaging circuits 902 and 904 and differential latch amplifiers 906 and 908 will be described below for use with the odd-numbered clock cycles and phase signals $\varnothing 1$, $\varnothing 2$, $\varnothing_{avg1}$, and $\varnothing_{EN1}$. Although not shown, a similar set of circuits can be used with the even-numbered clock cycles and phase signals $\varnothing 3$, $\varnothing 4$, $\varnothing_{avg2}$, and $\varnothing_{EN2}$.

Referring to FIG. 17, a schematic diagram is provided of averaging circuits 902 and 904 for use in cross-region detector 320, in accordance with an embodiment of the present invention. The averaging circuits 902 and 904 sample the output signals Q+ and Q− of the pre-amplifier 310 and then average the sampled data to create averaging signals $Q+_{AV}$ and $Q-_{AV}$.

For odd-numbered transmission symbols, averaging circuit 902 generates values for averaging signal $Q+_{AV}$ from Q+ signal output from the pre-amplifier 310. On a low transition of phase $\varnothing 1$ signal, averaging circuit 902 latches Q+ as sampled values Q+(t0) in capacitor C13 for time t0. Averaging circuit 902, at a low transition of phase $\varnothing 2$ signal, latches Q+ as sampled values Q+(t1) in capacitor C14 for time t1. After a time delay, phase average $\varnothing avg1$ signal (odd#) goes high, which causes the voltage/charge stored in the capacitor pair C13 and C14 to be equalized or averaged, thus generating a value for signal $Q+_{AV}$.

Likewise, for odd-numbered transmission symbols, averaging circuit 904 generates values for averaging signal $Q-_{AV}$ from Q− signal output from the pre-amplifier 310. On a low transition of phase $\varnothing 1$ signal, averaging circuit 904 latches Q− as sampled values Q−(t0) in capacitor C15 for time t0. Averaging circuit 904, at a low transition of phase $\varnothing 2$ signal, latches Q− as sampled values Q−(t1) in capacitor C16 for time t1. After a time delay, phase average $\varnothing avg1$ signal (odd#) goes high, which causes the voltage/charge stored in the capacitor pair C15 and C16 to be equalized or averaged, thus generating a value for signal $Q-_{AV}$.

From another perspective, during time period t0, phase $\varnothing 1$ signal is high, which turns on transistors 322 and 328 in respective averaging circuits 902 and 904. A first terminal of transistor 322 receives as input signal Q+, and a first terminal of transistor 328 receives as input signal Q−. The second terminal of each of transistors 322 and 328 is coupled to a first plate of capacitors C13 and C15, respectively, with the other plate being coupled to ground. Thus, at the falling edge of phase Ø1 signal, the value of Q+ at time period t0 is stored in capacitor C13 and the value of Q− at time period t0 is stored in capacitor C15.

Next, phase signal Ø2 goes high during time period t1, which turns on transistor 324 of averaging circuit 902 and transistor 330 averaging circuit 904. A first terminal of transistor 324 receives as input signal Q+, and a first terminal of transistor 330 receives as input signal Q−. The second terminals of transistors 324 and 330 are coupled to a first plate of respective capacitors C14 and C16, with the other plate coupled to ground. Accordingly, at the falling edge of phase signal Ø2, the value of Q+ at time period t1 is stored in capacitor C14 and the value of Q− at time period t1 is stored in capacitor C16.

Thus, after one odd-numbered clock cycle, the voltage levels of Q+ at time period t0 (Q+(t0)), Q− at time period t0 (Q−(t0)), Q+ at time period t1 (Q+(t1)), and Q− at time t1 (Q−(t1)) are stored in capacitors C13 through C16, respectively. For example, for the case of waveform 450A, capacitor C13 stores $V_{QL}$, capacitor C15 stores $V_{QH}$, and capacitors C14 and C16 store $V_{QTT+}$ and $V_{QTT-}$, respectively.

After capacitors C13 through C16 have stored the voltages of Q+ and Q− at time periods t0 and t1, phase average $Ø_{avg1}$ signal goes high (at the falling edge of phase Ø2 signal), which turns on transistor 326 of averaging circuit 902 and transistor 332 of averaging circuit 904. In averaging circuit 902, one terminal of transistor 326 is coupled to the first plate of capacitor C13 and the other terminal of transistor 326 is coupled to the first plate of capacitor C 14, with the capacitance of capacitors C13 and C14 designed to be equal. When phase average $Ø_{avg1}$ signal is high, transistor 326 turns on and creates a voltage divider circuit. Thus, the resulting voltage at the first plate of either capacitor C13 or C14 is the average of the values stored in capacitors C13 and C14, i.e., [Q+(t0)+Q+(t1)]/2, or the average of signal Q+ for time periods t0 and t1, designated $Q+_{AV}$. Similarly, in averaging circuit 902, when phase average $Ø_{avg1}$ signal goes high, transistor 332 turns on, which results in an averaging of the voltages stored in capacitors C15 and C16. The value at the first plate capacitor C15 and C16 is the average of signal Q− at time periods t0 and t1 or approximately [Q−(t0)+Q−(t1)]/2, designated $Q-_{AV}$. Using the earlier example for symbol-000, $Q+_{AV}$ and $Q-_{AV}$ are shown as the straight solid and dashed lines of waveform 450A, respectively, in FIG. 16.

Figure 18:
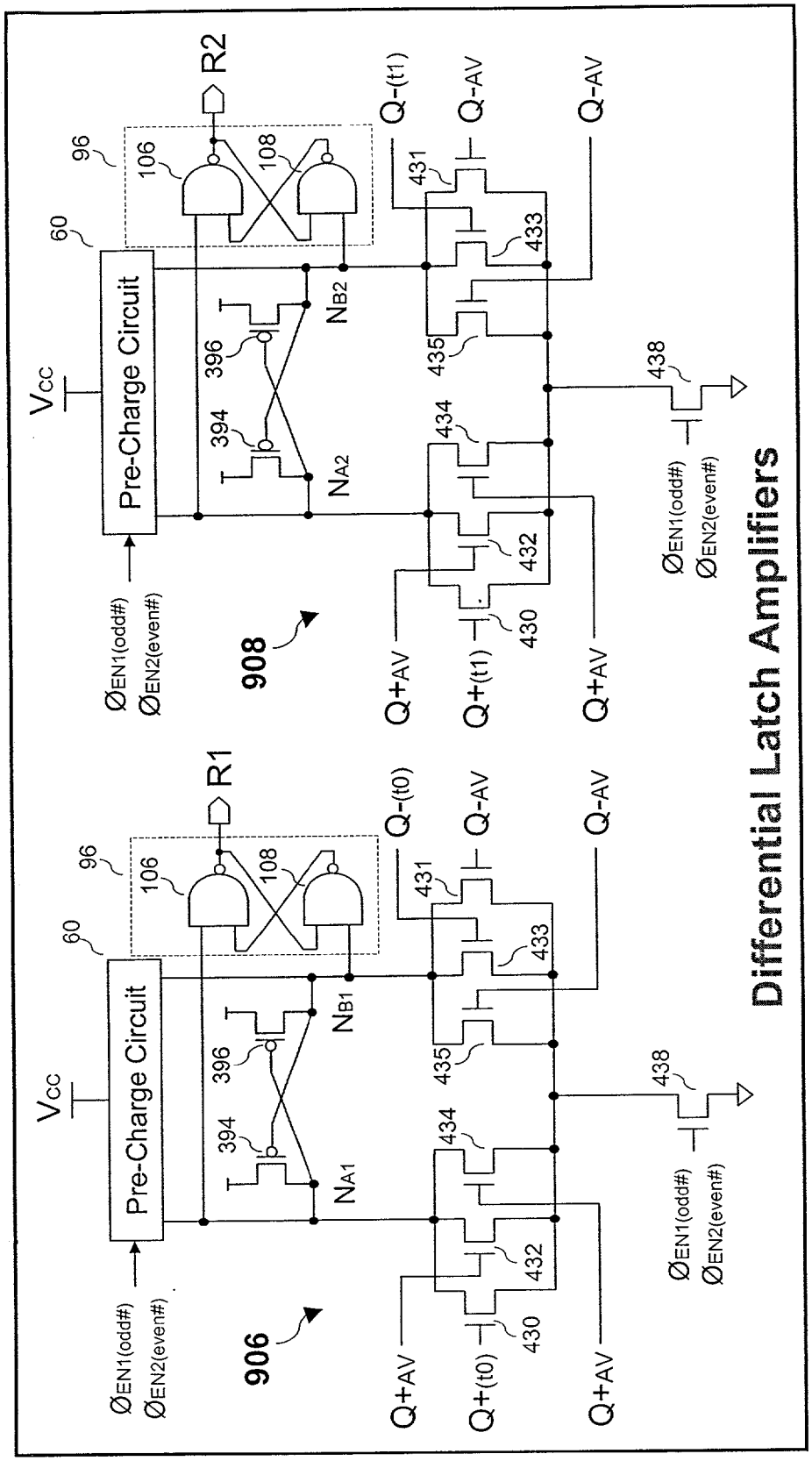
FIG. 18 is a schematic diagram of differential latch amplifiers for use in the cross-region detector, in accordance with an embodiment of the present invention.

Signals $Q+_{AV}$ and $Q-_{AV}$ from averaging circuits 902 and 904 are received at differential latch amplifiers 906 and 908. FIG. 18 is a diagram of differential latch amplifiers 906 and 908 with pre-charge circuit 60 for use in cross-region detector 320. As depicted, each differential latch amplifier includes transistors 430, 432, 434, 431, 433, 435, 438, 394 and 396, with output nodes NA and NB (labeled $N_{A1}$ and $N_{B1}$ for amplifier 906, and $N_{A2}$ and $N_{B2}$ for amplifier 908) coupled to the input pins of a hold circuit 96 that is implemented as cross-coupled NAND gates 106 and 108. Differential latch amplifiers 906 and 908 amplify voltages at respective nodes $N_A$ and $N_B$, which are based on the different current flow through respective transistors 430, 432, 434, 431, 433, and 435 resulting from the voltage differences at the gates of these transistors. Voltages at nodes $N_A$ and $N_B$ are then applied to hold circuit 96 to supply value for either R1 or R2 signal. The nodes $N_A$ and NB of differential latch amplifiers 906 and 908 are also coupled to a pre-charge circuit 60.

In each differential latch amplifier 906 and 908, a first terminal, such as a source terminal, of each of transistors 430, 432, 434, 431, 433, and 435 is commonly coupled to one terminal (such as a drain terminal) of a transistor 438 (e.g., N-type), with the other terminal (such as a source terminal) of transistor 438 coupled to ground. The transistor 438 may function as a current source transistor with its gate connected to receive phase enable $Ø_{EN1}$ signal (for odd-numbered clock cycles) or phase enable $Ø_{EN2}$ signal (for even-numbered clock cycles). That is, phase enable $Ø_{EN1}$ signal (or phase enable ØEN2 signal) is received at the gate of current source transistor 438 to allow current flow through transistors 430, 432, 434, 431, 433, and 435. Voltage differences between the gates of transistors 430, 432, 434, 431, 433, and 435 generate different current flow through the transistors.

Each differential latch amplifier 906 and 908 may have six differential inputs that are the gates of transistors 430, 432, 434, 431, 433, and 435. For the differential latch amplifier 906, the gate of transistor 430 is connected to receive Q+(t0), the gates of transistors 432 and 434 are connected to receive $Q+_{AV}$, the gates of transistors 431 and 435 are connected to receive $Q-_{AV}$, and the gate of transistor 433 is connected to receive Q−(t0). For the differential latch amplifier 908, the gate of transistor 430 is connected to receive Q+(t1), the gates of transistors 432 and 434 are connected to receive $Q+_{AV}$, the gates of transistors 431 and 435 are connected to receive $Q-_{AV}$, and the gate of transistor 433 is connected to receive Q−(t1).

For both differential latch amplifiers 906 and 908, pre-charge circuit 60 charges nodes $N_A$ and $N_B$ to a logic-1 value before phase signal $Ø_{EN1}$ turns on current source transistor 438. Thus, when phase signal $Ø_{EN1}$ is low, pre-charge circuit 60 is on and pre-charges nodes $N_A$ and $N_B$, and when phase signal $Ø_{EN1}$ is high, pre-charge circuit 60 is off. Pre-charge circuit 60 brings nodes $N_A$ and $N_B$ to a "high" or logic-1 value, such as approximately the supply voltage Vcc minus the threshold voltage VTP of P-type transistors 394 and 396, with each having a first terminal, such as the drain terminal, coupled to nodes $N_A$ and $N_B$, respectively. Node $N_A$ is also coupled to the second terminal (such as the drain terminal) of each of transistors 430, 432, and 424, to the first terminal (such as the drain terminal) of transistor 394, and to the gate of transistor 396. Node NB is also coupled to the second terminal (such as the drain terminal) of each of transistors 431, 433, and 435, to the first terminal (such as the drain terminal) of transistor 396, and to the gate of transistor 394. The second terminal (such as the source terminal) of each of transistors 394 and 396 is coupled to source voltage Vcc.

Based on the difference of the sampled voltages Q+(t0), $Q-_{AV}$, $Q+_{AV}$ and Q−(t0) in differential latch amplifier 906, different magnitudes of current flow through transistors 430, 432, 434, 431, 433, and 435 and nodes $N_{A1}$ and $N_{B1}$ when transistor 438 is turned on. P-type transistors 394 and 396 increase the voltage difference between nodes $N_{A1}$ and $N_{B1}$. When applying the difference input signals Q+(t0), Q−(t0), $Q-_{AV}$, and $Q+_{AV}$ to the gates of transistors 430, 432, 434, 431, 433, and 435 in differential latch amplifier 906, a difference voltage is established between nodes $N_{A1}$ and $N_{B1}$. Transistors 394 and 396 may function as positive feedback transistors which further amplify the difference voltage between nodes $N_{A1}$ and $N_{B1}$ to almost rail-to-rail voltage.

Differential latch amplifier 906 outputs the R1 signal. If the total current flow through the transistors 430, 432, and 434 is higher than that of transistors 431, 433, and 435, then node $N_{A1}$ will be latched to low voltage level (logic-0) and node $N_{B1}$ will be latched to high voltage level (logic-1) by the differential latch amplifier 906. The latched information at nodes $N_{A1}$ and $N_{B1}$ will be stored in the hold circuit 96 implemented by cross-coupled NAND gates 106 and 108 and output as R1 equal to logic-1. Alternatively, if the total current flow through transistors 430, 432, and 434 is lower than that of transistors 431, 433, and 435, then node $N_{A1}$ will be latched to high voltage level (logic-1) and node $N_{B1}$ will be latched to low voltage level (logic-0). The latched information at nodes $N_{A1}$ and $N_{B1}$ will be stored in the cross-coupled NAND gates 106 and 108 and output as R1 equal to logic-0. The logic operation of this embodiment of differential latch amplifier 906 is provided in the following table.

| Differential Input Signals | R1 |
|---|---|
| [Q + (t0) + 2Q + AV] > [Q – (t0) + 2Q – AV] | Logic-1 |
| [Q + (t0) + 2Q + AV] < [Q – (t0) + 2Q – AV] | Logic-0 |

Based on the difference of the sampled voltages Q+(t1), Q–$_{AV}$, Q+$_{AV}$ and Q–(t1) in differential latch amplifier 908, different magnitudes of current flow through transistors 430, 432, 434, 431, 433, and 435 and nodes $N_{A2}$ and $N_{B2}$ when transistor 438 is turned on. P-type transistors 394 and 396 increase the voltage difference between nodes $N_{A2}$ and $N_{B2}$. When applying the difference input signals Q+(t1), Q–(t1), Q–$_{AV}$, and Q+$_{AV}$ to the gates of transistors 430, 432, 434, 431, 433, and 435 in differential latch amplifier 908, a difference voltage is established between nodes $N_{A2}$ and $N_{B2}$. Transistors 394 and 396 may function as positive feedback transistors which further amplify the difference voltage between nodes $N_{A2}$ and $N_{B2}$ to almost rail-to-rail voltage.

Differential latch amplifier 908 outputs the R2 signal. If the total current flow through the transistors 430, 432, and 434 is higher than that of transistors 431, 433, and 435, then node $N_{A2}$ will be latched to low voltage level (logic-0) and node $N_{B2}$ will be latched to high voltage level (logic-1) by the differential latch amplifier 908. The latched information at nodes $N_{A2}$ and $N_{B2}$ will be stored in the hold circuit 96 implemented by cross-coupled NAND gates 106 and 108 and output as R2 equal to logic-1. Alternatively, if the total current flow through transistors 430, 432, and 434 is lower than that of transistors 431, 433, and 435, then node $N_{A2}$ will be latched to high voltage level (logic-1) and node $N_{B2}$ will be latched to low voltage level (logic-0). The latched information at nodes $N_{A2}$ and $N_{B2}$ will be stored in the cross-coupled NAND gates 106 and 108 and output as R2 equal to logic-0. The logic operation of this embodiment of differential latch amplifier 908 is provided in the following table.

| Differential Input Signals | R2 |
|---|---|
| [Q + (t1) + 2Q + AV] > [Q – (t1) + 2Q – AV] | Logic-1 |
| [Q + (t1) + 2Q + AV] < [Q – (t1) + 2Q – AV] | Logic-0 |

FIG. 19 is a truth table 812 for the cross-region detector 320, in accordance with an embodiment of the present invention. Truth table 812 summarizes the logical states of R1 and R2 for symbols -111, -100, -001, -001, -010, -000, -110, and -101. The two columns on the left side of the table 812 summarize the voltage condition of these symbols at times t0 and t1, respectively. The two columns on the right side of the table 812 summarize the region (i.e., upper, lower, or cross-region) and symbol type (DC or AC) for each of the eight symbols. This truth table 812 indicates that data bit D0 may have the same polarity as R2 (i.e., D0=R2).

An exclusive-OR operation may be performed on signals R1 and R2 to output signal S. S can be used to derive for the most significant data bit (msb) D2. In one embodiment, S=logic-1 corresponds to symbols in which there is a transition from one region into another (i.e., big/cross-region transition symbols), and S=logic-0 corresponds to symbols in which there is no transition from one region into another (i.e., small transition and DC symbols).

Pre-Charge Circuit

Figure 20:
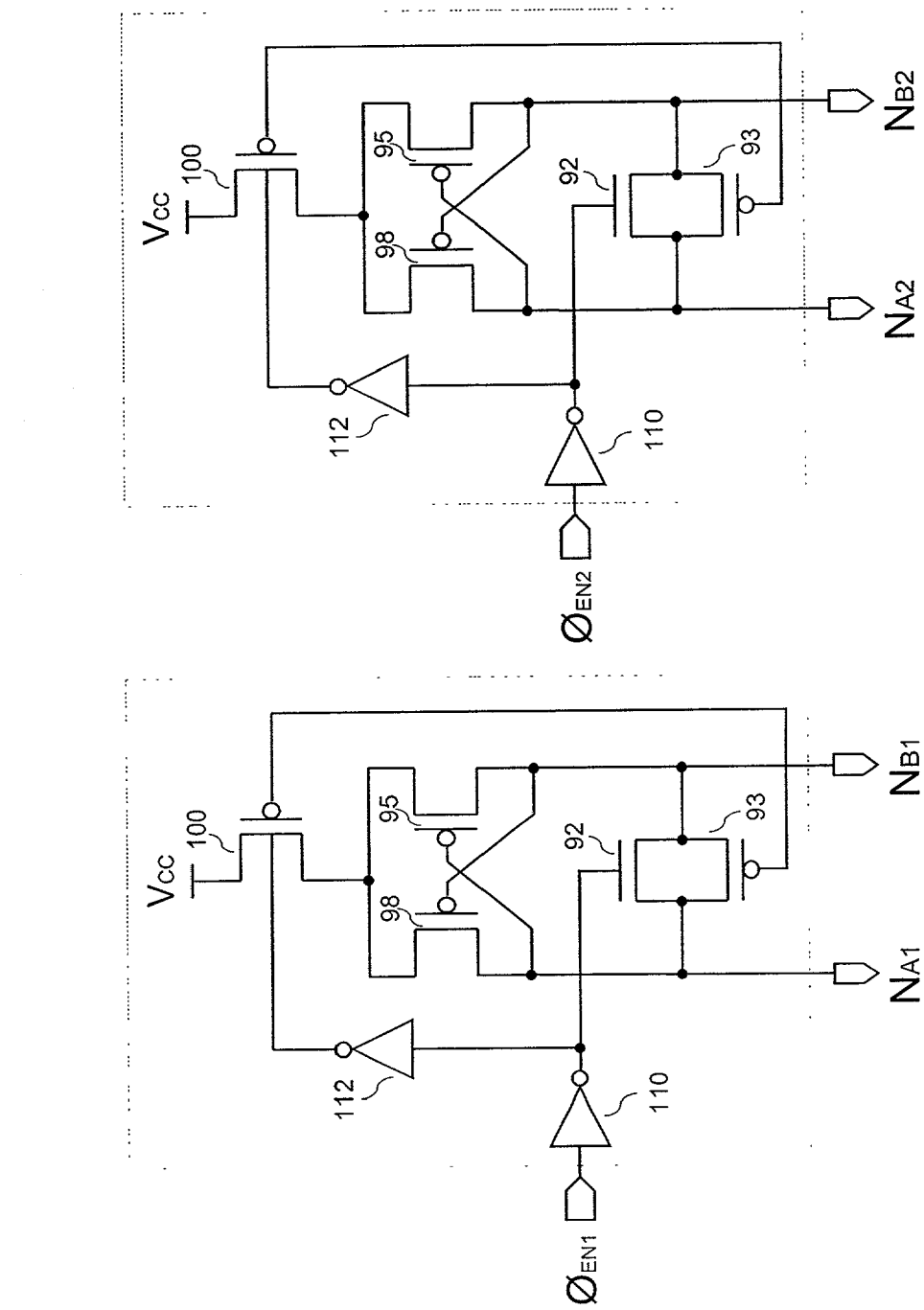
FIG. 20 is a schematic diagram of a pre-charge circuit, in accordance with an embodiment of the present invention.

FIG. 20 is a circuit diagram of one embodiment of pre-charge circuits 60 for use with the differential latch amplifiers 806 and 808 of FIG. 14 and differential latch amplifiers 906 and 908 of FIG. 18. As shown, pre-charge circuit 60 includes two inverters 110 and 112 to generate signals from phase enable $Ø_{EN1}$ signal for operation of the circuit 60 during odd-numbered clock cycles. Note that a similar circuit is shown for use with phase enable $Ø_{EN2}$ signal for even-numbered clock cycles. When phase enable $Ø_{EN1}$ signal is low (prior to the operation of differential latch amplifier 806 or 808 (FIG. 14) and differential latch amplifier 906 or 908 (FIG. 18)), the output of inverter 110, which is coupled to the gate of transistor 92, is high, thereby turning on transistor 92. Also, when phase enable $Ø_{EN1}$ signal is low, the output of inverter 112, which is coupled between the output of inverter 110 and the gate of P-type transistors 100 and 93, is low, thereby turning on transistors 100 and 93. A first terminal of equalization transistors 92 and 93 is coupled to node $N_A$, and the second terminal of transistors 92 and 93 is coupled to node $N_B$. Nodes $N_A$ and $N_B$ are also coupled, via P-type transistors 95, 98, and 100, to supply voltage Vcc. Thus, when phase enable $Ø_{EN1}$ signal is low, transistors 92, 93, 95, 98, and 100 are on, and equalization transistors 92 and 93 equalize the voltages at nodes $N_A$ and $N_B$ to 0.5 Vcc initially and eventually nodes $N_A$ and $N_B$ will be pulled to Vcc-VTP from 0.5 Vcc by transistors 95, 98, and 100.

A first terminal, such as the source terminal, of transistor 100 is coupled to supply voltage Vcc. Transistor 100 serves as virtual Vcc control for P-type transistors 95 and 98 to shut off the supply current from Vcc to differential latch amplifier 806 or 808 (FIG. 14) and differential latch amplifier 906 or 908 (FIG. 18) to minimize the operating current, and to allow very high-speed sensing of the differential latch amplifiers to pull nodes $N_A$ and $N_B$ towards Vcc and ground. When transistor 100 is on, the second terminal, such as the drain terminal, of transistor 100 is at a high voltage. The second terminal of transistor 100 is coupled to a first terminal, such as the source terminal, of P-type transistors 95 and 98, thus resulting in a high voltage placed thereon. The gate of transistor 95 is coupled to the second terminal (such as the drain terminal) of transistor 98, while the gate of transistor 98 is coupled to the second terminal (such as the drain terminal) of transistor 95. Consequently, transistors 95 and 98 are turned on, and the second terminal of transistors 95 and 98 are charged to a high voltage or a logic-1 value (e.g., the supply voltage Vcc minus the threshold voltage VTP of transistors 95 and 98). Note that, in one embodiment, transistor pairs 390 and 392 (FIG. 13), 394 and 396 (FIG. 17), and 95 and 98 (FIG. 19) are designed to have about the same threshold voltage VTP, i.e., the same transistor width and length and have the same layout topology/orientation for each transistor pair. Nodes $N_A$ and $N_B$ are coupled to the second terminals of transistors 98 and 95, respectively, so that transistors 95, 98, and 100 pull up the voltage at nodes $N_A$ and $N_B$ from 0.5 Vcc to Vcc-VTP. Nodes $N_A$ and $N_B$ are also coupled to the gates of transistors 95 and 98, respectively.

At power up, nodes $N_A$ and $N_B$ will be either at a low or high voltage. If both nodes are high, the leakage current of the P-N junctions of drains of transistors 92, 93, 95, and 98 will drain the voltage at nodes $N_A$ and $N_B$ to a steady state, which is Vcc-VTP. If both nodes are low, transistors 95 and 98 will pull the voltage at nodes $N_A$ and $N_B$ up to Vcc-VTP. If one of nodes $N_A$ or $N_B$ is either high or low, transistors 95 and 98 will pull the low voltage node to Vcc-VTP, and the high voltage node will be drained down to Vcc-VTP by the leakage current of the P-N junctions of drains of transistors 92, 93, 95, and 98. Therefore, after power up, both nodes $N_A$ and $N_B$ will be at Vcc-VTP before the receiver circuit starts to receive the incoming symbol during a data transfer cycle.

Symbol Decoder

Figure 21:
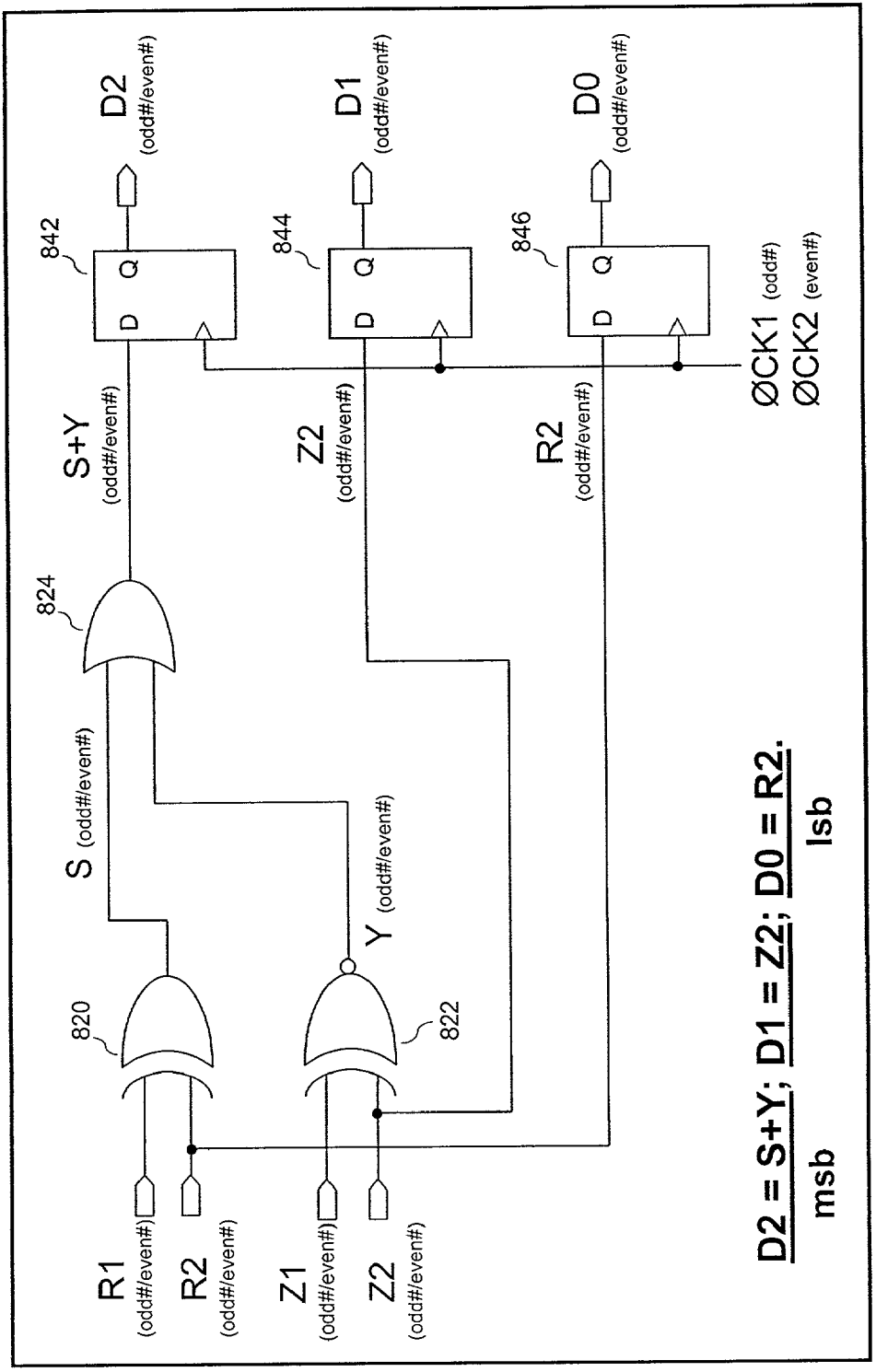
FIG. 21 is a schematic diagram of a symbol decoder, in accordance with an embodiment of the present invention.

FIG. 21 is a schematic diagram of a symbol decoder 371, in accordance with an embodiment of the present invention. Symbol decoder 371 cooperates with transition and DC/AC detector 370 and cross-region detector 320 to decode the transmission symbols received by multi-symbol receiver 48 to recover data D0, D1, and D2. Symbol decoder 371 receives R1, R2 signals from cross-region detector 320 and Z1, Z2 signals from transition and DC/AC detector 370. In one embodiment, as shown, the value of D2 may correspond to an OR operation of the values of S and Y, where S=R1 XOR R2, and Y=Z1 XNOR Z2; the value of D1 may correspond to the value of Z2; and the value of D0 may correspond to the value of R2.

As depicted, symbol decoder 371 may comprise an exclusive-OR (XOR) gate 820, an exclusive-NOR (XNOR) gate 822, OR gate 824, and flip-flops 842, 844, and 846. Truth tables 810 and 812 (shown in FIGS. 15 and 19) show that each symbol can be decoded into 3-bit binary data D[2:0], where D2 is the most significant bit (msb) and D0 is the least significant bit (lsb).

In one embodiment, D2 has a logic-1 value when a symbol is either a DC symbol (i.e., has no transition, such as, for example, symbols-100 and 111) or is a cross-region symbols (i.e., has a transition from one region into another, such as, for example, symbols-101 and 110). Therefore, D2 can be decoded as logic-1 when either Y has a logic-1 value (corresponding to DC symbols) or S has a logic-1 value (corresponding to cross-region symbols). That is, logically D2=S OR Y.

XOR gate 820 receives the R1 and R2 signals as input. XOR gate performs an exclusive-OR operation on the R1 and R2 signals to generate S signal. XNOR gate 822 receives the Z1 and Z2 signals as input, and performs an exclusive-NOR operation on these signals to generate Y signal. The S and Y signals provided as inputs to OR gate 824. OR gate 824 performs an OR operation on S and Y signals.

The output of OR gate 824 is provided as the input to flip-flop 842. The Z2 signal is provided as the input to flip-flop 844. The R2 signal is provided as the input to flip-flop 846. Flip-flops 842, 844, and 846 are clocked by phase clock ØCK1 signal to output data bits D[2:0] (i.e., D2, D1, and D0) for odd-numbered data. Flip-flops 842, 844, and 846 are clocked by phase clock ØCK2 signal to output data bits D[2:0] for even-numbered data.

Phase clock ØCK1 and ØCK2 signals can be phase-delayed versions of the symbol clock signal at the multi-symbol receiver 48. In one embodiment, phase clock ØCK1 signal is used to synchronize the output of odd-numbered data for D[2:0] with the phase enable ØEN1 signal for odd-numbered data, where phase enable ØEN1 signal may be the differential latch amplifier enable signal for odd-numbered data. This is done so that the data is fully amplified, latched and decoded before synchronizing the data bits D[2:0] for odd-numbered data with flip-flops 842, 844, and 846. Likewise, phase clock ØCK2 signal is used to synchronize the output of even-numbered data for D[2:0] with the phase enable ØEN2 signal for even-numbered data, where phase enable ØEN2 signal may be the differential latch amplifier enable signal for even-numbered data. This is done so that the data is fully amplified, latched and decoded before synchronizing the data bits D[2:0] for even-numbered data with flip-flops 842, 844, and 846.

Timing Diagram for Multi-Symbol Receiver

Figure 22:
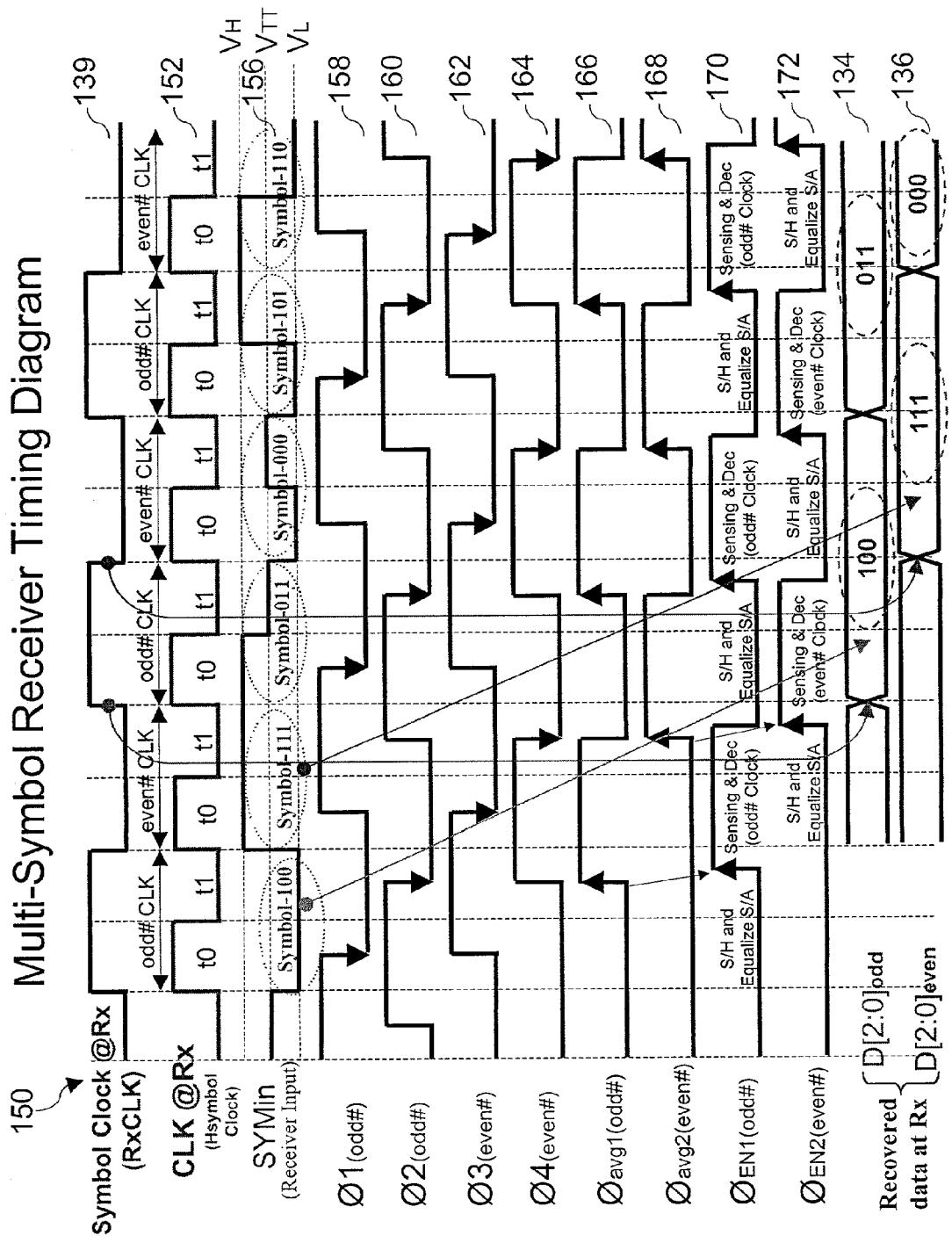
FIG. 22 is an exemplifying timing diagram for the multi-symbol receiver, in accordance with an embodiment of the present invention.

FIG. 22 is an exemplifying timing diagram 150 for multi-symbol data transfer control for a multi-symbol receiver 48 in accordance with an embodiment of the present invention. The timing diagram illustrates the timing for a multi-symbol receiver 48 that receives an input signal SYMin and outputs decoded values D2, D1, and D0.

The timing diagram includes exemplifying waveforms for various signals including a symbol clock at reception RxCLK signal 139, a clock (CLK) at reception signal 152, symbol input SYMin signal 156, multi-phase clock Ø1, Ø2, Ø3, Ø4 signals 158, 160, 162, 164, phase average $Ø_{avg1}$, $Ø_{avg2}$ signals 166, 168, phase enable $Ø_{EN1}$, $Ø_{EN2}$ signals 170, 172, and recovered data bit D[2:0] signals 134, 136, which are described in detail above.

The symbol clock signal 139 may be the same as a system clock signal. In one embodiment, symbol clock signal 139 can be part of a source synchronization scheme—i.e., symbol clock signal 139 is received from a multi-symbol transmitter 44 which outputs the data to be decoded by the receiver 48. Alternatively, symbol clock signal 139 can be part of a global synchronization scheme—i.e., symbol clock signal 139 may be a global synchronized clock. Symbol clock signal 139 can be provided to the DLL and control timing generator 31 of, for example, a slave device 14, to generate all of the receiver control signals and clocks to sample incoming symbols, to equalize differential latch amplifiers, to average sampled data, to amplify the processed data, and to decode and synchronize the recovered data in the multi-symbol receivers of the slave device 14.

The CLK signal 152, which can be derived from the symbol clock signal 139, may be twice the frequency of the symbol clock signal 139. As such, the CLK signal 152 may be considered to be a "half symbol" or "hsymbol" clock signal because its period is half that of the symbol clock signal 139. The CLK signal 139 may be segmented into alternating odd- and even-numbered clock cycles that, among other things, allow for a high clock and data rate, with each odd- and even-numbered clock cycle divided into two half-cycles of duration t0 and t1. The input symbol SYMin signal 156 is received at the input of the multi-symbol receiver 48 and is shown with exemplifying voltage transitions for various transmission symbol waveforms (i.e., symbol-100, symbol-111, symbol-011, symbol-000, symbol-101, and symbol-110). For example, symbol-011 is shown which transitions from a voltage level $V_H$ at time period t0 to a voltage level $V_{TT}$ at time period t1 during an odd-numbered CLK cycle.

The phase Ø1 and Ø2 signals 158, 160 provide the timing during odd-numbered clock cycles while the phase Ø3 and Ø4 signals 162, 164 provide the timing during even-numbered clock cycles. Phase Ø1 signal 158 is high during the transition from time period t0 (from a previous even-numbered clock cycle) to time period t0 in odd-numbered clock cycles, while phase Ø2 signal 160 is high during the transition from time period t1 (from a previous even-numbered clock cycle) to time period t1 in odd-numbered clock cycles. Similarly, for even-numbered clock cycles, phase Ø3 signal 162 is high during the transition from time period t0 (from a previous odd-numbered clock cycle) to time period t0, and phase Ø4 signal 164 is high during the transition from time period t1 (from a previous odd-numbered clock cycle) to time period t1. The frequency of each of phase Ø1, Ø2, Ø3, Ø4 signals 158, 160, 162, 164 is the same as the frequency of the symbol clock signal 139.

The phase average $Ø_{avg1}$ and phase enable $Ø_{EN1}$ signals 166, 170 provide the timing during odd-numbered clock cycles, for example, with phase $Ø_{avg1}$ signal 166 providing the timing for the averaging circuits of the transition and DC/AC detector 370 and cross-region detector 320, and with phase enable $Ø_{EN1}$ signal providing the timing for differential latch amplifiers. The phase average $Ø_{avg2}$ and phase enable $Ø_{EN2}$ signals 168, 172 provide the timing during even-numbered clock cycles, for example, with phase average $Ø_{avg2}$ signal 168 providing the timing for the averaging circuits of the transition and DC/AC detector 370 and cross-region detector 320, and with phase enable $Ø_{EN2}$ signal 172 providing the timing for the differential latch amplifiers. Phase average $Ø_{avg1}$ and $Ø_{avg2}$ signals 166, 168 may go high after respective phase Ø2 and Ø4 signals go low (at which time voltages have been stored in the capacitors) to initiate the averaging operation. Phase average $Ø_{avg1}$ and $Ø_{avg2}$ signals remain high for a time sufficient to average the voltages stored in the capacitors.

Phase enable $Ø_{EN1}$ and $Ø_{EN2}$ signals 170, 172 are low during sample/hold (S/H) and equalization of nodes $N_A$ and $N_B$, which occurs during the sampling operation of the differential signals Q+ and Q−. The sampling/holding can be the buffering of signals Q+, Q−, $Q_{TT}$ and storing the sampled information in the sampling capacitors of the differencing and averaging circuits. Phase enable $Ø_{EN1}$ and $Ø_{EN2}$ signals 170, 172 may then go high immediately after the averaging of Q− and Q+ signal and stay high while differential signals are sensed and decoded. The waveforms illustrated in timing diagram 150 of FIG. 22 are provided to facilitate an understanding of the timing control associated with the multi-symbol receiver 48 and serves to summarize an exemplifying timing control for processing the data, as described further herein.

A technical advantage of some embodiments of the present invention includes providing a transition of signal level for at least some of the symbols used to transfer data. The DC level of a channel may drift due to line characteristics when the same signal level appears on the channel over multiple clock cycles. In particular, capacitive and inductive characteristics of a line may cause the DC level to rise or fall over time. Because some embodiments of the present invention provide a transition for at least some of the symbols, the signal level in the channel changes with each clock cycle, and thus, capacitive and inductive charging on the line is minimized or attenuated.

Another technical advantage of some embodiments of the present invention includes encoding data using symbols which can be interpreted without reference to absolute values. This is accomplished by defining symbols with signal transitions and signal regions. To recover at least a portion of the data, two samples of signal level are taken for each symbol. For each sample, two differentials are generated. The differentials are compared against each other. The relative positioning (i.e., higher or lower) of the differentials is considered in determining how to decode data. To recover another portion of data, each set of differentials is averaged. The averages are then considered against each other in determining how to decode the data. Because the decoding of symbols is not accomplished using absolute reference levels, this multi-symbol signaling technique is not as susceptible as previously developed techniques to the problems associated with signal drift and individual line characteristics. Accordingly, the present invention provides for accurate data recovery.

Yet another technical advantage of some embodiments of the present invention includes providing a signaling technique which uses a predetermined voltage (e.g., a termination voltage ($V_{TT}$)) as a reference. This eliminates the need for a separate reference voltage source ($V_{REF}$). Accordingly, the signaling technique requires less power. Furthermore, the signaling technique provides more stable DC levels, thus enabling faster data transfer rates.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. An apparatus for providing multi-symbol signaling comprising:
   an encoder circuit operable to encode data into transmission symbols to be conveyed in a carrier signal, wherein each transmission symbol is from a symbol set comprising a plurality of symbols which are collectively capable of representing any combination of values for at least three bits of data, wherein each symbol of the symbol set is defined with at most one transition of signal level in the carrier signal; and
   a driver circuit coupled to the encoder circuit, the driver circuit operable to drive the carrier signal.

2. The apparatus of claim 1 wherein each symbol of the symbol set is uniquely defined by one or more of a transition in signal level, a lack of transition in signal level, a signal region, and a cross-over between signal regions in the carrier signal.

3. The apparatus of claim 2 wherein a signal region is defined with reference to a predetermined voltage.

4. The apparatus of claim 1 wherein the transition of signal level can be either a rise or a fall in signal level.

5. The apparatus of claim 1 wherein the driver circuit comprises a push-pull driver circuit.

6. The apparatus of claim 1 further comprising a differential output driver circuit operable to drive a differential carrier signal.

7. The apparatus of claim 1 wherein the driver circuit comprises:
   a first supply source for providing a voltage high level for the carrier signal; and a second supply source for providing a voltage low level for the carrier signal.

8. The apparatus of claim 1 wherein each transmission symbol is transferable within a single period of a clock signal.

9. The apparatus of claim 8 wherein the clock signal comprises a universal synchronization clock signal.

10. An apparatus for recovering data comprising:
    a pre-amplifier operable to receive a carrier signal conveying a plurality of transmission symbols, wherein each transmission symbol is from a symbol set comprising a plurality of symbols which are collectively capable of representing any combination of values for at least three bits of data, wherein each symbol of the symbol set is defined with at most one transition of signal level in the carrier signal; and a decoder coupled to the pre-amplifier and operable to recover, for each transmission symbol, a respective combination of values for at least three bits of data.

11. The apparatus of claim 10 wherein each symbol of the symbol set is uniquely defined by one or more of a transition in signal level, a lack of transition in signal level, a signal region, and a cross-over between signal regions in the carrier signal.

12. The apparatus of claim 11 further comprising at least one detector coupled to the pre-amplifier and operable to determine, for each transmission symbol, a defining combination of transition in signal level, a lack of transition in signal level, a signal region, and a cross-over between signal regions in the carrier signal.

13. The apparatus of claim 11 wherein a signal region is defined with reference to a predetermined voltage.

14. The apparatus of claim 10 wherein the pre-amplifier is operable to generate a pair of differential signals for the carrier signal.

15. The apparatus of claim 10 further comprising a transition detector operable to determine, for each transmission symbol, any defining transition in signal level.

16. The apparatus of claim 15 wherein a transition in signal level can be either a rise or a fall in signal level.

17. The apparatus of claim 15 wherein:
the pre-amplifier is operable to generate a pair of differential signals for the carrier signal; and
the transition detector is operable to sample each of the pair of differential signals at least twice for each transmission symbol.

18. The apparatus of claim 17 wherein the transition detector comprises a differencing circuit operable to store a first value for each of the pair of differential signals in a first time period and a second value for each of the pair of differential signals in a second time period.

19. The apparatus of claim 10 further comprising a cross-region detector operable to determine, for each transmission symbol, any defining cross-over between signal regions in the carrier signal.

20. The apparatus of claim 19 wherein:
the pre-amplifier is operable to generate a pair of differential signals for the carrier signal; and
the cross-region detector is operable to take an average value for each of the pair of differential signals for each transmission symbol.

21. The apparatus of claim 10 wherein each transmission symbol is transferable within a single clock period of a clock signal.

22. The apparatus of claim 21 wherein the clock signal comprises a universal synchronization clock signal.

23. The apparatus of claim 21 wherein the clock signal is received from a source which generates the carrier signal.

24. An apparatus for communicating data in the form of transmission symbols conveyed in a carrier signal, wherein each transmission symbol is from a symbol set comprising a plurality of symbols which are collectively capable of representing any combination of values for at least three bits of data, wherein each symbol of the symbol set is defined with at most one transition of signal level in the carrier signal.

25. The apparatus of claim 24 wherein each symbol of the symbol set is uniquely defined by one or more of a transition in signal level, a lack of transition in signal level, a signal region, and a cross-over between signal regions in the carrier signal.

26. The apparatus of claim 25 wherein a signal region is defined with reference to a predetermined voltage.

27. The apparatus of claim 24 wherein each transmission symbol is transferable within a single clock period.

28. The apparatus of claim 24 wherein the transition of signal level can be either a rise or a fall in signal level.

29. The apparatus of claim 24 wherein the carrier signal comprises a differential signal.

30. The apparatus of claim 24 comprising:
a transmitter operable to encode groups of data bits into respective transmission symbols and to drive the carrier signal; and
a receiver operable to receive the carrier signal and to recover, for each transmission symbol, a respective group of data bits.

31. A method for providing multi-symbol signaling comprising:
receiving a group of at least three bits of data for output from an originating device; encoding the group of at least three bits of data into a single transmission symbol, wherein the transmission symbol is from a symbol set comprising a plurality of symbols which are collectively capable of representing any combination of values for the at least three bits of data, wherein each symbol of the symbol set is defined with at most one transition of signal level in the carrier signal; and
transmitting the carrier signal out of the originating device to a destination device.

32. The method of claim 31 wherein each symbol of the symbol set is uniquely defined by one or more of a transition in signal level, a lack of transition in signal level, a signal region, and a cross-over between signal regions in the carrier signal.

33. The method of claim 32 wherein a signal region is defined with reference to a predetermined voltage.

34. The method of claim 31 wherein a transition of signal level can be either a rise or a fall in signal level.

35. The method of claim 31 further comprising:
generating a differential carrier signal; and
transmitting the differential carrier signal out of the originating device to a destination device.

36. The method of claim 31 wherein each transmission symbol is transferable within a single clock period.

37. A method for providing multi-symbol signaling comprising:
receiving a plurality of bits of data for output from an originating device;
encoding the data into a plurality of transmission symbols for communicating data, wherein each transmission symbol for communicating data is from a symbol set comprising symbols defined by respective combinations of signal level transition, lack of signal level transition, signal region, and cross-over between signal regions in the carrier signal, wherein each symbol of the symbol set is defined with at most one transition of signal level in the carrier signal; and
transmitting the carrier signal out of the originating device to a destination device.

38. An apparatus for communicating any combination of values for at least three data bits in the form of a respective transmission symbol conveyed in a carrier signal, wherein the transmission symbol is uniquely defined by a respective combination of a signal level transition, a lack of signal level transition, a signal region, and a cross-over between signal regions in the carrier signal, wherein the transmission symbol is defined with at most one transition of signal level in the carrier signal.

39. A method for recovering data from multi-symbol signaling comprising:
   receiving a carrier signal conveying a plurality of transmission symbols, wherein each transmission symbol is from a symbol set comprising a plurality of symbols which are collectively capable of representing any combination of values for at least three bits of data, wherein each symbol of the symbol set is defined with at most one transition of signal level in the carrier signal;
   determining a defining transition of signal level, if any, for each transmission symbol; and
   determining a defining signal region, if any, for each transmission symbol.

40. The method of claim 39 comprising generating a first and a second differential signal from the carrier signal.

41. The method of claim 40 wherein determining a defining signal region comprises taking an average value of the first and the second differential signals for each transmission symbol in the carrier signal.

42. The method of claim 40 wherein determining a defining transition of signal level comprises sampling each of the first and the second differential signals for each transmission symbol in the carrier signal.

43. A system for providing multi-symbol signaling comprising:
   a multi-symbol transmitter operable to encode a first sequence of data into a first plurality of transmission symbols to be conveyed in a first carrier signal, wherein each transmission symbol of the first plurality is from a symbol set comprising a plurality of symbols which are collectively capable of representing any combination of values for at least three bits of data, wherein each symbol of the symbol set is defined with at most one transition of signal level in the carrier signal; and
   a multi-symbol receiver operable to receive a second carrier signal conveying a second plurality of transmission symbols, wherein each transmission symbol of the second plurality is from the symbol set comprising a plurality of symbols which are collectively capable of representing any combination of values for at least three bits of data, the second plurality of transmission symbols representing a second sequence of data, the multi-symbol receiver operable to recover the second sequence of data.

44. The system of claim 43 wherein each symbol of the symbol set is uniquely defined by one or more of a transition in signal level, a lack of transition in signal level, a signal region, and a cross-over between signal regions.

45. The system of claim 43 wherein the multi-symbol receiver comprises at least one detector operable to determine, for each transmission symbol of the second plurality, a defining combination of transition in signal level, a lack of transition in signal level, a signal region, and a cross-over between signal regions in the second carrier signal.

46. The system of claim 43 wherein the multi-symbol receiver comprises:
   a cross-region detector operable to determine, for each transmission symbol of the second plurality, any defining cross-over between signal regions in the second carrier signal; and
   a transition detector operable to determine, for each transmission symbol of the second plurality, any defining signal transition in signal level in the second carrier signal.

47. The system of claim 43 wherein the multi-symbol transmitter is further operable to generate a differential transmission signal for the first carrier signal.

48. A system for providing multi-symbol signaling between monolithic semiconductor devices, the system comprising:
   a transmitter circuit integral to a first monolithic semiconductor device, the transmitter circuit operable to encode a sequence of data into a plurality of transmission symbols to be conveyed in a carrier signal, wherein each transmission symbol is from a symbol set comprising a plurality of symbols which are collectively capable of representing any combination of values for at least three bits of data, wherein each symbol of the symbol set is defined with at most one transition of signal level in the carrier signal; and
   a receiver circuit integral to a second monolithic semiconductor device, the receiver circuit operable to receive the carrier signal conveying the plurality of transmission symbols, the receiver circuit operable to recover the sequence of data by detecting, for each transmission symbol, any defining cross-over between signal regions and any defining signal transition in signal level in the carrier signal.

49. The system of claim 48 wherein at least one of the first and second monolithic semiconductor devices comprises a processing device.

50. The system of claim 48 wherein at least one of the first and second monolithic semiconductor devices comprises a memory device.

* * * * *